United States Patent
Shenk et al.

(10) Patent No.: US 11,276,111 B2
(45) Date of Patent: *Mar. 15, 2022

(54) ONLINE SOCIAL AND COLLABORATIVE COMMERCE SYSTEM AND METHOD THEREOF

(71) Applicant: cabi LLC, Carson, CA (US)

(72) Inventors: Kris Shenk, Carson, CA (US); Brett Gregor, Carson, CA (US); Robert Croft, Carson, CA (US)

(73) Assignee: cabi, LLC, Carson, CA (US)

( * ) Notice: Subject to any disclaimer, the term of this patent is extended or adjusted under 35 U.S.C. 154(b) by 2 days.

This patent is subject to a terminal disclaimer.

(21) Appl. No.: 17/224,933

(22) Filed: Apr. 7, 2021

(65) Prior Publication Data

US 2021/0342930 A1 Nov. 4, 2021

Related U.S. Application Data

(63) Continuation of application No. 17/129,748, filed on Dec. 21, 2020.
(Continued)

(51) Int. Cl.
*G06Q 30/06* (2012.01)
*G06Q 10/10* (2012.01)
(Continued)

(52) U.S. Cl.
CPC ....... *G06Q 30/0643* (2013.01); *G06F 16/955* (2019.01); *G06Q 10/109* (2013.01);
(Continued)

(58) Field of Classification Search
CPC ............ G06Q 30/0643; G06Q 10/109; G06Q 30/0625; G06Q 30/0633; G06Q 10/02;
(Continued)

(56) References Cited

U.S. PATENT DOCUMENTS

| 2003/0137538 A1* | 7/2003 | Hesmer | ................ G06F 40/157 715/760 |
| --- | --- | --- | --- |
| 2011/0106662 A1 | 5/2011 | Stinchcomb | |

(Continued)

OTHER PUBLICATIONS

WIPO, U.S. International Search Authority, International Search Report and Written Opinion dated Aug. 3, 2021 in International Patent Application No. PCT/US2021/029573, 9 pages.

*Primary Examiner* — Etienne P Leroux
(74) *Attorney, Agent, or Firm* — Inskeep IP Group, Inc.

(57) ABSTRACT

This disclosure describes an online social and collaborative commerce system and method thereof that provides an interactive and virtual personal shopping experience through a platform that facilitates direct selling of products or services. The experience may utilizes a network of independent representatives, consultants or stylist to sell the products or services to consumers or guests. In one illustrative embodiment, information is received from a hostess to begin a direct selling event. A stylist may be matched with the event and a set of hostess' guests are invited. Using this information, a specific website for the event is generated. A stylist portal, hostess portal and at least one guest portal to the specific website is launched for the event. Through the stylist portal, a selection of products or services may be displayed on the at least one guest portal for purchase. The hostess portal may be used to facilitate the event.

24 Claims, 47 Drawing Sheets

Related U.S. Application Data

(60) Provisional application No. 63/030,221, filed on May 26, 2020, provisional application No. 63/017,523, filed on Apr. 29, 2020.

(51) Int. Cl.
| | |
|---|---|
| *G06F 16/955* | (2019.01) |
| *H04L 65/403* | (2022.01) |
| *G06Q 50/00* | (2012.01) |
| G06F 3/0482 | (2013.01) |
| G06Q 10/02 | (2012.01) |

(52) U.S. Cl.
CPC ..... *G06Q 30/0625* (2013.01); *G06Q 30/0633* (2013.01); *G06Q 50/01* (2013.01); *H04L 65/403* (2013.01); *G06F 3/0482* (2013.01); *G06Q 10/02* (2013.01)

(58) Field of Classification Search
CPC ..... G06Q 50/01; G06F 16/955; G06F 3/0482; H04L 65/403
See application file for complete search history.

(56) References Cited

U.S. PATENT DOCUMENTS

| | | | |
|---|---|---|---|
| 2014/0074664 A1* | 3/2014 | Amsalem | G06Q 30/0601 705/27.1 |
| 2015/0149321 A1 | 5/2015 | Salameh et al. | |
| 2015/0281377 A1* | 10/2015 | Qi | H04W 4/21 709/203 |
| 2019/0384616 A1 | 12/2019 | Govindaraj | |
| 2020/0258627 A1* | 8/2020 | Setegn | A61B 5/7275 |
| 2020/0273093 A1* | 8/2020 | Mitchell | G06Q 30/0643 |

\* cited by examiner

CREATE A SHOW — 800

HOSTESS | INVITATIONS | ORDERS | OVERVIEW
Set Hostess | Schedule

SHOW TYPE — 802
○ Physical Show    ◉ Virtual Show

SHOW DATE & TIME — 804 xx/xx/xxxx

Note: Start Time is required. End Time may be left blank

Time Zone    Start Time    End Time
[P1 ▸]       [02:00 PM ▸]  [▸]

Shipping to the Hostess
◉ Yes. I'd like to allow free shipping to the Hostess
○ No. I don't meant to allow free shipping to the Hostess

Shipping Address (Required)
◉ Same as Hostess shipping address
○ Other

FIG. 8

SHOW FOR ABBIE A

Hostess: Abbie A
Show Date: 04/28/2020
Hostess ID: 102639270
Show #: 10505964
Show Type: Virtual

HOSTESS | INVITATIONS | DASHBOARD | ORDERS | OVERVIEW

Online Hostess Planner | Add Guests | Save the Date | cabi-vite | Reminder | Guest List | Attendance & Follow UP My Contact Manager ▼

How do you want to search
○ All shows  ○ Season: Spring '20 ▼  ○ Show Date Range: 03/29/2020 to 04/28/2020

[NEW CONTACT]

View All / Pg < [1] > of 2

| Name [last│first] | City, State | Unsubscribed | VS Guest | Previous Order | Action |
|---|---|---|---|---|---|
| Cara C. cara@email.com | Carlsbad, CA | N | Y | $0.00 | Added |
| Dillon D. dillon@email.com | Torrance, CA | N | N | $0.00 | ⊕ |
| Elsa E. elsa@email.com | Lawndale, CA | N | Y | $0.00 | Added |
| Farley F. farley@email.com | Redondo Beach, CA | N | N | $0.00 | ⊕ |
| Guy G. guy@email.com | Torrance, CA | N | N | $0.00 | ⊕ |
| Hartley H hartley@email.com | Lawndale, CA | N | Y | $0.00 | Added |
| Iggy I iggy@email.com | Inglewood, CA | N | Y | $0.00 | Added |

GUEST LIST(9)

Abbie A
Share all with  ☐ Hostess

Iggy I
Share with ☐ Hostess  ⊖

Jerry J
Share with ☐ Hostess  ⊖

Hartley H
Share with ☐ Hostess  ⊖

Cara C
Share with ☐ Hostess  ⊖

Elsa E
Share with ☐ Hostess  ⊖

SHOW FOR ABBIE A

Hostess: Abbie A
Show Date: 04/28/2020
Hostess ID: 102639270
Show #: 10505964
Show Type: Virtual

| HOSTESS | INVITATIONS | DASHBOARD | ORDERS | OVERVIEW |

Online Hostess Planner | Add Guests | Save the Date | Invite | Reminder | Guest List | Attendance & Follow UP

Create invite

From:
○ Hostess  ● Stylist

To:
● All Guests  ○ Remaining Guests

[x] Iggy I    [x] Jerry J   [x] Hartley H
[x] Cara C   [x] Elsa E

Add Guest

CC:
☑ Hostess (Abbie A)   ☑ Stylist (Betty B)

Template:
Spring '20

*You're invited to*

Front Row: A Virtual Personal Styling Experience

Hosted By: Abbie A
Tuesday, April 28, 2020/02:45 p.m. PT

RSVP▶

1402

Hi Ladies!

As Busy Women, It Can be Challenging To Make Time For Everything In Our Lives.... And So Often What We Give Up Is Time For Ourselves Or Girl Time. My Upcoming Fashion Experience Will Give You Both

FIG. 14

Let's Get Personal!

Complete Your Profile To Take Advantage Of More
Features, Personalized Just For You.
(Plus, It Makes Checkout a Breeze!)

| Complete My Profile | ~1702

I'LL Complete My Profile Later ~1704

Style　　　Items　　　Fit　　　Address

Tell Us A Little Bit About Your Current Style

How Do You Dress Most Often?

● Business
○ Casual
○ Dressy

FIG. 18

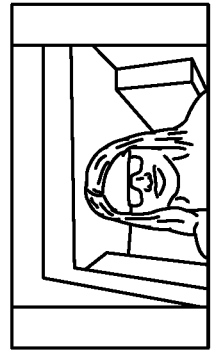
FIG. 20

SHOW FOR ABBIE A

Hostess: Abbie A
Show Date: 04/28/2020
Hostess ID: 102639270
Show #: 10505964
Show Type: Virtual

HOSTESS | INVITATIONS | DASHBOARD | ORDERS | OVERVIEW

START PRE-SHOW

2100

2102

GUESTS ⊙ All    ALL GUESTS

Guests ▾

○ Iggy I
○ Jerry J        17
○ Hartley H
○ Cara C
○ Elsa E

Are you sure you want to start the pre-show phase?
Starting pre-show also means starting the video conference.

I'M SURE
CANCEL

Type here

Sign in / Create account

Enter your email address to sign in or create a new account.

your email address
cara@email.com
☐ Remember me

Welcome!

Enter your password, or click the link below to request a pa password*
********|

CONTINUE

REQUEST A PASSWORD

3100

Let's get Personal!

Complete your profile to take advantage of features, personalized just for you.
(plus, it makes checkout a breeze!)

COMPLETE MY PROFILE

I'LL COMPLETE MY PROFILE LATER

It's time to get started

JOIN THE SHOW

This Front Row experience has ended.

Don't worry, you can still shop and chat with the group

Welcome Abbie A
| Log Out
HOME  MY SHOWS  CONTEXT  CONTACT MANGER    DOWNLOAD TAP My Upcoming Fashion Experience
2 Day(s) Away
Friday, May 15, 2020         1 Guests invited
12:00PM PT              1   0   0   0
Show #: 105052135      Yes Maybe No No Reply Start by inviting people free your contact manager 4402 — Hostess Contact Manager ▼  — Add Guests From Your Contact Manager
4404 —
4408 — ○ All shows  ○ Season  ▽         Search Contacts(First or Last Name) — 4406
4410 — + ADD NEW CONTACTS  🖶 IMPORT CONTACTS   Show Date Range  04/11/2000  to  03/12/2020
4412 — NAME:          CITY NAME:     PROCESSED:    ACTION:     Guest List: 1
                                                                Cara C  ○
        No Results Found!                          SEND INVITES NOW — 4414

Welcome Abbie A
o | Mr. Stylist Sale | Log Out
HOME  MY SHOWS  CATEGORY  CONTACT MANAGER  DOWNLOAD TAP My Upcoming Fashion Experience
2 Day(s) Away
Friday, May 15, 2020          1 Guests invited
12:00PM PT              1   0   0   1   0   0   0
Show #: 105052135       ‾‾‾‾‾‾‾‾‾‾‾‾‾‾‾‾‾‾‾‾‾‾‾
                        Yes Maybe No No Reply

| RSVP DETAILS | ADD GUESTS |

4502 — SEND INVITES                    | Cancel | Preview |  | Send Invites |

4504 — Emails  • Save the Date  •  • Reminder

4506 — To    • All Guests  • Remaining Guests
             | Cara C |  | Dillon D |
             • Add Guest 4508 — cc:  ☑ Hostess-Abbie A   ☑ Stylist-Betty B 4510 — Select A Template
       Spring 2020

FIG. 45

ONLINE SOCIAL AND COLLABORATIVE COMMERCE SYSTEM AND METHOD THEREOF

RELATED DISCLOSURE

This application is a continuation of and claims priority to U.S. patent application Ser. No. 17/129,748 filed Dec. 21, 2020 entitled Online Social and Collaborative Commerce Method and System, which claims benefit of and priority to U.S. Provisional Application Ser. No. 63/017,523 filed Apr. 29, 2020 entitled Online Social and Collaborative Commerce Method and System, and claims benefit of and priority to U.S. Provisional Application Ser. No. 63/030,221 filed May 26, 2020 entitled Online Social and Collaborative Commerce Method and System, all of which are hereby incorporated herein by reference in their entireties.

TECHNICAL FIELD

The present disclosure relates to an electronic commerce system and more particularly, to a generated website for facilitating a selling experience whereby products or services from a service or product representative are offered on a virtual "front-row" guided and collaborative ecommerce platform.

BACKGROUND

Sales may take place in a non-retail environment, for example, at a home, work, or other non-store location. Apparel, garments, clothing, jewelry, health products, food, cosmetics, insurance, accessories, and more may be sold in this manner. Through, for example, direct selling, distributors may avoid intermediaries in a supply chain and sell products or services directly to consumers. Direct selling may rely heavily on salespeople getting in front of customers in nontraditional settings. For the purposes of this application, direct selling may mean any form of sales activity that is direct from a manufacturer, retailer, wholesaler, etc. (or analogous service provider) to a consumer or from representative of such manufacturer, retailer, wholesaler, etc. (or analogous service provider) to a consumer.

The direct selling industry, and particularly direct selling industries that rely on in-person gatherings, however, has of recent slowed down. Three factors may be influencing this trend: (1) A host has to open their home, invite guests and prepare for an in-home home gathering; (2) Guests have to prepare themselves to attend an in-home gathering; and (3) Stay-at-home orders due to emergency health order such as those encountered in the 2019-2021 Pandemic. Furthermore, software has not kept pace with the direct-to-consumer model. For example, software may simply link to an outside ecommerce site that is not designed or meant for direct selling.

The present disclosure provides for an online social and collaborative commerce system and method thereof that addresses the above identified concerns as well as many other concerns not specifically enumerated herein. One focus of the present disclosure is on reinforcing relationships and gatherings without the complexities of putting an in-person experience, e.g., a home show, together. Furthermore, and by taking high value elements of a physical in-person, e.g., a home-show experience, such as relationship building, to a virtual world, the system may overcome the perceived in-person frustrations and may pave the way to be more attractive for the younger demographic of potential seller. Other benefits and advantages will become clear from the disclosure provided herein and those advantages provided are for illustration. The statements in this section merely provide the background related to the present disclosure and does not constitute prior art.

SUMMARY

This summary is provided to introduce a selection of concepts in a simplified form that are further described below in the DESCRIPTION OF THE DISLCOSURE. This summary is not intended to identify key features of the claimed subject matter, nor is it intended to be used as an aid in determining the scope of the claimed subject matter.

According to one aspect of the present disclosure, a system for direct selling through a remote platform is provided. The system may include a memory for storing computer readable code and a processor operatively coupled to the memory, the processor configured to perform processes. The processes may include receiving information for creating a direct selling event, generating a specific website from the information for the direct selling event and launching a first portal, second portal and at least one other portal to the specific website for the direct selling event.

According to another aspect of the present disclosure, a non-transitory machine-readable storage medium is provided that includes instructions, which when implemented by one or more machines, cause the one or more machines to perform operations. The operations may include generating a website having a first portal, second portal and at least one other portal for a virtual direct selling event and receiving from the first portal a selection of products or services to be displayed on the at least one other portal for purchase during the virtual direct selling event with the second portal facilitating the virtual direct selling event.

According to yet another aspect of the present disclosure, a non-transitory computer readable medium is provided which stores computer-executable instructions that, when executed by one or more processors of a computer, cause the computer to perform a method. The method may include receiving timing information for a virtual show, associating user information with the virtual show, generating a website from the information, and launching a first portal, second portal and at least one other portal for the website. In addition, the method may include receiving from the first portal a selection of products or services to be displayed on the at least one other portal for purchase during the virtual show and monitoring the virtual show through the second portal.

BRIEF DESCRIPTION OF THE DRAWINGS

The novel features believed to be characteristic of the disclosure are set forth in the appended claims. In the descriptions that follow, like parts are marked throughout the specification and drawings with the same numerals, respectively. The drawing FIGURES are not necessarily drawn to scale and certain FIGURES may be shown in exaggerated or generalized form in the interest of clarity and conciseness. The disclosure itself, however, as well as a preferred mode of use, further objectives and advantages thereof, will be best understood by reference to the following detailed description of illustrative embodiments when read in conjunction with the accompanying drawings, wherein:

FIG. 8 is an exemplary screenshot showing entry of parameters for the virtual live experience in accordance with one aspect of the present disclosure;

FIG. 10 is an exemplary screenshot showing a stylist portal for inviting guest to the virtual live experience show in accordance with one aspect of the present disclosure;

FIG. 12 is an exemplary screenshot for generating an invitation for the virtual live experience show in accordance with one aspect of the present disclosure;

FIG. 14 is an exemplary screenshot providing an illustrative invitation to the virtual live experience show in accordance with one aspect of the present disclosure;

FIG. 17 is an exemplary screenshot showing a prompt requesting for more information from the guest in accordance with one aspect of the present disclosure;

FIG. 18 is an exemplary screenshot requesting a current style from the guest in accordance with one aspect of the present disclosure;

FIG. 20 is an exemplary screenshot requesting a stylist to test their camera and microphone for the virtual live experience in accordance with one aspect of the present disclosure;

FIG. 21 is an exemplary screenshot allowing the guest to enter into a pre-show phase for the virtual live experience which the stylist controls entry thereto in accordance with one aspect of the present disclosure;

FIG. 27 is an exemplary screenshot showing the stylist's portal for the virtual live experience to view a specific guest's specific favorites in accordance with one aspect of the present disclosure;

FIG. 28 is an exemplary screenshot showing the stylist's portal for the virtual live experience to view a specific guest's style profile in accordance with one aspect of the present disclosure;

FIG. 29 is an exemplary screenshot showing the stylist's portal for the virtual live experience to view a specific guest's contact information in accordance with one aspect of the present disclosure;

FIG. 30 is an exemplary screenshot showing the stylist's portal for the virtual live experience to view a specific guest's order in accordance with one aspect of the present disclosure;

FIG. 31 depicts exemplary screenshots showing the illustrative login sequence to the virtual live experience for the guest in accordance with one aspect of the present disclosure;

FIG. 32 is an exemplary screenshot showing an action button or prompt for the guest to join the virtual live experience in accordance with one aspect of the present disclosure;

FIG. 39 is an exemplary screenshot showing a linked website associated with the search clothing feature in accordance with one aspect of the present disclosure;

FIG. 40 is an exemplary screenshot showing an end of the virtual live experience in accordance with one aspect of the present disclosure;

FIG. 44 is an exemplary screenshot showing the hostess' ability to add guests for the virtual live experience in accordance with one aspect of the present disclosure;

FIG. 45 is an exemplary screenshot showing the hostess' ability to send invites for the virtual live experience in accordance with one aspect of the present disclosure.

DESCRIPTION OF THE DISCLOSURE

Figure 1:
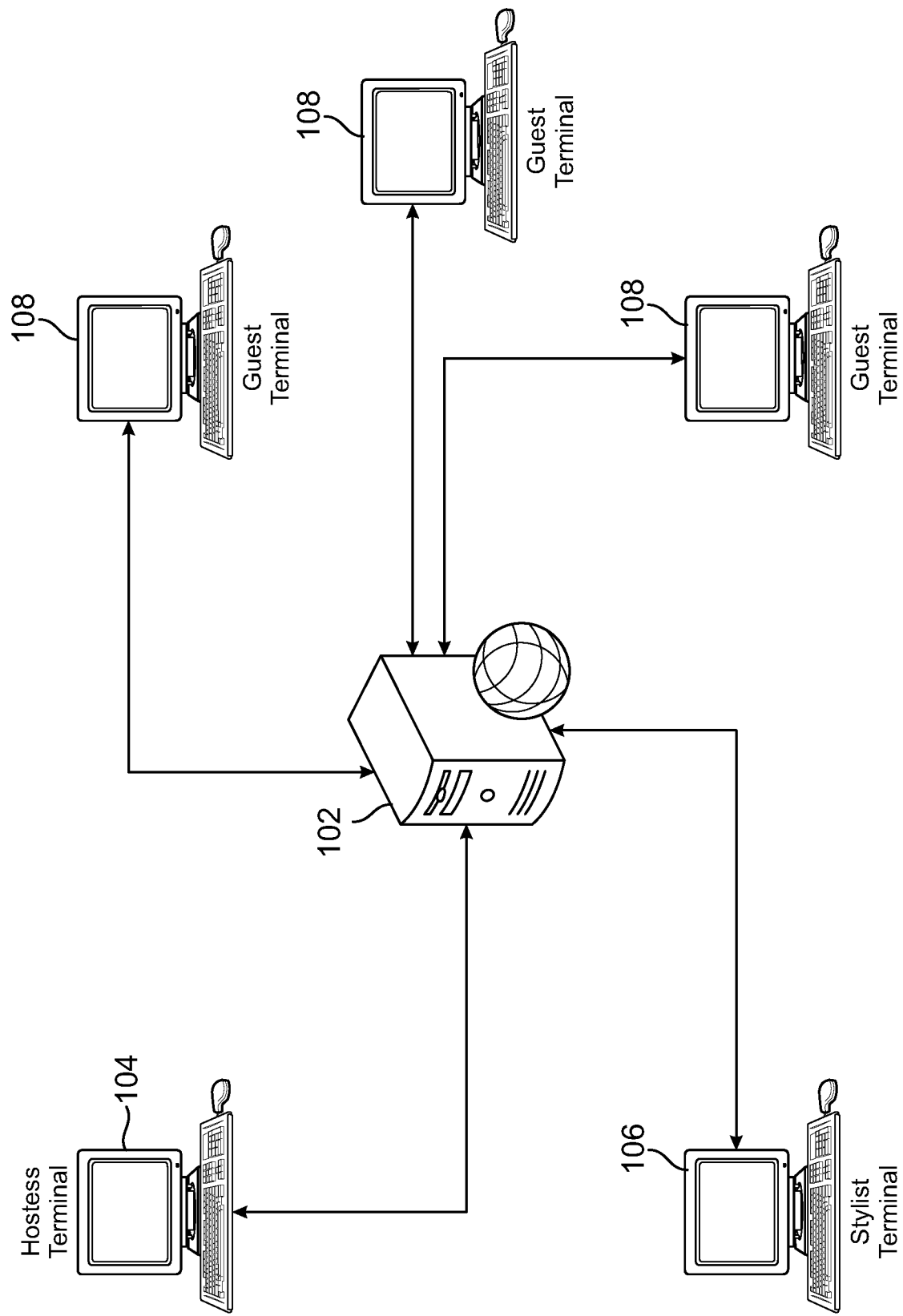
FIG. 1 is an exemplary component diagram of an online social and collaborative commerce system interfaced through a web application in accordance with one aspect of the present disclosure.

The description set forth below in connection with the appended drawings is intended as a description of exemplary embodiments of the disclosure and is not intended to represent the only forms in which the present disclosure may be constructed and/or utilized. The description sets forth the functions and the sequence of blocks for constructing and operating the disclosure in connection with the illustrated embodiments. It is to be understood, however, that the same or equivalent functions and sequences may be accomplished by different embodiments that are also intended to be encompassed within the spirit and scope of this disclosure.

The present disclosure relates to electronic commerce. More particularly, this disclosure describes an online social and collaborative commerce system and method thereof that provides an interactive and virtual shopping experience through a platform that facilitates direct selling of products or services. The experience may utilize a network of independent consultants, representatives or stylists to sell the products or services to guests of a hostess. In one illustrative embodiment, information is received from a hostess to begin a direct selling event. A stylist may be matched with the event and a set of hostess' guests are invited. Using this information, a specific website for the event is generated. A stylist portal, hostess portal and at least one guest portal to the specific website is launched for the event. Through the stylist portal, a selection of products or services may be displayed on the at least one guest portal for purchase. The hostess portal may be used to facilitate the event.

Numerous other modifications or configurations to the online social and collaborative commerce system and method thereof will become apparent from the description provided below. For example, each of the stylist portal, hostess portal and at least one guest portal may be separated by their individual access points such that their own unique views may be given. Yet, each may share a common chat interface. The unique portals may offer various functions and features which are differentiated from the other attendees of the direct selling event. Advantageously, relationships and gatherings are reinforced without the complexities of putting a home show together through the disclosed system and method. Through webcasting and real-time streaming, the system enables or allows a stylist to provide a primary sales method through a non-retail channel. This unique experience allows a hostess and their friends or guests to view goods or services from a stylist (or someone who is familiar with the goods or services) in an exclusive and distinctive manner. While the majority of this disclosure is directed towards clothing or other accessories, this is only one exemplary embodiment of the present invention. The present invention can be used for any product or service. Other advantages will become apparent from the description provided below.

The connected environment, which will be described in further details below, may provide for the direct selling of products or services to guests. Direct selling has a number of business models. Two main business model include: single-level marketing, in which the hostess makes money by buying products from a parent organization and selling them directly to the guests, and multi-level marketing, in which the direct seller may earn money from both direct sales to guests and by sponsoring new direct sellers and potentially earning a commission from their effort. In one preferred embodiment, the hostess may earn discounts from sales of products at a hosted event but is not a seller of those products.

In one embodiment of a direct selling event involving the sale of women's clothing products, the stylist primary sales method may be through a home show. The hostess and their friends may participate in a fashion demonstration or experience and may be able to shop a product or service line. At the show, customers try on, select and place orders with the stylist. The stylist or the customer may enter their orders online through interconnected but various websites. The stylist may also sell products outside of a home show (called a retail order) and may be entered either by the stylist or the guests themselves.

The online social and collaborative commerce system and method thereof may bring the previously confined home shows, or other direct selling methods, to a virtual styling experience. This experience may be used to handle RSVP responses and a dedicated chat room. Catalogues for products or services may be shown with personalization and recommendations from the stylist. Real time show trends may also be shown. For purposes of this disclosure, the stylist should not be limited to one who sells or advertises clothing. Rather, the system may be one that facilitates any type of good or service where someone may be selling goods or service, that is, the term "stylist" should not be construed as being limiting.

Turning to FIG. 1, an exemplary component diagram of an online social and collaborative commerce system 102 interfaced through a web application in accordance with one aspect of the present disclosure is provided. The system 102 may operate in a connected environment 100 where multiple portals may access into the system 102. In a non-limiting example, these portals may be opened and closed by a stylist terminal 106 through the system 102. These portals may transmit or receive digital data between the online social and collaborative commerce system 102 to perform the virtual live experience for the direct selling event.

The connected environment 100 may include a communications network for data transmissions between the portals and the system 102. The communications network may be a wireline or wireless connection, or a combination thereof. The communications network may include a cellular network, or other suitable network such as a local area network (LAN), a wide area network (WAN), a public switched telephone network (PSTN), a satellite network, or a combination of them. A suitable network may be any network capable of transmitting voice, data, and/or video between components within the network. The communications network may include one or more delivery mechanisms or protocols. Through multiple networks, the hostess terminal 104, stylist terminal 106, and at least one guest terminal 108 may be located locally, nationwide, or international to one another.

The online social and collaborative commerce system 102 may operate on a server, and more particularly, a web server that may have software or hardware dedicated to running applications to satisfy client requests received from the World Wide Web (WWW). On the hardware side, the web server may store a website's component files, for example HTML documents, images, CSS stylesheets, and JavaScript files. The web server may be connected to the Internet and support physical data interchanges with other devices connected to the Web.

On the software side, a web server of the system 102 may include several parts that control how web users may access hosted files. A Hyper Text Transfer Protocol (HTTP) server is be a piece of software that understands URLs (web addresses) and HTTP (protocol that is used to view webpages). The web server may be accessed through the domain names (like cabionline.com) of websites it stores, and may deliver its content to the end-user's device, such as the hostess terminal 104, stylist terminal 106, and at least one guest terminal 108.

In one illustrative example, when a browser makes a request for a file which is hosted on the web server, the browser uses HTTP. When the request reaches the correct web server (hardware), the HTTP server (software) may accept the request depending on permissions or authorizations. The HTTP server may locate the requested document and may send the document back to the browser, also through HTTP. If the document is not located, a 404 response may be returned.

The server running the online social and collaborative commerce system 102 may include one or more processors and memory. The main memory may store, in part, instructions and data for execution by the processor. The main memory may store the executable code when in operation performs a number of processes. The server may further include a mass storage device, portable storage medium drive(s), output devices, input devices, and peripheral devices. A singular bus between the components may be used for one or more data transport functions. Alternatively, multiple bus lines may be used.

As shown in the connected environment 100, the online social and collaborative commerce system 102 may be connected to the hostess terminal 104, stylist terminal 106, and at least one guest terminal 108. These terminals may take the form of a computing device. In a non-limiting example, the computing device may be a personal computer (PC), laptop, terminal connected to a server, dumb terminal, tablet computer, personal digital assistant (PDA), Internet Protocol phone, smartphone or any other device capable of displaying information and/or outputting audio.

The hostess terminal 104 and stylist terminal 106 may communicate to the online social and collaborative commerce system 102 through a single portal that interfaces with the web server hosted thereon to generate the virtual live experience for the direct selling event. Alternatively, the hostess terminal 104 and stylist terminal 106 may each access their own portal and unique views may be presented to them respectively. In a non-limiting example, the guest terminal 108 may each access a portal to the web server with each being uniquely customized for the system 102. Three guest terminals 108 are shown for a non-limiting example. Fewer or more may be used within the system 102, depending on the guests invited by the hostess.

In operation, the hostess terminal 104, stylist terminal 106, and guest terminals 108 may access the server of the online social and collaborative commerce system 102 through a web portal. The web-based interface may provide access to enterprise applications and other enterprise assets such as applications (including Web applications), and systems. The interface may be designed as an on-ramp to a variety of different assets and may be configured easily by the end user.

In a non-limiting example, the web portal may be a specially designed website that brings information from diverse sources, like emails, online forums and search engines, together in a uniform way for each of the hostess terminal 104, stylist terminal 106, and guest terminals 108. Each information source may get its dedicated area on the page for displaying information (a portlet). The user may configure which information to display. Variants of portals include mashups and intranet "dashboards" for the hostess terminal 104 and stylist terminal 106, and to an extent the guest terminals 108. The extent to which content is displayed in a "uniform way" may depend on the intended user and the intended purpose, as well as the diversity of the content. The role of the user in an organization may determine which content may be added to the portal or deleted from the portal configuration.

Portals of the hostess terminal 104, stylist terminal 106, and guest terminals 108 may provide a way for enterprises and organizations to provide a consistent "look and feel" with access control and procedures for multiple applications and databases, which otherwise would have been different web entities at various URLs. The features available may be restricted by whether access is by an authorized and authenticated user (employee, member) or an anonymous website visitor.

Figure 2:
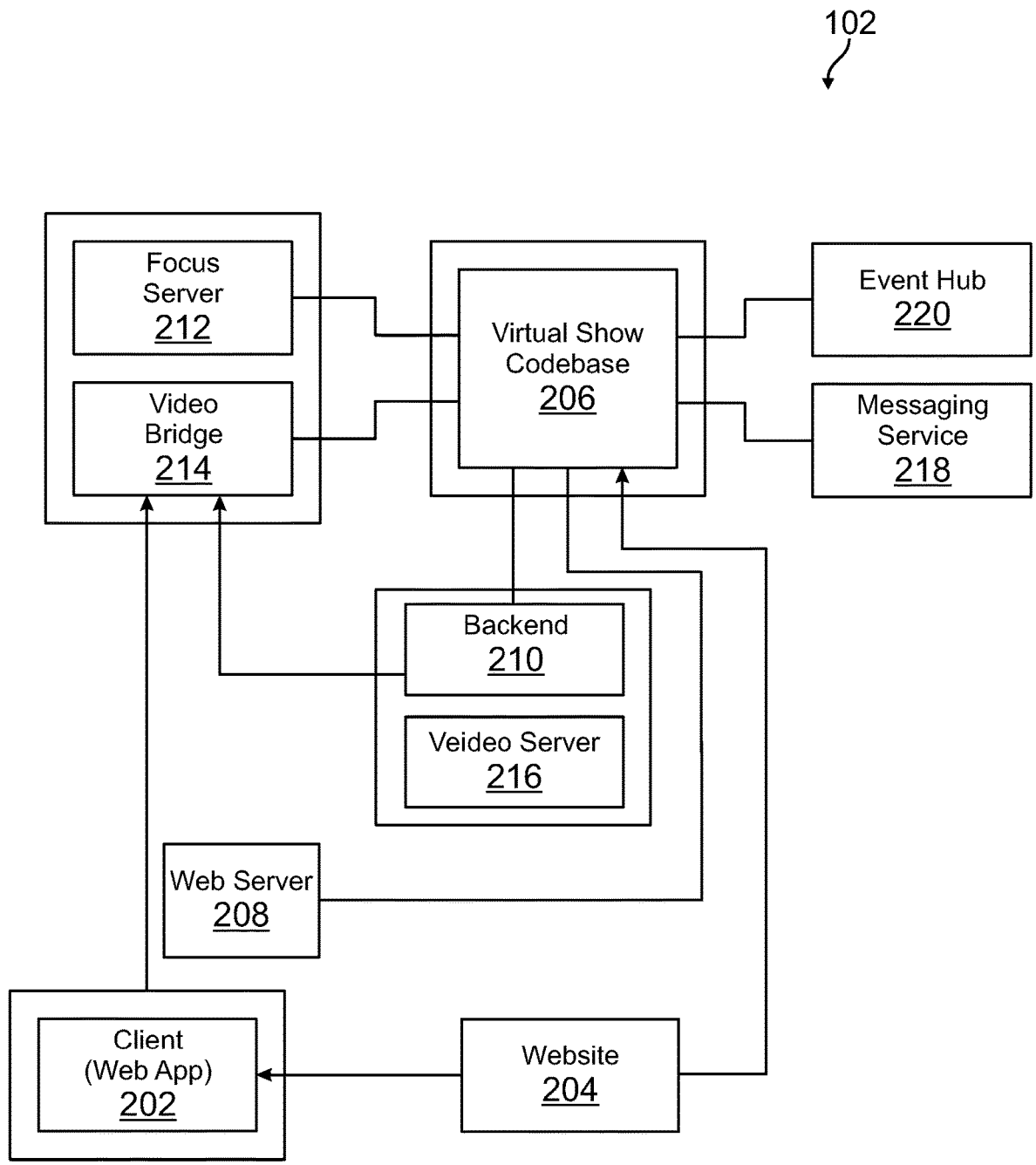
FIG. 2 is an exemplary component diagram of the online social and collaborative commerce system showing illustrative protocols after interfacing with the web application in accordance with one aspect of the present disclosure.

FIG. 2 is an exemplary component diagram of the online social and collaborative commerce system 102 showing illustrative protocols after interfacing with the web application 202 in accordance with one aspect of the present disclosure. The hostess terminal, stylist terminal, and guest terminals may access the web application 202 to enable the virtual live experience. Typically, the web application 202 may be the browser situated on the terminal as described above. The web application 202 may communicate with the web server 208 through an active Internet connection. This communication may be programmed using a client-server modeled structure. A new website or specific webpage may be instantiated for each direct selling event. The system 102 may provide the ability to switch in and out different services, which will become apparent from below, such as jitsi, WebRTC, Vimeo, and the like.

The web application 202 may access a remotely provided website 204. The website 204 may receive information from the web application 202 running on the hostess terminal, stylist terminal, and guest terminals. In a non-limiting example, the user may type in https://www.cabionline.com/ and access the website 204 through their specific web application 202. The user may be required to login or cookies may be used to access the website 204. Other forms of remembering access credentials to the website 204 may include, but not limited to, JSON Web Tokens, HTTP authentication, IP address, URL (query string), or the like.

Once the web application 202 is given portal access to the website 204, the web server 208 may be accessed. The server 208 may produce the virtual live experience for the direct selling event. This experience may be a web application that is delivered to the customer as part of a larger website 204. The triggering of the virtual live experience may come from the web server 208. In order for the web server 208 to create the virtual live experience, a virtual show codebase 206 may be used.

The virtual show codebase 206 may be a collection of source code used to build a particular software system, application, or software component, and may be human-written source code files, for example. It generally includes configuration and property files, as they are the data necessary for the build. The virtual show codebase 206 may use the following, as shown in Table 1 in URL properties, which may be adjusted as appropriate:

TABLE 1 ejabberd.service.name=conference.prod-video.video.cabishows.com
ejabberd.host.name=prod-video.video.cabishows.com
ejabberd.server.url=http://xmp-pl.alchemy.cabiexperience.com:5280/api/

The web server 208 may host applications through software frameworks. The framework may provide both facilities the ability to create web applications and a server environment to run them. The framework may contain a comprehensive service layer model which may include a set of components accessible to the software developer through a standard application protocol interface (API) defined for the platform itself. For web applications 202, these components may usually run in the same environment as the web server 208, and their main job is to support the construction of dynamic pages. The web server 208 may generate web pages.

In a non-limiting example, the website 204 may communicate with the virtual show codebase 206 through a messaging protocol and associated messaging infrastructure, such as Extensible Messaging and Presence Protocol (XMPP) over a HTTP (BOSCH) 5442 protocol. XMPP may provide a communication protocol for message-oriented middleware based on XML (Extensible Markup Language). It may provide real-time exchange of structured yet extensible data between any two or more network entities.

The virtual show codebase 206 may communicate with the web server 208 using XMPP over HTTP (BOSCH) 5280. The virtual show may be a web application that is delivered to the customer as part of the website 204, however, the triggering of the virtual live experience comes from the web server 208.

A backend 210 may also be tied to the virtual show codebase 206. These components may communicate through XMPP 5280. At least one video server 216 may be connected to the backend 210, or may be located elsewhere such as at a remote location. Corporate assets may be provided through the backend 210 or third party servers, such as Vimeo or YouTube. As will be shown, videos may be made between delivery mechanisms in the background. That is, videos may be provided through the video server 216 and/or the focus server 212/video bridge 214. A presentation tier may be provided in the browser and rendered in the browser. The backend 210 may read/write to a database, and in particular, may be used for videos and may listen for messages to start playback on command. In an example, real-time video from the stylist, host, and/or guest may be provided through the backend 210, which may also be known as a talking head. The web server 208 and the backend 210 may be a one-tier system, where the web server 208 and backend 210 are the same. If the system 102 is a two-tier or three-tier system, then the web server 208 may be the server that accepts requests from the users via the browser and the backend 210 is the server that reads/writes to the database. The web server 208 may be primarily involved with directly interacting with requests from users (e.g. serving web pages, images, etc.). The web browser may directly interact with requests from users. Data packets may be sent to the web server 208 from the browser. The backend 210 may generally be an application server that runs software on the web server 208 and may be called on behalf of the end user to perform business logic.

The virtual live experience for the direct selling event of the online social and collaborative commerce system 102 may be built around XMPP. Ejabberd, a type of XMPP server, may be used as a message service 218. This service 218 may support one or more multiple messaging platforms (like ejabberd) and one or more messaging protocols (like XMPP). An event hub 220 may be used for a custom messaging platform, for example, Sonrisa. The backend 210 may communicate with a video bridge 214 through standard internet protocols such as HTTP. The web application 202 may communicate with the video bridge 214 through WebRTC over 443. This may provide web camera feeds. While WebRTC may be used, other real-time communications via APIs may be used.

A focus server 212 may be in communication with the video bridge 214, as well as other components within the system 102. The focus server 212 may be implemented as a Jicofo Server. In one non-limiting example, the focus server 212 may communicate with the virtual show codebase 206 through XMPP 5275.

In operation, and when the virtual live experience begins, a meet and greet period may be generated that uses multiple video feeds playing in one frame. For example, the show may use a "Brady Bunch" style for displaying feeds from the hostess terminal, stylist terminal, and guest terminals at a top portion of a screen. The video bridge 214, using Jitsi for example, may be used. Prefabricated marketing videos may be played at the beginning for a predetermined period of time. These marketing videos may include metadata stored in the closed captioning track which may trigger a carousel of products or services that the participants in the virtual live experience may "like" by clicking on a heart icon.

At the end of the video portion, another discussion may occur. This may also use the "Brady Bunch" style for displaying feeds. This discussion may include links to create orders based on the favorites clicked during the videos, add items to those orders, or the like. Open-source video conferencing for the Web and mobile devices may be used. Other features for this pre-show period may include making a call, launching on their own servers in minutes, integrate into the application, or develop new functions or features.

Conference focus may be a component of Jitsi COnference FOcus (jicofo), which may be implemented through the focus server 212. The focus server 212 may be a server side focus component used in Jitsi. Meet conferences may mange media sessions between each of the participants and the video bridge 214. The focus server 212 may be responsible for managing media sessions between each of the participants and the video bridge 214.

When a new conference is about to start, an information query (IQ) may be sent to the focus server 212 to allocate a new focus instance. After the instance is created, a special focus participant may join a multi-user chat room. This may be created using a Jingle session between the Jitsi video bridge 214 and the participant. Although the session in terms of XMPP may be between the focus user and participant, the media may flow between the participant and the video bridge 214. The focus user may allocate COnferences with LIghtweight BRIdging (COLIBRI) channels on the bridge and use them as its own Jingle transport.

To start quickly with Jicofo (through the focus server 212), it may be recommended to install Jitsi Meet using quick install instruction which may install and configure 'jicofo' debian package next to 'jitsi-meet'. Jitsi Build may be used, for example, for massively scalable multiparty video applications. Mixing video channels may be stopped and Jitsi Videobridge may be used instead.

A selective forwarding unit (SFU) may be designed to run thousands of video streams from a single server, and may be fully open source and WebRTC compatible. The online social and collaborative commerce system 102 may maintain meta-information on software components. In order to improve performance, the focus server 212 may be run as close to ejabberd on the network as possible. Preferably, this has been chosen to be on the same server. Video playback for customer needs may be performed via HTTP video streaming.

There may be two version of the signaling protocol used by WebRTC: Plan-B and Unified Plan. Jitsi may support Plan-B and has some limited support for the Unified Plan. The two version of the signaling protocols may have differences specifically in how they describe media tracks if there are more than one with the same type (e.g., more than one video streams).

In a non-limiting example, simulcast is a technique by which a WebRTC client may encode the same video stream multiple times in different resolution and bitrates. The client may then send these to the video bridge 214 which may then decide who receives which of the streams. By disabling this, each participant may stream one and only one video stream, instead of streaming at three different resolutions and leaving to the video bridge 214 to decide which should be forwarded to the others. If there are no multiple streams of the same kind in a WebRTC call, then Unified Plan and Plan-B may become quite similar. This may be similar enough to allow Jitsi to understand Safari.

The latest video bridge 214 and jicofo may also be needed for this. If simulcast is disabled, every participant may stream one and only one video stream which may be HD by default and the video bridge 314 may not have the chance to forward a lower resolution stream to the other participants. This may cause performance issues for the users on their end. This may result in a decreasing of the resolution and the bitrate of the video stream for compensating the lack of the lower resolution streams, for example. As such, simulcast may be disabled for the participants, regardless of which browser they are using. The video resolution may be decreased and video bitrates may be decreased. In turn, the stylist and hostess may have a bit higher resolution than guests.

The width value of the video may be calculated based on the aspect ratio. In one example, the ratio may be 16/9. The values may be set with the following parameters: startBitRate, maxBitRateTarget, vidHMin, vidHMax, and vidHIdeal The online social and collaborative commerce system 102 may include a virtual show media server cluster where a cluster of media servers may be enabled for end-user uploads. In a non-limiting example, two endpoints may be offered on the virtual show media server. One endpoint may be used to upload content and the other to download content. To upload content to the virtual show media server a form encoded POST call may be made. Not all parts of the internal network (for example, Alchemy Network) may access the external interface, as shown in Table 2.

TABLE 2

| Location | Base Address |
| --- | --- |
| (Prod) Inside the Alchemy Network | https://vsassets-klb.alchemy.cabieexperience.com |
| (Prod) Outside the Alchemy Network | https://vsassets.cabishows.com |
| (Dev) Inside the Alchemy Network | https://vsassets.cliotest.com |

Some exemplary code for the POST call may be shown in Table 3.

TABLE 3

```
curl -X POST -H "Content-Type: application/x-www-form-urlencoded"
http://vsassets-pl/media-upload/upload.php
"filename=a/test.txt&key=xg78fPxZ2BSxRjGLasi&base64data=PD9waHAKCnBoc
GluZm8oKTsK"
```

Figure 3:
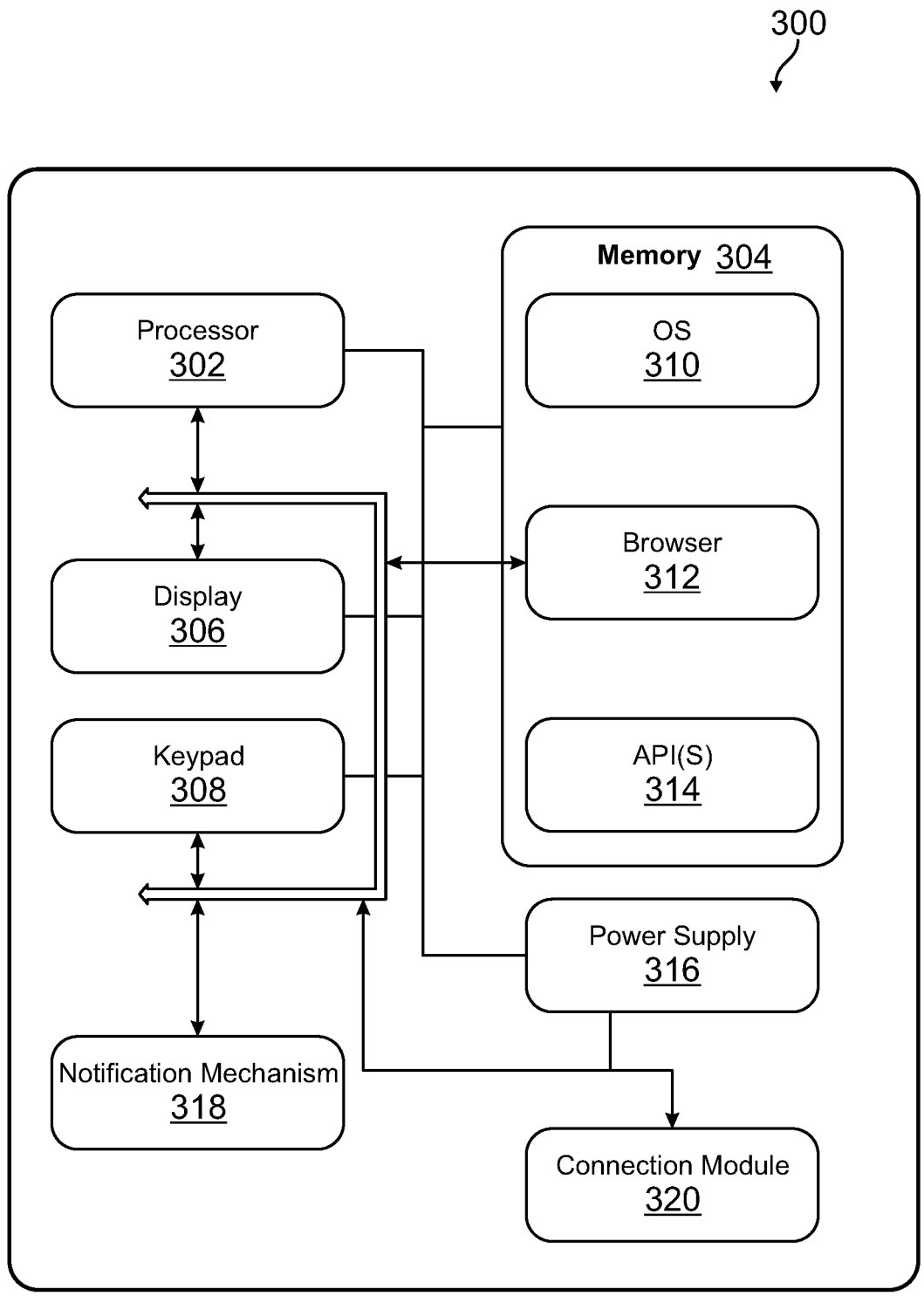
FIG. 3 is a block diagram of an exemplary computing device for accessing the online social and collaborative commerce system in accordance with one aspect of the present disclosure.

FIG. 3 is a block diagram of an exemplary computing device 300 for accessing the online social and collaborative commerce system in accordance with one aspect of the present disclosure. The hostess terminal, stylist terminal, and guest terminals may be in the form of a computing device 300, but may take other configurations as well. The hardware/software description provided below is for purposes of illustration and should not be construed as limiting.

In typical embodiments, the computing device 300 may have a processor 302 for implementing logic, a memory 304, a display 306 and a keypad 308. The display 306 of the device 300 may be a liquid crystal display (LCD), or any other type of display commonly used in devices 300. The display 306 may be touch-sensitive and may act as an input device. The keypad 308 may be a push button numeric dialing pad (such as on a typical telephone), a multi-key keyboard (such as a conventional keyboard), or any other device for inputting textual data.

The memory 304 generally includes both volatile memory (e.g., RAM) and non-volatile memory (e.g., ROM, Flash Memory, or the like). The non-volatile portion of the memory 304 may be used to store persistent information which should not be lost when the device 300 is powered down. The device 300 may include an operating system (OS) 310, such as Windows CE™ or Windows Mobile™ available from Microsoft Corporation, Android™ from Google, other desktop OS, such as Linux™ or Microsoft Windows®, or the like. The OS may reside in the memory 304 and be executed on the processor 302.

The memory 304 may also include one or more browsers 312 that may run on top of the OS 310. As previously described, the browser 312 may be a client software program that runs with a web server or other Internet server and enables a user to navigate the World Wide Web (WWW) to access and display data. The browser 312 may be built on the concept of hyperlinks on which a user may click with a mouse to jump from page to page, document to document, or even site to site. Browsers 312 may download files, display graphics, play audio and video files, and execute programs.

The memory 304 may also include a collection of one or more APIs 314 for facilitating wireless communication between the device 300 and one or more remote input/output (I/O) devices. The APIs 314 may be invoked by the browser 314 to communicate with the online social and collaborative commerce system. In this manner, the device 300 is able to take advantage of services or functionalities of the one or more remote I/O devices.

The device 300 may also include a power supply 316, which may be implemented as one or more batteries, fuel cells, or other sources of electrical power. The power supply 316 might further include an external power source, such as an AC adapter or a powered docking cradle that supplements or recharges the batteries. The device 300 may include one or more audio, visual, and/or vibratory notification mechanisms 318. The computing device 300 may also include a connection module 320, such as a WiFi® module that facilitates wireless connectivity. The connection module 320 may also be a wireline communication. This may be connected into the communication network as described above that may facilitate communications between the online social and collaborative commerce system.

Figure 4:
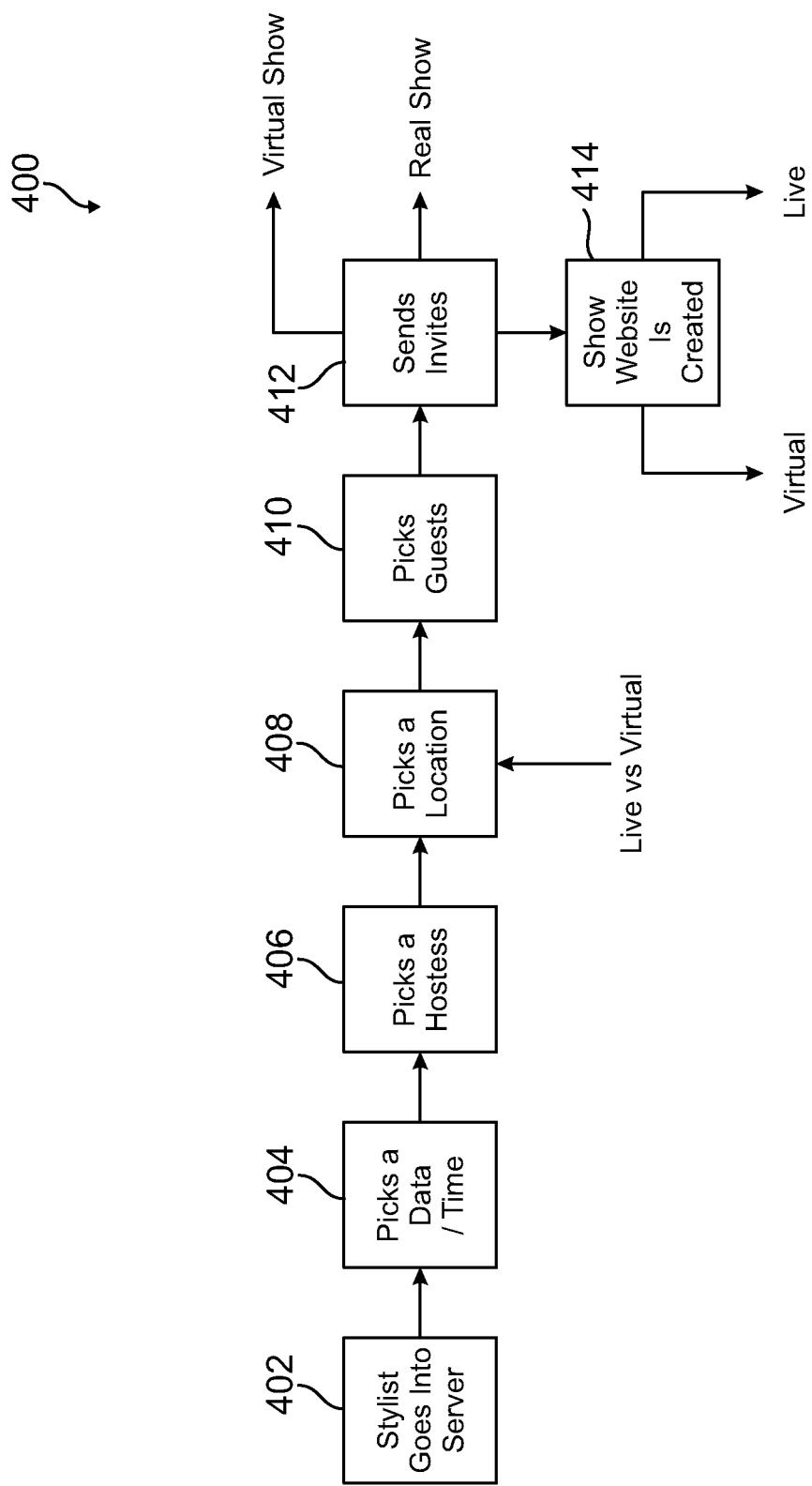
FIG. 4 is a flow chart depicting illustrative processes for establishing the online social and collaborative commerce system in accordance with one aspect of the present disclosure.

FIG. 4 is a flow chart depicting illustrative processes 400 for establishing the online social and collaborative commerce system in accordance with one aspect of the present disclosure. Each virtual live experience that is established may include its own website or individualized page for that specific direct selling event. The system may provide varying capabilities adapted to a wide range of skill levels.

The virtual live experience may adapt to varying skill levels of the stylist. For example, and for purposes of illustration, an experienced stylist may be characterized with one who has been with the company over a number of years, knowledgably about the systems, have a good network, proficient at storytelling, and understand their statistics. Advantageously, the goal of the system may be to make sales easier, expand networks of the hostess and guests, attract new customers, and team build.

For newer stylists, in the alternative, the purpose of the system may be to give them brand experience, make the virtual show platform look intriguing, host more shows, connect to virtual show platforms, reinforce the value of the relationship aspects (chat, webcams, interactions), provide the ability to share with wisdom, and tap into their network and their willingness to talk about it (referrals and social media sharing). The newer stylist may only be experienced in retail shopping, and not understand their role fully. The system may provide this stylist with tools to help support themselves and for quickly and easily answering questions.

The processes 400 may begin at block 402 where the stylist may access the web server through the browser located on their terminal. The stylist may connect into the website where the web server may communicate back and forth with the stylist through a series of webpages. At block 404, and in one of the webpages, the stylist may pick or enter in a date and time of the virtual live experience for the direct selling event. While the stylist is shown to commence the event, the hostess may also initiate it. In this example, the stylist may post their time availability in a calendar for the hostess to select.

At block 406, the stylist may pick a hostess. The stylist may chose a hostess, for example, if they worked with one another in the past. Sales amounts in the hostess' previous events may be indicated by their name. Alternatively, the stylist may be randomly paired with a hostess. Prospective hostesses and customers may be paired with stylists based on a stylist criteria and geo location data. The customer may fill out a profile that allows the stylist to better find clothing matches for that customer. Ratings, reviews or other information may be displayed by the stylist for the hostess/customer to view such that the hostess may make their decision.

In one illustrative example, the stylist or hostess may be associated with a certain style. These styles may be, but are not limited to, vintage, artsy, casual, grunge, chic, bohemian, or exotic. The online social and collaborative commerce system may match a hostess who had a particular style that was congruent with the stylist. Through style matchings, the stylist and hostess may be a better fit for one another. As such, the hostess may fit their needs of their customers with a particular stylist.

At block 408, the stylist or hostess may pick a location to host the direct selling event. This may be live and in person at the host's house or other non-traditional retail location. Alternatively, the virtual live experience may be chosen. A webpage may be instantiated in the system with created video bridges between the stylist terminal, hostess terminal, and at least one guest terminal.

If the hostess initiates the direct selling event, the online social and collaborative commerce system may notify the stylist that a time request has been made and their services are needed. Typically, the stylists, hostesses and customers are assigned to one another.

The stylist and hostess may engage one another outside the system regardless of who initiated the direct selling event. The system may check for information within a contact manager such that the information between the hostess and stylist are exchanged. They may engage one another through the system, but do not necessarily have to. The system would provide a pre-show phase where they may communicate with one another about the event. A show page URL, as described above, may also be implemented to facilitate these functions.

At block 410, the hostess may pick guests to invite to the direct selling event. If the hostess and stylist chose a vintage style, guests who are interested in this style may be chosen. Guest preferences may be entered into the system. In addition, or separate therefrom, guest preferences may be learned. Preferences may be determined based on which websites a guest visits, what they have purchased, geographic location, or the like. Preferably, preferences are based on profile, purchase history and favorites. Preferences may not be solely based on clothing which was purchased, but may be based on other non-related factors such as the types of food they purchase, their profession, or their social networks, for example.

In one embodiment, guests may be active in obtaining an invite to the direct selling event. This may include making reservations through the website or placing their name within the system. Guest emails or texts received at the system may automatically be processed and an invite may be sent.

At block 412, the system may send invites to those guests who were selected. The stylist or hostess may send invitations via a URL. The invitation may be sent through the web server of the system. Information about the event may be automatically populated within the invitation. The invitation may indicate whether it is a virtual show and that it may be hosted within the system, or outside of the system as in a live show at the hostess house in a non-traditional format.

Text messaging invites may be sent for the direct selling event. In addition, social media sites may broadcast the event. The invitation may take the guest to a show page of the virtual live experience. Before entering, the guests may be required to provide authentication information to access the show page such as an email address and password. The guests may be provided with marketing campaigns about the goals of the company that is hosting the event.

The show page or website may be created at block 414. The show website may provide a top list of things to do before the show begins. For example, the guests may be encouraged to explore previous shows or clothing/accessory options. A countdown clock may be used to inform the stylist, guest and hostess when the event will begin. The stylist and hostess pictures, or avatars, may be shown. Chat rooms may be displayed on a separate panel. Sneak peek video may also be provided. This video may be created by the hostess or stylist, or may be generated by the company hosting the event. A personal appointment or private chat may be requested or given through the system.

On the day of the show, the stylist may begin live streaming on their own webcam. This input may be from a dedicated device on the computing device or may be on a separate higher grade camera or video recorder. During the show, the stylist may use their chat functions.

During the actual show, which may be for an hour in duration, for example, videos may be streamed and played on the guest terminals. A carousel of products or services may be displayed in tandem with the video. The guest may select their favorites in this particular case and in other parts of the application and in other scenarios, the stylist may assign favorites. The stylist may be given a body type, or the like, to determine how to provide a perfect style for the guest.

In one example of the virtual live experience for the direct selling event, a single guest may be invited. The direct selling event may be at the personal request of the guest. The system may not match them in this scenario. In this case, the hostess may have a pre-existing relationship with the stylist. If they do not, they are matched geographically. A hostess may be involved such that introductions may be made.

Purchasing of the products or services may be enabled through the online social and collaborative commerce system while the virtual show is being performed, or afterwards. In a non-limiting example, the guest may select the item on the carousel or click on the item in the video to purchase it. A price may be displayed as a pop up or elsewhere after the product or service is clicked within the carousel. Shipping information may also be displayed along with local and state taxes, for a total purchase cost. Pre-stored payment information may be within the system facilitating a quick purchase. Alternatively, a checkout process may be given at the end of the virtual live experience. When a product or service is purchased, they may be sent immediately similar to a retail order.

For those who were not originally invited to the virtual live experience, guests may be given access into the show if permission is received from the hostess and stylist. Other guests may also invite new guests into the show as long as there is capacity. The capacity for the number of guests in the show may vary. Some stylist are more experienced and may handle many more guests than those that are newer to the system. This may be built into the system which allows more experienced stylist to host more guests.

After the show, the chat rooms within the website may remain open. The stylist and hostess may answer questions or concerns. The guests may also replay previous videos that were presented during the show. The carousel may be displayed having products or services within the video, or the entire collection may be presented within all of the videos. Guests may save clips of specific videos that they wish to view again during the actual show to play again after the show. These may be viewed by the stylist, hostess or other guests.

In one embodiment, the guest may "favorite" or "like" products or services, but do not necessarily have to purchase them during the virtual live experience. Emails or text information may be sent regarding these products or services that have not been purchased by the guest. Reminders regarding these items may be given periodically for a period of time, for example 3 months, after the show has ended. The guest may be given an update if the items were to go on sale. Updates may also be provided if the item may be or has been discontinued or whether there is a low inventory regarding the product or service.

The stylist or hostess may end the virtual show session. In an example, the show may automatically end when no other guests are within the virtual show. The stylist or hostess may enable a new session for the same virtual show for multiple dates. If a participant tries to re-enter the show after the virtual show has ended, the system may indicate on their terminal that the show has ended and contact information about the hostess or stylist may be given.

Figure 5:
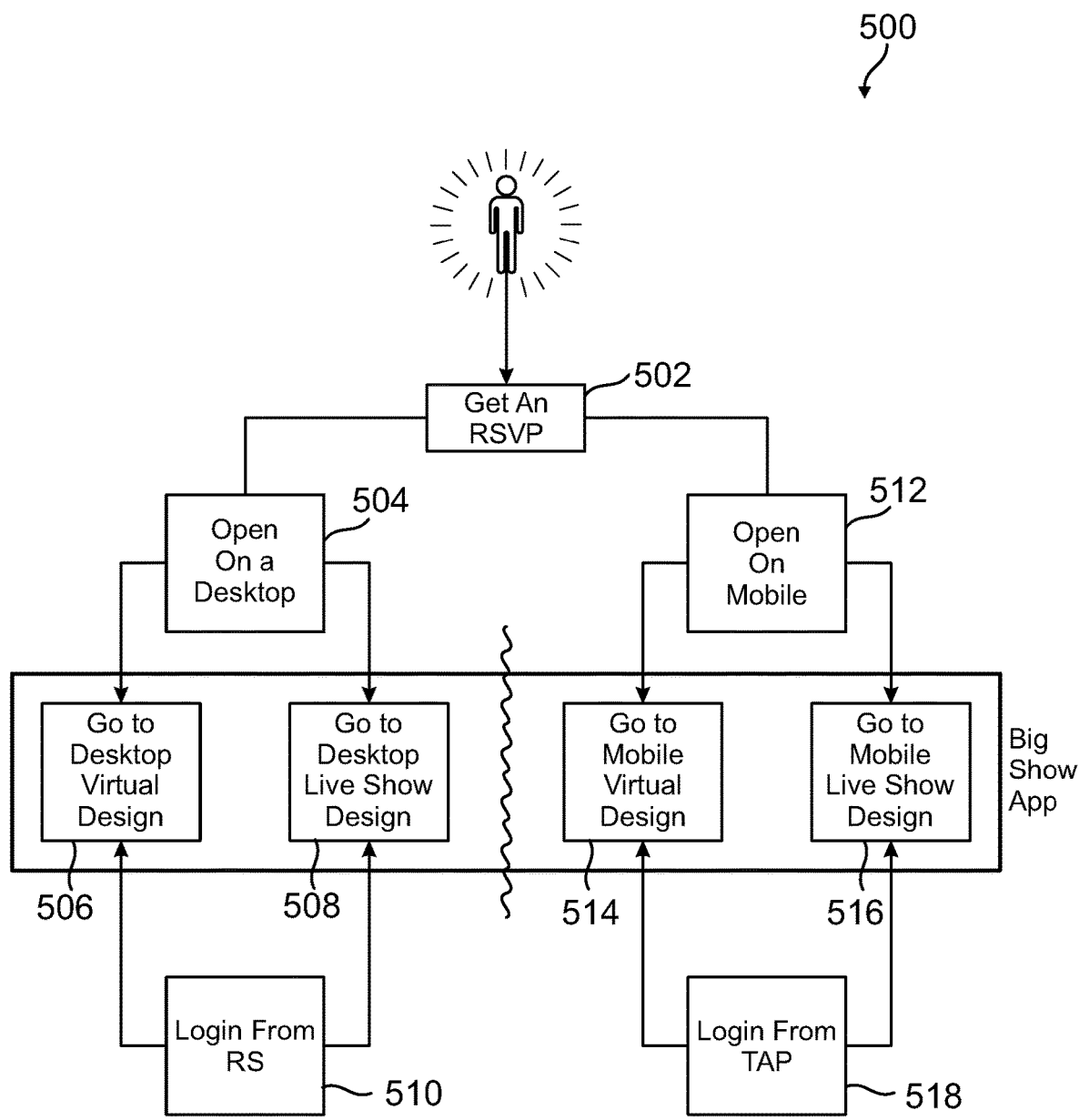
FIG. 5 is a flow chart depicting illustrative processes for connecting to the online social and collaborative commerce system through a desktop or mobile device in accordance with one aspect of the present disclosure.

FIG. 5 is a flow chart depicting illustrative processes 500 for connecting to the online social and collaborative commerce system through a desktop or mobile device in accordance with one aspect of the present disclosure. Depending on the computing device the user may enter through different variations of the virtual live experience for the direct selling event. The processes may begin at block 502 where an RSVP is received by the guests.

At block 504, the system may determine that the user has opened the RSVP on their desktop. In a non-limiting example, a userAgent object method may give browser details in a plain text format. A determination may be made whether the show is virtual or live on the desktop computing device. At block 506, the desktop may provide the virtual live experience as a virtual design. Otherwise, the desktop may go to a live show design at block 508. The user may log in from RS at block 510.

Oppositely, and when a determination is made that the user is accessing the website through a mobile device at block 512, the website may be opened in a mobile device format. This may again be determined through the userAgent object, for example. A determination may be made whether the show is virtual or live on the mobile computing device. At block 514, the show may go to a mobile virtual design when determined to be in a virtual format. Otherwise, at block 516, the show may go to a mobile live show design. At block 518, the user may login from TAP.

Figure 6A:
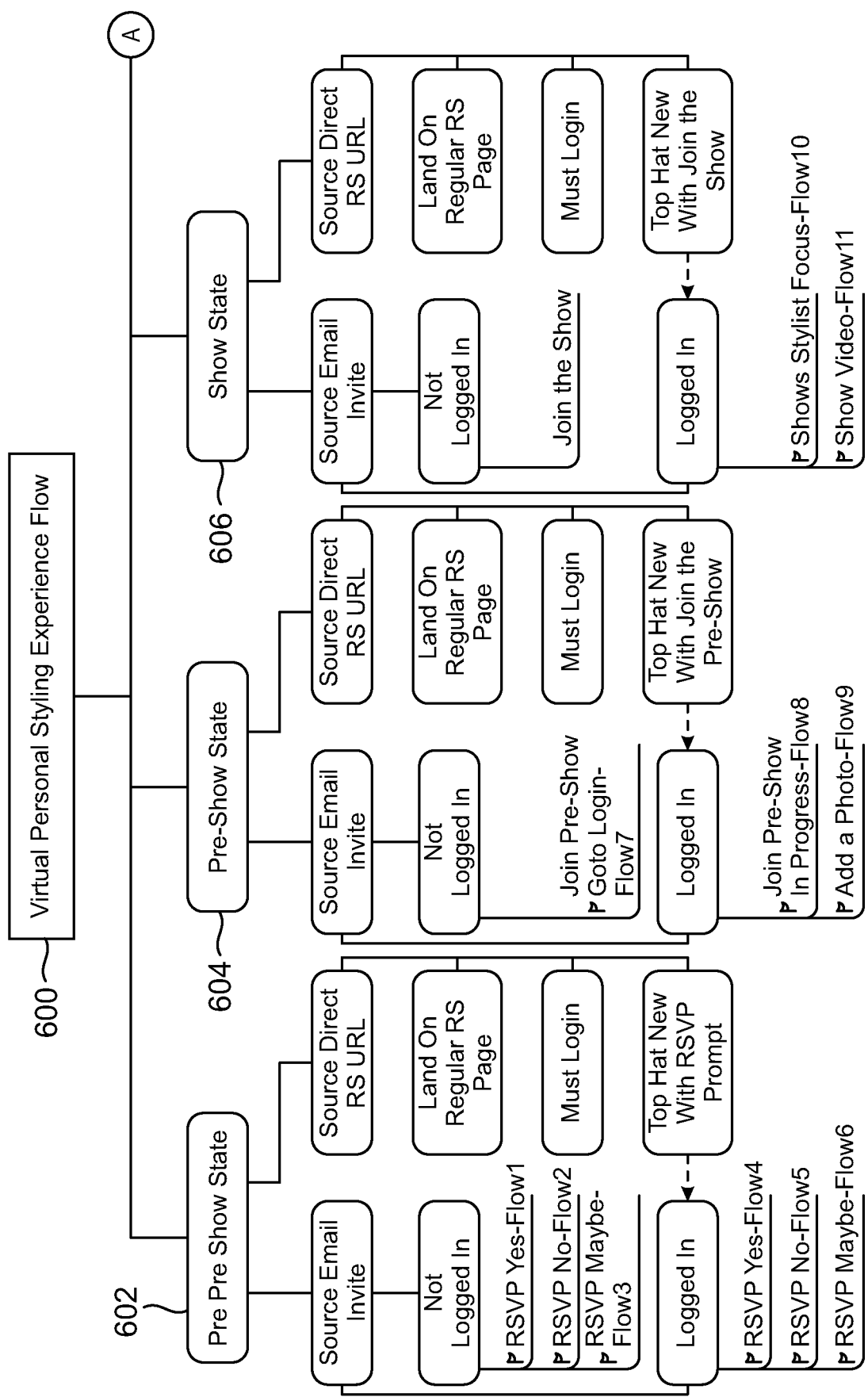
FIGS. 6A and 6B is an exemplary chart depicting a virtual live experience flow in accordance with one aspect of the present disclosure.
Figure 6B:
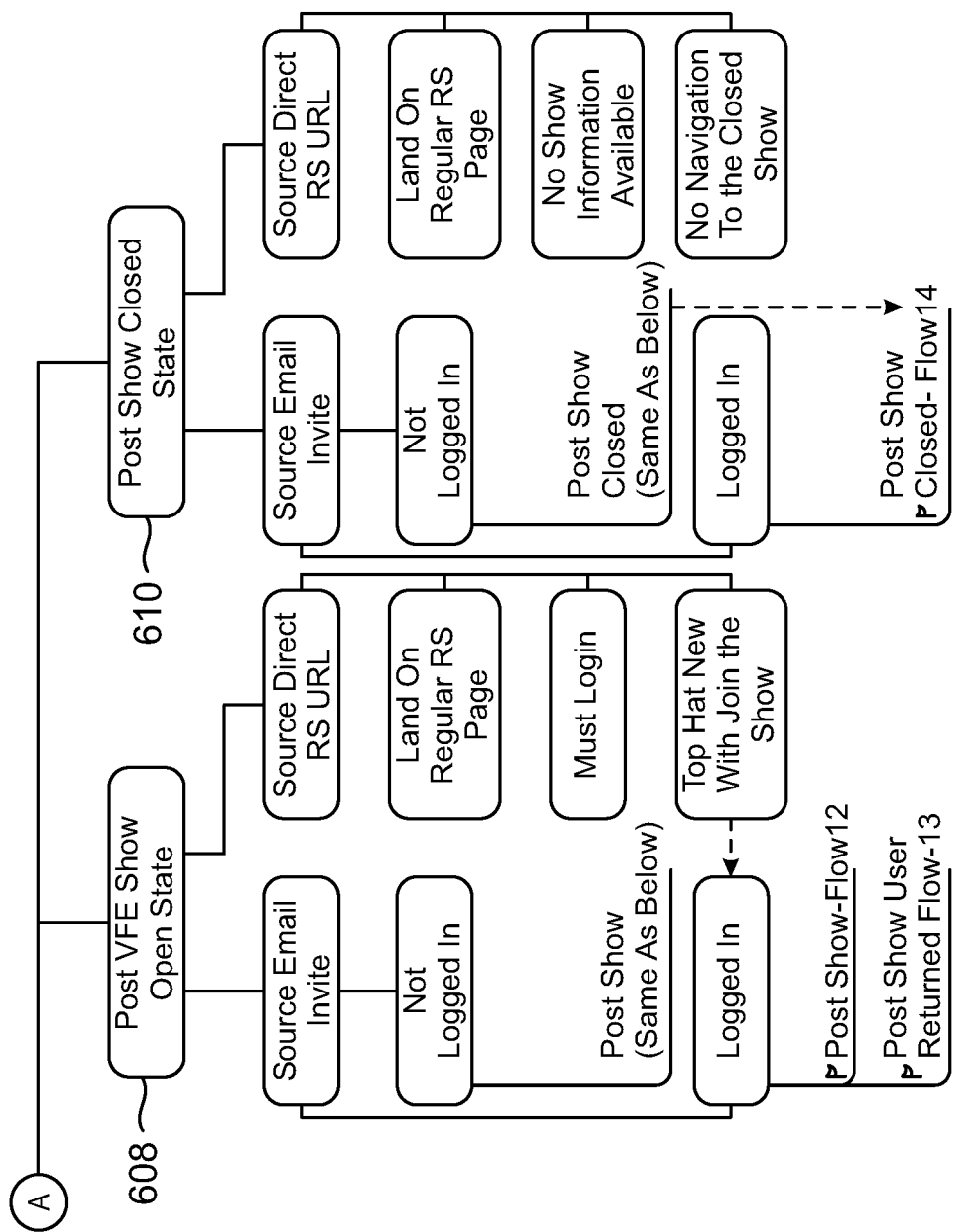

With reference now to FIGS. 6A and 6B, an exemplary chart 600 depicting the virtual live experience flow in accordance with one aspect of the present disclosure is provided. A number of show states will be provided, but they should not be construed as limiting the scope of the present disclosure. The show may begin with a pre pre-show state 602. This state 602 may begin through two sources. The pre pre-show state 602 may begin when a participant receives an email invite or a direct RS URL. When the direct RS URL is received, the participant may land on a regular RS page where they may login. A navigation screen may be provided once the user enters and logs in to the website or webpage. In one embodiment, the pre pre-show state 602 may allow stylist and hostess to communicate with one another about setting up the direct selling event.

Following the pre pre-show state 602 may be the pre-show state 604. The participant may enter in through two sources similar to before. That is, an email invite and a direct RS URL may be given. In one example, the show states 602 and 604 may be limited to the hostess and stylist. It may also be opened up to guests with or without restricted access. During these show states 602 and 604, information may be placed in such as videos, preferences, avatars, or the like.

Following the pre-show states 602 and 604, the show state 606 may begin. The source may be the email invite or the direct RS URL. The show state 606 may actuate the virtual live experience for the direct selling event. This may include implementing the video bridge along with the backend functions of the system.

A post show open state 608 may be activated after the show ends. The source may be the email invite or the direct RS URL. Alternatively, the participant may be automatically sent into the post show open state 608. The guests may perform a number of tasks during this state 608. For example, any items that were tagged as "like" or "favorite" may be purchased at this time. Other functions or features will become apparent from the description provided below.

After the show ends, a post show closed state 610 is enabled. The source may be the email invite or the direct RS URL. Alternatively, control may be provided automatically after the post show open state 608 ends. During this state 610, guests may be allowed to review their purchases, add additional purchases, or the like. Feedback or reviews may be given on their experience. Feedback may be used to enhance the virtual live experience.

Through the virtual live experience flow 600, key processes may be setup that include: setting up the show; inviting hostess and guests; conducting the show; introduction to the product or service line; demonstration or fashion show; discussion of philanthropic endeavors; discussion of business opportunities; try on and discussion of the product or service options; fashion or styling tips and recommendations; shopping during the show; check out the show; wrapping up and good byes; shopping after the show; and stylist post show follow ups.

Below, a number of screenshots will be provided showing a flow of the virtual live experience for the direct selling event. The screenshots may illustrate typical portals for the stylist, hostess and guest. When appropriate, flow charts are provided to clarify or expand on concepts presented within the screenshots. Portals for the stylist and guests will be presented first and then a hostess portal will then be provided.

Figure 7:
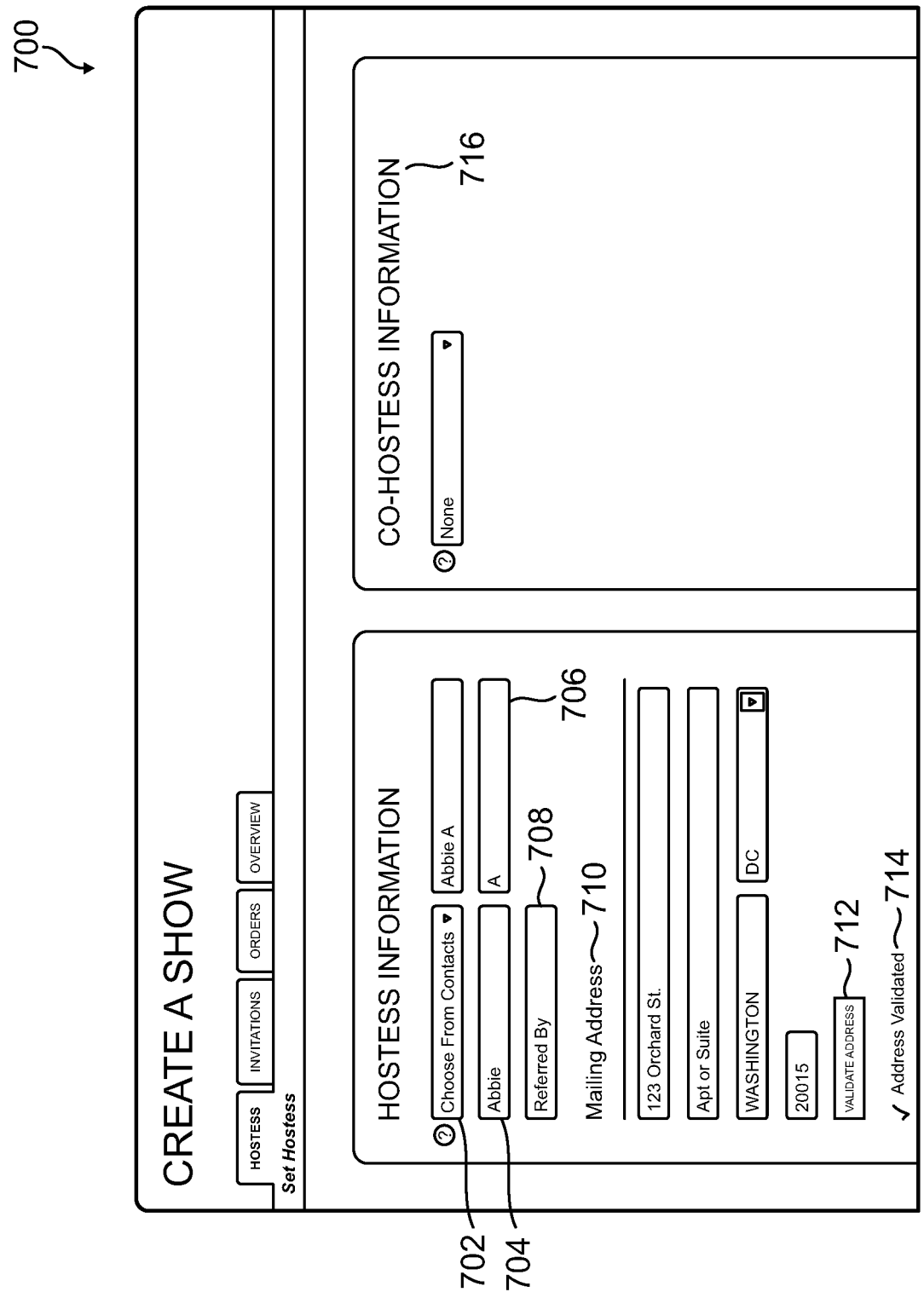
FIG. 7 is an exemplary screenshot for creating a virtual live experience in accordance with one aspect of the present disclosure.

With reference to FIG. 7, an exemplary screenshot 700 for creating a virtual live experience in accordance with one aspect of the present disclosure is provided. The stylist may create a show and select the hostess for the virtual live experience. The stylist may create a show by entering the hostess that they wish to work with. Typically, the hostess may be a medium between the guests and the stylist where the hostess provides contacts for the event. The hostess may monitor the guests and provide an introduction to the stylist, with the stylist providing their unique fashion sense.

The hostess may be selected from the stylist's contacts. In a non-limiting example, a scroll down menu 702 may be pulled down to show a list of hostesses. The hostesses may be imported from social networks or graphs, personal information, or contacts, for example. The hostess may be selected based on their connections. The hostesses may be chosen from previous work or styles that match with the particular stylist. Both the stylist and the hostess may have a particular genre. Stylists may select the hostess based on their ability to generate revenue. Other factors may be used, and are not limited to those described above for the stylist to select a hostess.

In the screenshot 700, another method for entering a hostess is provided. The stylist may enter in a first name 704 and last name 706 of the hostess. The information may be automatically populated. In an example, if the stylist enters in "Ma" for the first name 704, the website may be automatically fill in "Mark" if the user selects auto populate. The last name 706 may also be automatically filed in. This may be dependent on the first name 704 such that if there is only one or a few last names associated with a first name 704, then that information for the last name 706 may be automatically be populated with or without a typed in letter.

The stylist may enter a name into a "Referred By" entry 708. The entry 708 may allow a referring party to get credit. In an example, the hostess may be referred by another hostess such that the current hostess is more in line with the fashion for this particular hostess and their guests. A small amount or credit may be given for every purchase made in the virtual live experience to the referring stylist. The referring party may be someone other than a stylist, for example, a friend, guest, or other hostess.

A mailing address 710 within the screenshot 700 may be automatically populated when a hostess is selected. If the address of the hostess cannot be located within the system's database, the stylist may enter the address of the hostess through a manual entry. The mailing address 710 may also be requested from the hostess once selected by the stylist. For example, an email would be sent to the hostess and then the hostess may provide this information.

A validation address button or actuator 712 may be used to determine whether a correct address has been entered in. This may use a third party source to validate the address. By entering in the information of the hostess, samples of the products or services may be sent to their address. A check mark 714 may be displayed once the address has been verified.

Co-hostess information 716 may be provided in situations where more than one hostess is used for the direct selling event. Multiple hostess may be used when it is a large gathering of guests. Similarly, multiple stylist may be part of the same show. Similar features for entering in the co-hostess information 716 may be used as described above. Breakout rooms for stylists and specific individuals may also be integrated into the virtual live experience.

FIG. 8 is an exemplary screenshot 800 showing entry of parameters for the virtual styling show in accordance with one aspect of the present disclosure. This screenshot 800 may be configured in a number of different formats and is not limited to that shown. A show may be created by a show type 802 and show date and time 804. The show type 802 may indicate a physical show or virtual show. The physical show may include for example a home show. The system may facilitate these types of events such as having the hostess enter in the location of where the physical show will take place. Special instructions may be further given in the physical show, for example, activating a special passcode if the show were to take place in a gated community. This passcode may be provided for a temporary period.

Another show type 802 is the virtual or virtual live experience. The system may create a specific webpage or website when selected. The show date and time 804 may be entered in to create a show. The stylist may enter in a date at a top portion. When selected, a calendar may be displayed such that the stylist may scroll by days, months and years.

A time zone and start time may be entered in within the show date and time 804. The start time may be required but the end time may be left blank to start the show. The stylist may select shipping options to the hostess.

The stylist may wish to ship guest orders to the hostess for free or may want to ship guests their orders directly for a nominal shipping fee. For purposes of illustration, the stylist may select "Yes, I'd like to allow free shipping to the hostess" or "No, I don't want to allow free shipping to the Hostess". A shipping address may be required. This may be the same as a hostess shipping address. If "Other" is selected, the stylist may enter in an address manually.

Figure 9:
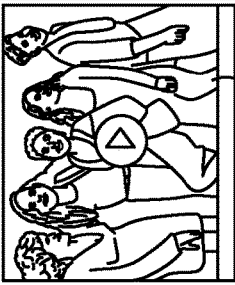
FIG. 9 is an exemplary screenshot showing a creation of a hostess invite for the virtual live experience show in accordance with one aspect of the present disclosure.

FIG. 9 is an exemplary screenshot 900 showing a creation of a hostess invite for the virtual live experience in accordance with one aspect of the present disclosure. A "Hostess Invite" email 902 may be provided. The hostess information may be populated automatically within the email 902 using the information previously entered in by the stylist. The hostess invite may also be sent through other communication mediums, such as, text messaging.

The email 902 may be filled with a pre-populated message. This message may include, "I am looking forward to your Virtual Fashion Experience. I just know your friends are going to love our gorgeous collection! Below is your login information to access the Online Hostess Planner, which will make inviting your friends and keeping track of RSVP's a breeze". This may be from the stylist to the hostess. A carbon copy option may be provided.

Template images 904 may be used. The images 904 may be embedded into the email 902 or linked. The images 904 may be in the form of a video advertisement. In a non-limiting example, when an icon for the images 904 is selected, the user may be given a number of options that provide various advertisements to the virtual live experience for the direct selling event. Different advertisement genres may be selected to appeal to that particular hostess and their guests.

FIG. 10 is an exemplary screenshot 1000 showing a stylist portal for inviting guest to the virtual live experience in accordance with one aspect of the present disclosure. For purposes of illustration, the screenshot 1000 may include a top portion 1002, left portion 1004 and a right portion 1006. Other configurations may be used with fewer or more functionalities.

The top portion 1002 may include a pull down menu. Using this menu, guests from different contacts may be retrieved. For example, the stylist may pull up the "My Contact Manager" through the pull down menu. The stylist may begin typing in a box right of the pull down menu. The box may be auto-populated based on the names within the "My Contact Manager" when the user enters in text. Pressing a "New Contact" button may bring that particular contact down to a guest list below. Other guests may be associated with options through the pull-down menu. For example, "Personal Contacts" may be an option within the pull down menu. This would retrieve potential guests from the hostess' smartphone or where they store their contact list.

In the top portion 1002 may also be a drop down menu to search for guests of a previous show. The previous show may have been live or virtual. In a non-limiting example, the hostess may search by selecting "All Shows" or search by a particular season such as "Spring '20". A show date range may also be selected with a beginning and end date. Once the end date is selected, the guest list may automatically be populated with guests who were part of the shows within those particular dates.

On a bottom left portion 1004 of the screenshot 1000, the potential guest list is shown. This collection area of potential guests may be retrieved as described above. Information about the potential guests may be depicted, for example, their city and state may be given. An unsubscribed or subscribed column may indicate whether the potential guest has subscribed or is interested in this particular clothing line for this season. The potential guest may have selected an option in their personal profile to indicate their subscription. A "VS Guest" column may indicate that the potential guest is already a guest within the virtual live experience for this particular direct selling event.

In one embodiment, guests who are often favorites of a particular hostess may automatically be populated. This information may be stored within the online social and collaborative commerce system or on the hostess terminal. A favorite guest of the hostess may be defined as one who has attended a hostess' direct selling events frequently and spent a certain threshold amount or purchased above a specific quantity. The hostess, alternatively, may mark guests as their favorites based on their own subjective criteria.

Other information on the left panel 1004 for each guest may include how much money was spent in their previous order. This may have been within a previously attended live or virtual show. An action column may allow the stylist to switch the potential guest to a guest who will get an invite to the virtual live experience. A simple plus sign may be used to add in the guest. If the guest has already been added in, the section would indicate "Added".

On the right portion 1006 in the screenshot 100 of the hostess portal, guests who may receive an invite are shown. A minus sign in this portion by the guest may be used to remove them from the guest list. Information about the particular guest may be shared with the hostess in accordance with one embodiment. When selected, the guest list may be sent via a communication (such as email or text) to the hostess in a desired format. Information regarding the guests in the guest list may include, but is not limited to, guest profile information, their address, phone numbers, or the like.

Figure 11:
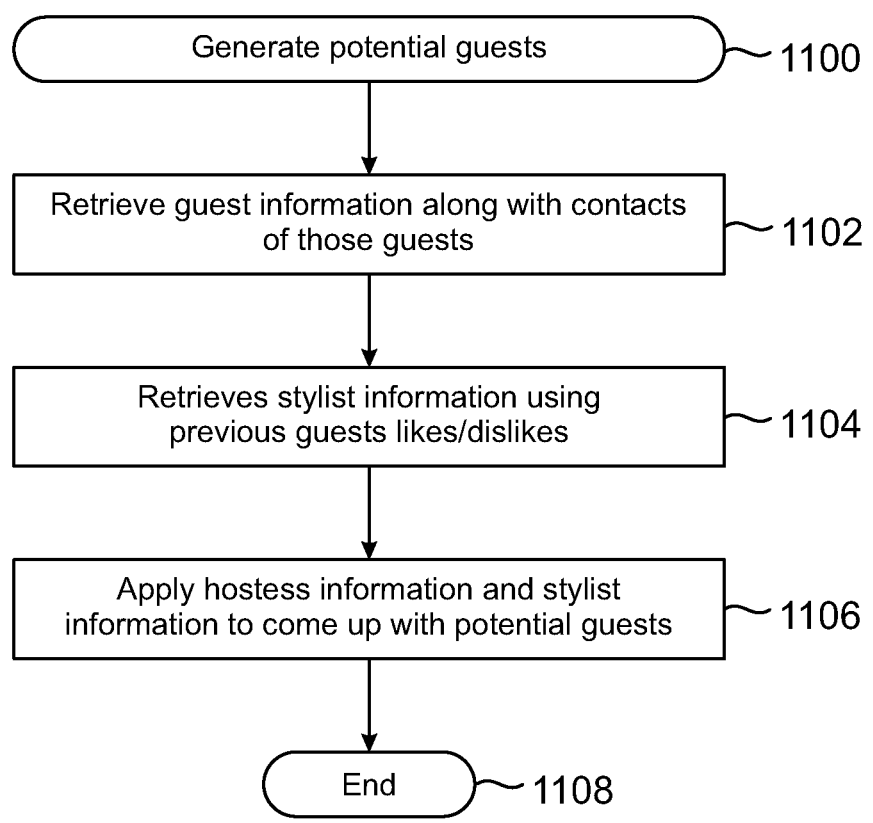
FIG. 11 is an illustrative flow chart showing processes for generating potential guests for the virtual live experience show in accordance with one aspect of the present disclosure.

With reference to FIG. 11, an illustrative flow chart showing processes for generating potential guests for the virtual live experience in accordance with one aspect of the present disclosure is provided. The guest list may be automatically pre-populated with the hostess' contacts or may be pulled from previous direct selling events. Alternatively, and for example, the guests may be populated using logic processes. These processes may begin at block 1100.

At block 1102, information about guests may be retrieved along with contacts of those guests. Nested discovery may be used to find potential guests that are separated by "N" degrees. In an example, social graphing may be used to determine potential guests by discovering those who are separated by 2 degrees from the hostess.

The system may retrieve information about a stylist including their previous guest likes and dislikes at block 1104. This information may provide valuable insight into whether a potential set of guests would be a good match for this stylist. In a non-limiting example, previous guests may complain that the stylist particular style was too chic. This information may be used to understand how the stylist operates, and further if they have been successful with particular groupings of guests.

At block 1106, the previously retrieved information from the guests and the stylist may be used to curtail those potential guests into a guest list. For example, the hostess information may have a number of potential guests but may not be a particular fit for this stylist based on their information and how the stylist presents themselves. The potential guest list would be tailored using this information. In an example, if a guest may need more handholding and a particular stylist does not wish to do this, then that guest may be eliminated from the virtual live experience. The potential guests may be paired down to retrieve a final guest list. The processes may end at block 1108.

FIG. 12 is an exemplary screenshot 1200 showing the stylist portal for generating an invitation for the virtual live experience in accordance with one aspect of the present disclosure. At a top portion 1202 of the screenshot 1200, invites may be sent to multiple guests identified with the guest list. The invite may come from the hostess or stylist. The hostess or stylist may select "All Guests" or "Remaining Guests". By selecting "All Guests", the invitation may be sent to those within the guest list regardless of whether they have been sent the invitation beforehand. When "Remaining Guests" is selected, those who have not received the invitation may get it. These options are correlated to the type of email being sent, for example, save the date, invite, reminder, and/or follow up. Guests may also be easily removed by clicking an "x" by their name. Checkboxes may be provided to CC the hostess and/or stylist.

On a bottom portion 1204 of the screenshot 1200, the invitation may be created. A separate program may be used to generate the invitation. Templates may be used with personal modifications or adjustments from the stylist or hostess. Videos or short clips may be provided or made within this area. When the invitation is ready to be sent, names of the guests may be automatically populated within it. These invitations may be sent via mail, or through electronic communications such as text or email.

Figure 13:
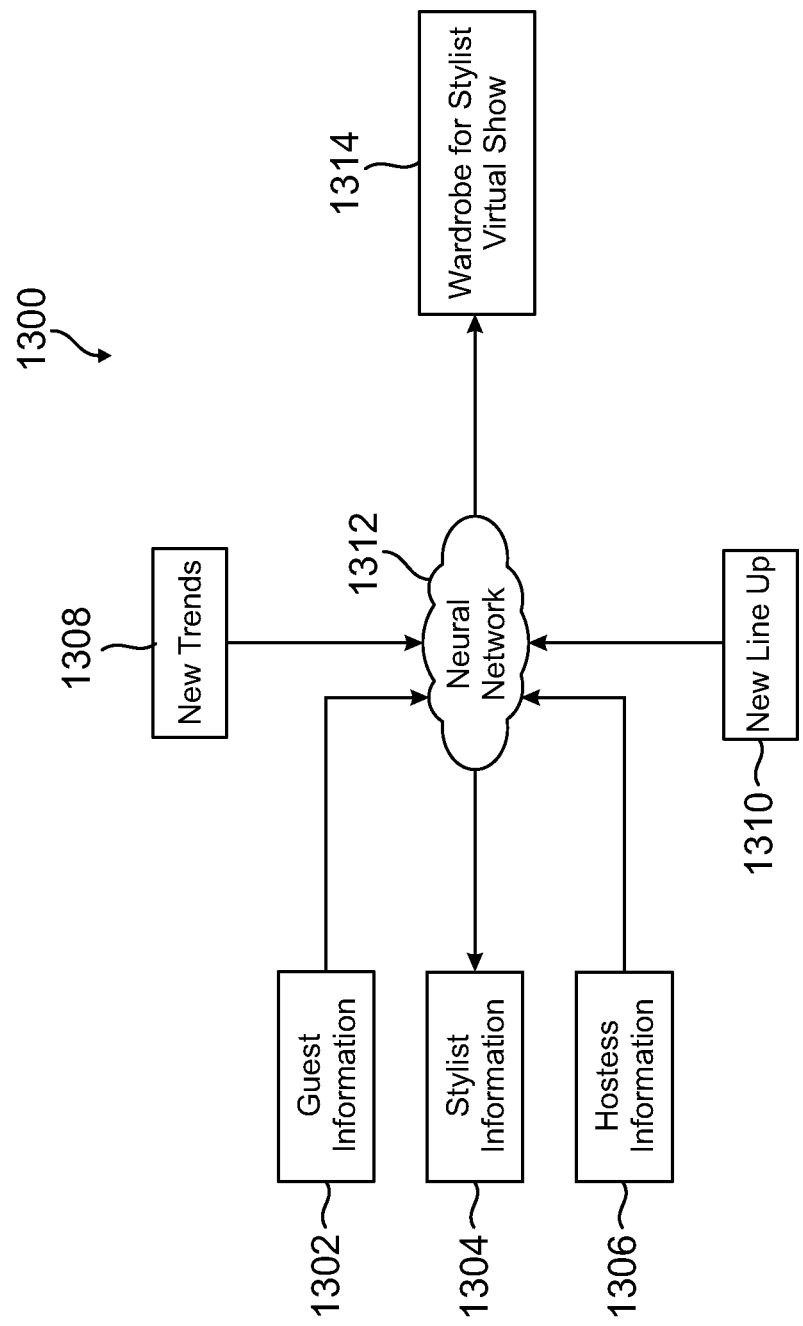
FIG. 13 is an exemplary block diagram depicting a neural network for defining potential wardrobes for the virtual live experience show in accordance with one aspect of the present disclosure.

FIG. 13 is an exemplary block diagram 1300 depicting a neural network 1312 for defining potential wardrobes for the VPS show in accordance with one aspect of the present disclosure. In any particular session, clothing lines may have hundreds if not thousands of garments and accessories. Inputs to the neural network 1312 may include guest information 1302, stylist information 1304, hostess information 1306, new trends information 1308, and new line up information 1310 to generate a wardrobe or wardrobes 1314 for the stylist virtual show.

Wardrobes 1314 may be configured from the neural network 1312 with machine learning and deep learning that provide artificial intelligence capabilities that may be utilized to build and maintain a naturalistic scheme. The wardrobes may be generated by information from various sources that may include, but are not limited to, the guest information 1302, stylist information 1304, hostess information 1306, new trends information 1308, and new line up information 1310. These inputs may be utilized by the neural network 1312 to provide various functions, which may include, but may not be limited to computer vision, object classification, feature recognition, and multilayer perceptions. Customer recommendations may be the primary focus. Recommendations may be based on previous purchase history, favorites, current line, stylist recommendations etc.

Visual features from the guest information 1302, stylist information 1304, hostess information 1306, new trends information 1308, and new line up information 1310 may be extracted and associated with objects located within captured image frames. Specific stylized information may be then gathered and processed by the neural network 1312 to generate the wardrobe 1314.

Guest information 1302 may be preferences, past services or products purchased, or social information, for example. Guest information 1302 may come from a number of sources and places such as manually entered in information or automatically generated from previous shows or interactions.

Stylist information 1304, which was fed into the neural network 1312 to generate wardrobes 1314 may also be used. The stylist information may include past line ups and their hottest sellers as well as their lowest performers, for example. Hostess information 1306 may also be fed into the neural network 1312. This information may include, but not limited to, their previous guests likes and dislikes and hot sellers as well as their particular clothing that was shown during previous direct selling events, for example.

Other information for creating the wardrobe 1314 for the virtual live experience may include new trends information 1308. New trends may be understood by the neural network 1312. New line up information 1310 for a particular company may also be taken in as input into the neural network 1312. Other information may be used and fed into the neural network 1312 to generate wardrobes 1314 that are in line with the information previously described.

The processes for using the neural network 1312 may include initially training the neural network 1312 to identify wardrobes to be presented by the stylist. This neural network 1312 may classify images of clothing and use them as examples to automatically infer rules for recognizing features. By increasing the number of training samples, the neural network 1312 may learn more about the features, and thus improving its accuracy for feature classifications. These feature classifications along with the training images may then be used by the neural network 1312 to generate wholly and entirely new wardrobes 1314 that the guests, stylists and hostess may find appealing from an upcoming collection.

In a non-limiting example, the wardrobe 1314 may be created using a style matrix, which may be formed by matching based upon an attribute. The neural network 1312 may understand that individual garment and accessories may be part of an outfit match set. In this way, the wardrobe 1314 may be a style recommendation to the guests. The goal of these recommendations may be twofold: (1) First to entice a customer to attend a show where they may see and try on these recommendations first hand; and (2) Second to influence a purchase decision based on value.

Thus, through the neural network 1312, wardrobe 1314 and outfit recommendations may use relevant information available. These recommendations may be presented to the customers directly and lead to high value sales opportunities for the stylist. The recommendations may be based on a most recent season style, guest selected favorite items as well as taking specific item rankings into consideration, previous purchases that refresh past season purchases by combining them with new current season items, guest profiles, sizing, style preferences, history and favorites. These elements may be combined and analyzed by the artificial intelligence engine to provide the most relevant and high value wardrobe recommendations for the end consumer while minimizing the effort by the stylist.

FIG. 14 is an exemplary screenshot 1400 providing an illustrative invitation to the virtual live experience in accordance with one aspect of the present disclosure. Through this invitation, guests may virtually attend a fashion experience by logging into the show and accessing the stylist's virtual showroom. The guests may see and hear each other as the stylist guides them through an online shopping experience complete with a high quality fashion show providing each customer with styling tips and personalize styling recommendation throughout. Customers may catch up with friends and help each other select outfits.

A link 1402 may be provided to access the show. Once selected, the guest may enter into their particular portal. A generalized invitation may be provided or a personalized message may be given along with information about the event. Specific macros may be embedded into the email such that the specific event may be stored in the user's calendar of preference.

Figure 15:
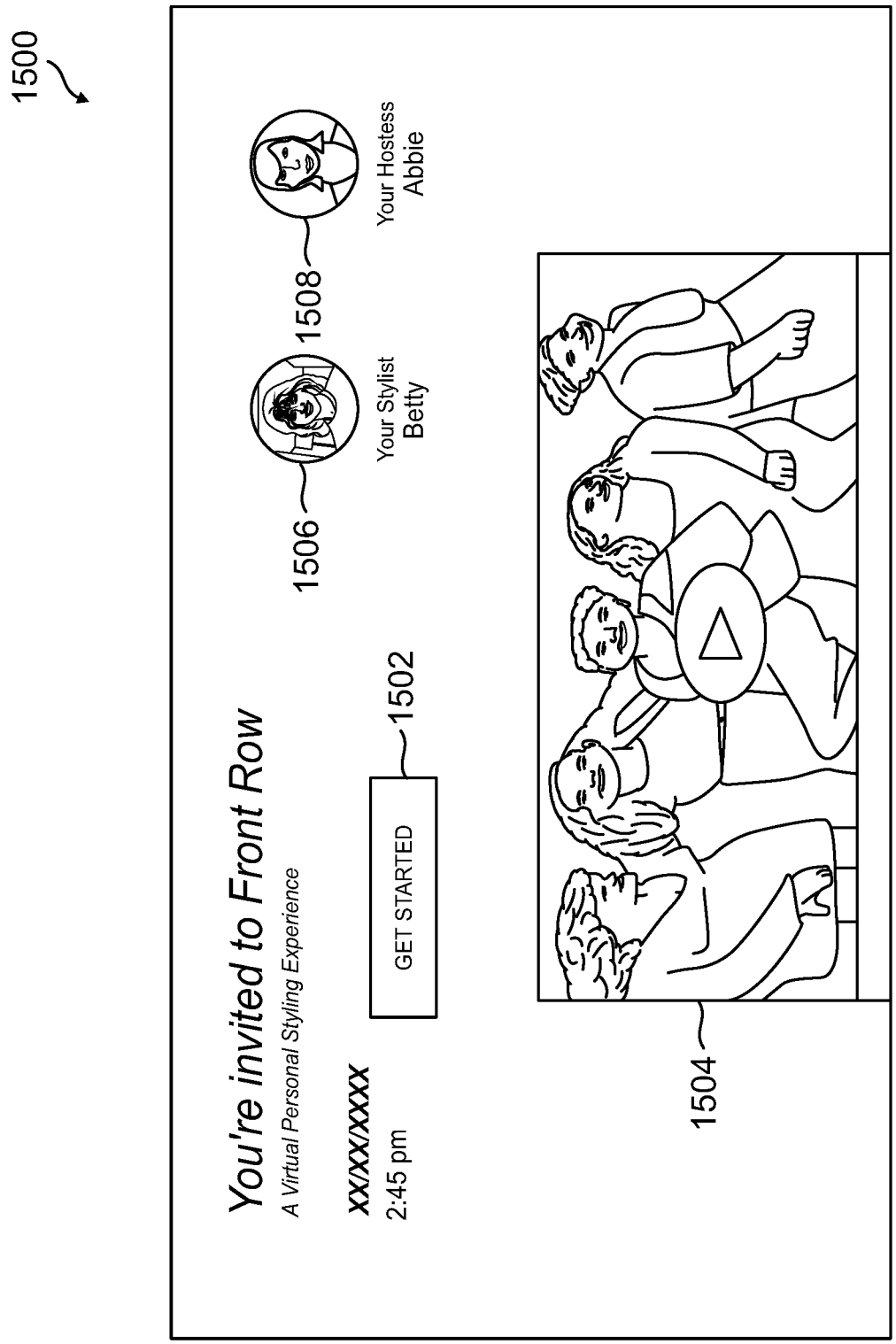
FIG. 15 is an exemplary screenshot depicting additional details for the illustrative invitation to the virtual live experience in accordance with one aspect of the present disclosure.

FIG. 15 is an exemplary screenshot 1500 depicting additional details for the illustrative invitation to the virtual live experience in accordance with one aspect of the present disclosure. This screenshot 1500 may be accessed after the link was selected. The date and time may be shown on the invite. Guests may be involved in the show process by providing suggestions such as what type of styles they would like to see.

A button 1502 for starting the show may be provided. This may allow the guest to enter into the show. If the show has not begun, the link may be inactive. An advertisement 1504 may be displayed to generate interest. The advertisement 1504 may be in the form of a video, clip, or other media. A stylist picture 1506 and hostess picture 1508 may be shown in the screenshot 1500.

Figure 16:
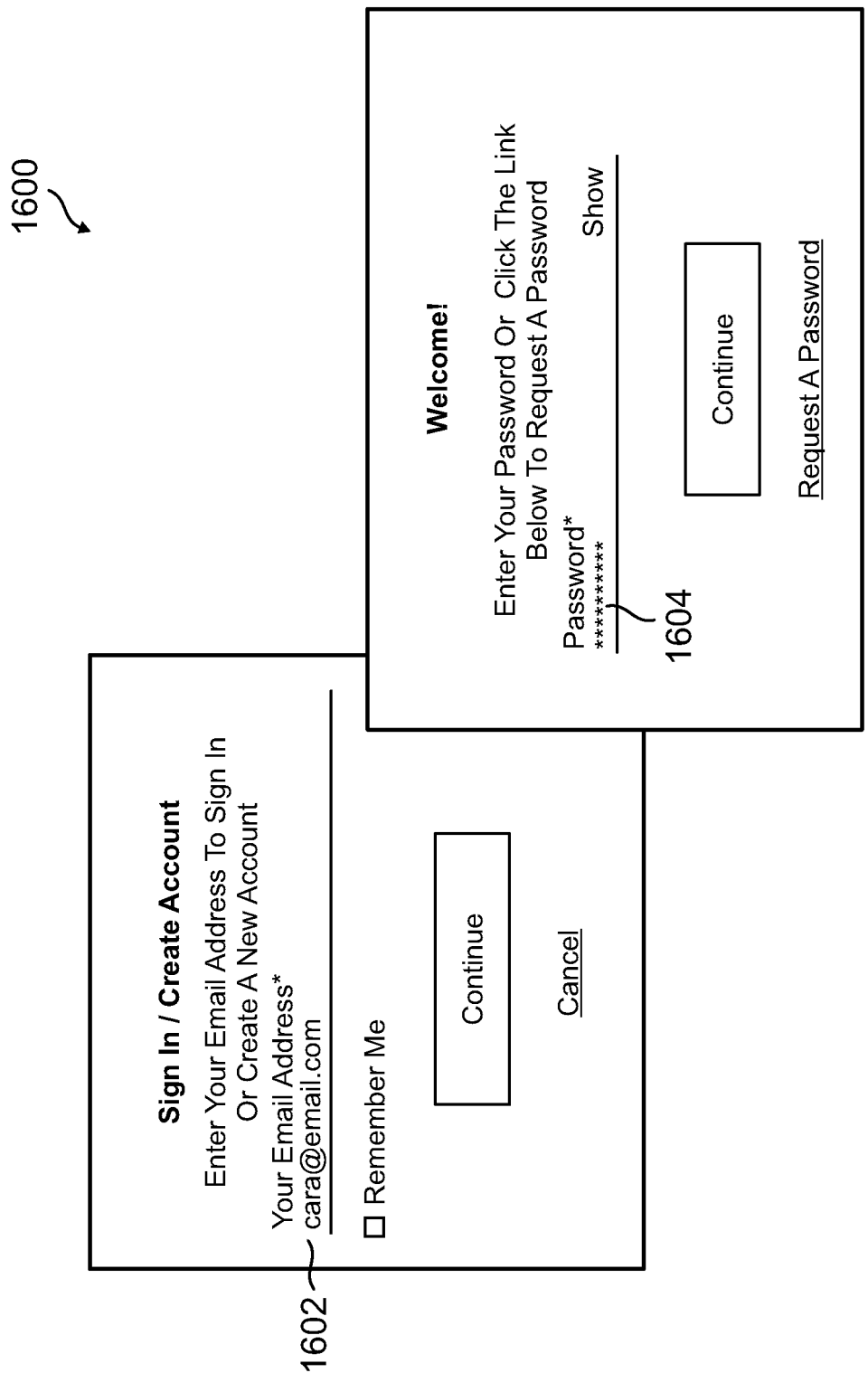
FIG. 16 is an exemplary screenshot showing an illustrative login sequence to the virtual live experience for a guest in accordance with one aspect of the present disclosure.

FIG. 16 is an exemplary screenshot 1600 showing an illustrative login sequence to the virtual live experience for a guest in accordance with one aspect of the present disclosure. In a non-limiting example, the guests may enter in an email address 1602 and followed by a password 1604 to enter the virtual live experience. Other configurations for accessing may be used, for example, a show access code may be given to those who may enter into the portal.

FIG. 17 is an exemplary screenshot 1700 showing a prompt requesting for more information from the guest in accordance with one aspect of the present disclosure. This may allow a guest to complete their profile to take advantage of more features which may be personalized for them. When the profile is complete, it may be used by the stylist or hostess to facilitate the creation of wardrobes. Information such as body type, latest purchases, or the like may be entered in. Two options from this screenshot 1700 may be provided: "Complete My Profile" 1702 and "I'll Complete My Profile Later" 1704.

FIG. 18 is an exemplary screenshot 1800 requesting a current style from the guest in accordance with one aspect of the present disclosure. After the "Complete My Profile" option is selected, a query may be made to the user, "How do you dress most often?" A selection may made be such as "Business", "Casual", or "Dressy". Other options that may be selected by the guests may include, for example, "Casual", "Vintage", "Artsy", "Grunge", "Chic", "Bohemian", or "Exotic".

This information may be stored and reviewed by the stylist and/or hostess. In an example, and after this information is entered in, the stylist or hostess may determine that this particular guest is not suitable for the wardrobes that will be shown in the virtual live experience. The stylist or hostess may subsequently invite them to other shows that would fit their particular preferences.

Figure 19:
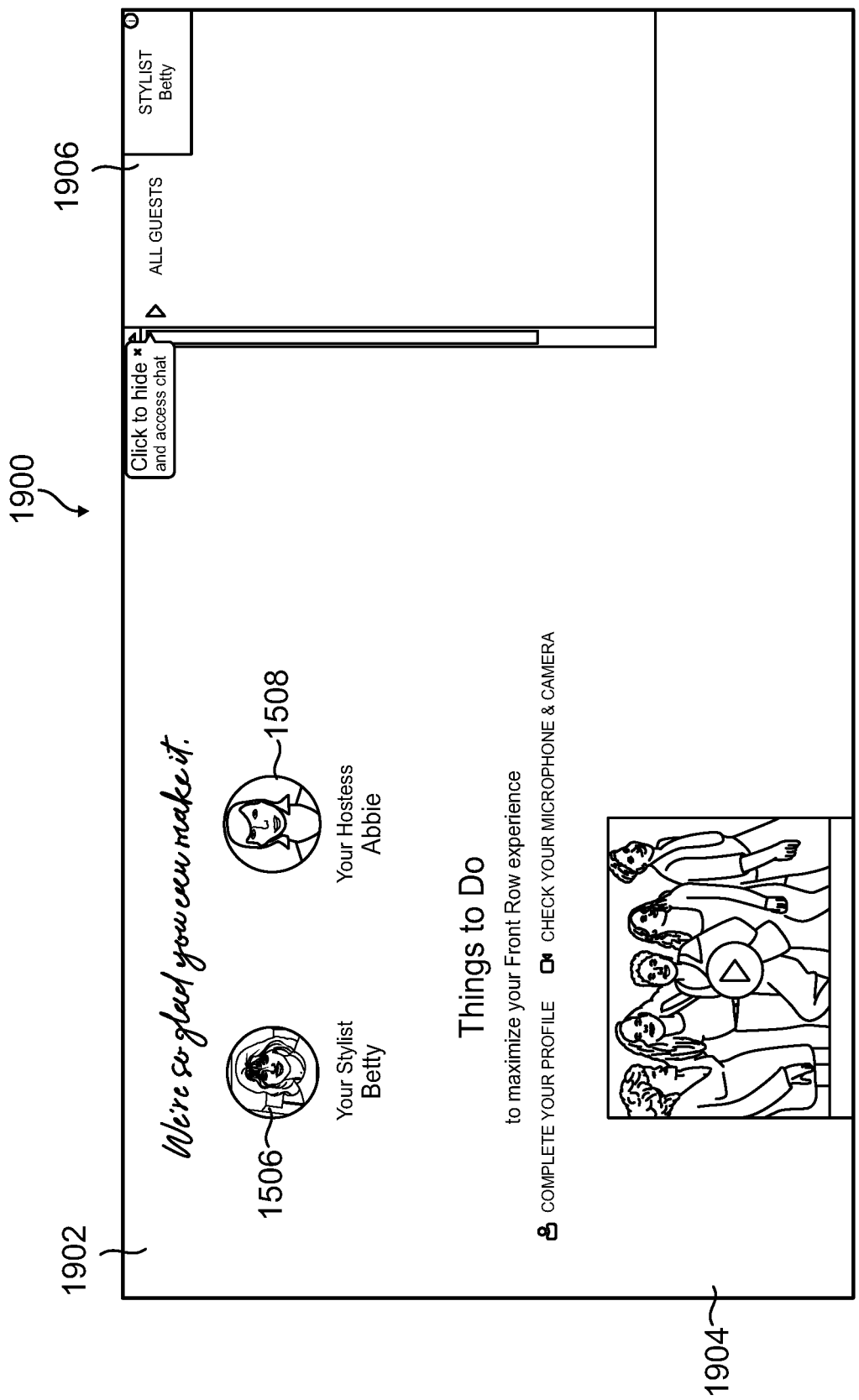
FIG. 19 is an exemplary screenshot showing a guest's portal for the virtual live experience in accordance with one aspect of the present disclosure.

FIG. 19 is an exemplary screenshot 1900 showing a guest's portal for the virtual live experience in accordance with one aspect of the present disclosure. A top portion 1902 of the screenshot 1900 may show the stylist picture 1506 and hostess picture 1508. The pictures 1506 and 1508 may be pulled from their profiles. Video feeds of the stylist and hostess may be provided if available such that real-time imagery is shown. Promotional videos may also be displayed.

At a bottom portion 1904 of the screenshot, an option of "Things to Do" to maximize the guest's "Front Row" experience may be provided. The guest may complete their profile and/or check their microphone and camera. A tutorial may be given on how to do these. The user may also see the advertisement, which was previously created above, for the virtual live experience.

At a side portion 1906, all guests invited to the show may be seen along with the stylist information. A tab may be used to expand or hide a chat area with the guests and stylist. While all guest chats may be shown, guests may also be provided with the opportunity to have private chats with the stylist or hostess.

With reference to FIG. 20, an exemplary screenshot 2000 requesting the stylist to test their camera and microphone for the virtual live experience in accordance with one aspect of the present disclosure is provided. A camera pull down menu 2002 may be given such that different cameras associated with the stylist may be used. An integrated camera may be used. Alternatively, a higher quality camera may be attached to the stylist terminal. After being plugged into the computing device, the camera may upload configuration files into the computing device for plug and play type settings.

A microphone menu 2004 may also be provided. In a non-limiting example, the stylist may select a microphone array. Higher grade audio devices may be used and connected similarly into the computing device for the stylist terminal. Audio settings may be adjusted in their computer settings. A test sound may also be played to determine whether the microphone has been properly set up.

FIG. 21 is an exemplary screenshot 2100 allowing the guest to enter into a pre-show phase for the virtual live experience which the stylist controls entry thereto in accordance with one aspect of the present disclosure. A pop up box 2102 providing "Are you sure you want to start the pre-show phase?" may be displayed. If the guests enter into the pre-show phase, the hostess, guests and stylists may get to know one another through informal chatting before the products or services are shown. Tutorials may be given by the stylist to the hostess and guests. This may include an explanation of how the processes work or video descriptions may be played.

In the pre-show, there may be a meet and greet period that uses multiple video feeds. In a non-limiting example, the show may use a "Brady Bunch" style for displaying feeds from the hostess terminal, stylist terminal, and guest terminals. Furthermore, prefabricated marketing videos may be played at the beginning for a predetermined period of time.

Figure 22:
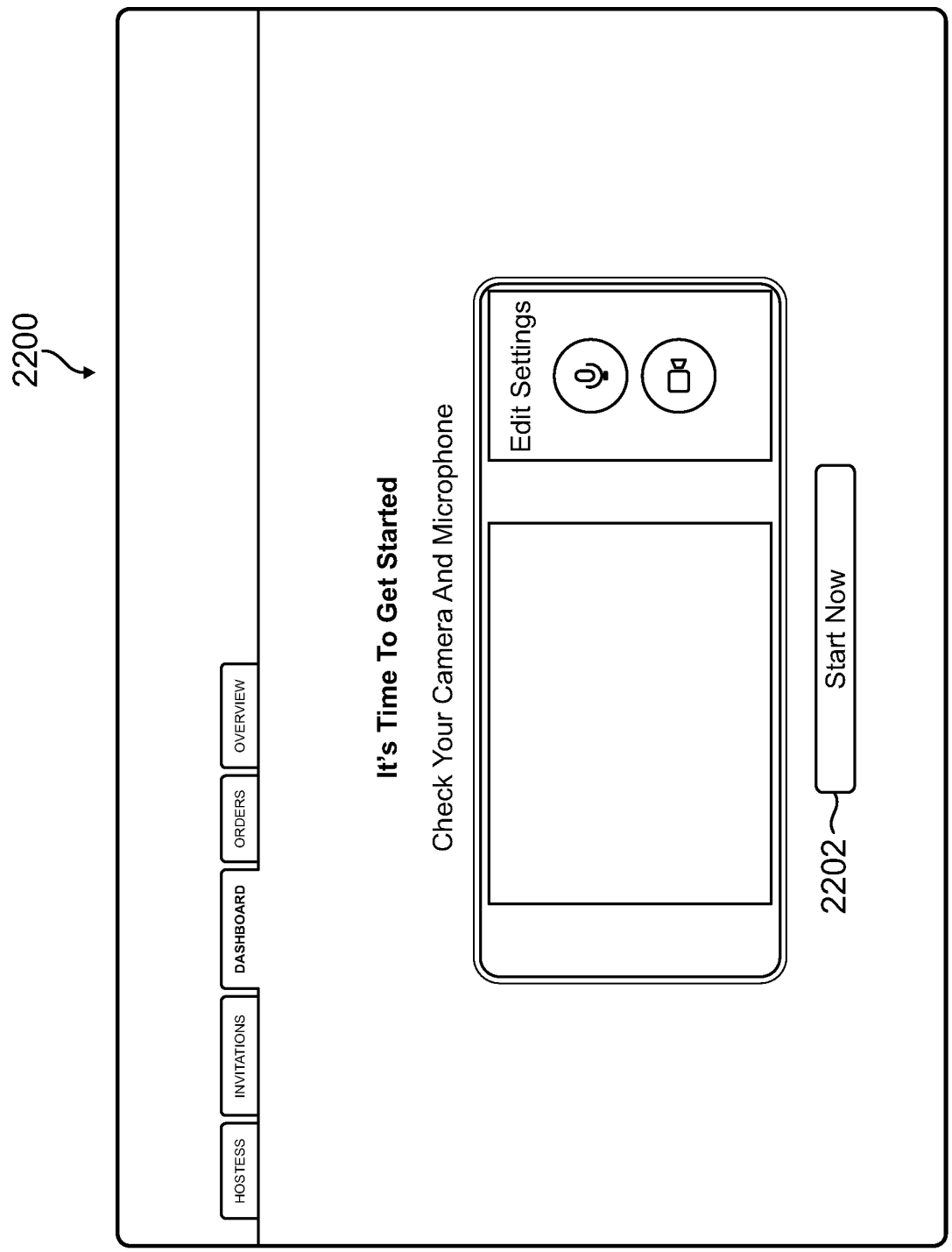
FIG. 22 is an exemplary screenshot for the stylist of the virtual live experience to verify that their camera and microphone is working as well as provide additional functionality in accordance with one aspect of the present disclosure.

FIG. 22 is an exemplary screenshot 2200 for the stylist of the virtual live experience to verify that their camera and microphone is working as well as provide additional functionality in accordance with one aspect of the present disclosure. The camera and microphone may be verified that they are working. Settings may be edited directly through the website. A "Start Now" button 2202 may be selected to begin the show. This screenshot 2200 provides a significant element of the system. This is the stylist dashboard for controlling the activity of the show. Through this, the stylist may view guest lists, conference status, control the flow of the show, select videos, see a video's progress, access slide out panels with additional key customer data (profile, address, closet, favorites, orders), copy a link for sharing shopping access, chat bot visibility, chat with all and chat with individuals, control of broadcast focus speakers, access to stylist technical support, search and share.

Figure 23:
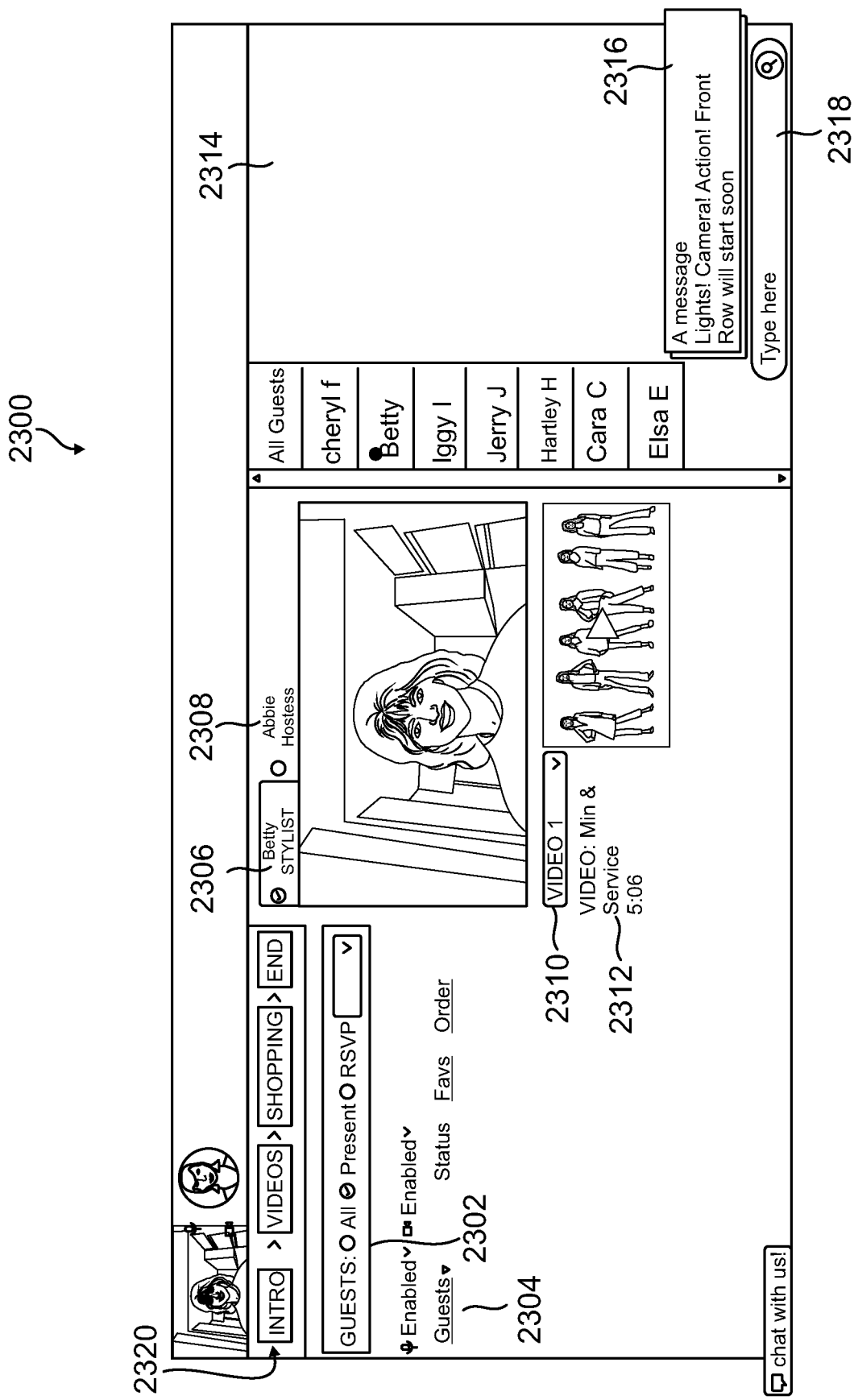
FIG. 23 is an exemplary screenshot for the stylist of the virtual live experience in accordance with one aspect of the present disclosure.

FIG. 23 is an exemplary screenshot 2300 for the stylist of the virtual live experience in accordance with one aspect of the present disclosure. This stylist portal may be used for a number of different functions and features. Fewer or more features may exist and should not be limited to those shown. Furthermore, the configuration of the features is not limited to the screenshot 2300. Settings for audio and visual may be setup at the top for either the stylist, hostess or guests.

Show states within the virtual live experience may be provided on a top bar 2320 of the screenshot 2300. These states may allow the stylist to control the show's progress. In a non-limiting example, the top bar 2320 may indicate that the virtual live experience is in an "INTRO" show state. This state may be used by the stylist to introduce themselves as well as how the show may be run. A "VIDEOS" state may be used by the stylist to prepare their videos, review their notes, and the like. Videos may be sorted allowing the stylist to play one video after another for a seamless experience.

A "SHOPPING" state within the top bar 2320 may indicate that the purchasing of products or services has begun by the guests of the hostess. After viewing videos, products or services therein may be purchased. The "END" state may provide that the virtual live experience is finished.

Below the top bar 2320, a guest selector 2302 may be provided to view guests in a guest area 2304 below. The selector 2302 may allow the stylist to choose different categories of guests. For example, and after selecting "All", guests that are displayed in the guest area 2304 would be those that have been invited, regardless of whether they are within the virtual live experience for the direct selling event.

A "Present" selection may show those who are within the virtual show. That is, guests who are within the virtual live experience may be shown. A "RSVP" selection may be provided through a pulldown menu. Specific guests who reserved a space for the virtual live experience may be automatically populated within the pull down menu. The stylist may select the guest by scrolling up or down the pull down menu.

Once a selection is made above, the selected guests are shown within the guest area 2304. More than one selection may be made with each selection potentially causing those guests that fit the selection to be pulled down and displayed in the guest area 2304. Next to the selected guests may be "status" indicators or icons that show whether that guest has enabled or disabled their camera or audio. The stylists may be able to control the guest's camera or audio through the icons, for example. In situations where the stylist or hostess wants to control the virtual live experience, they may turn on/off these indicators.

Other information relevant to the virtual live experience may be provided by the selected guests. In a non-limiting example, "Favs" and "Order" may be shown. The favorites indicator may show the quantity of products or services which the guest has selected. The order indicator may indicate an amount, for example in the form of a quantity, for which the guest has purchased in the virtual live experience for the direct selling event. Further details will be provided below.

A stylist tab 2306, when selected, may show a live feed of the stylist. A hostess tab 2308 may also be provided which shows the hostess live feed. Avatars or pictures may also be shown for the tabs 2306 and 2308. Through the live feed, expressions and emotions may be captured within the direct selling event. The stylist or hostess may be creative on what is shown on the display. If a stylist or hostess is enthusiastic about the opportunities, then the guests may be able to see that. When either the stylist tab 2306 or hostess tab 2308 is selected, that output of that tab 2306 or 2308 may be streamed to the guest terminals, making the tab selection important.

In the stylist portal as shown in the screenshot 2300, the stylist may have a number of videos 2310 (or media) setup for showing products or services. The videos 2310 may be stored within the web server which was described earlier. When selected through a pulldown menu, the video 2310 may be shown to the hostess and guests. Previews of the videos 2310 may be provided such that they are not automatically played when selected. Typically, the videos 2310 may be numerically and alphabetically sorted. Other types of media may also be shown or displayed, such as audio files.

In addition, a description 2312 of the videos 2310 may be provided below the video, which was selected by a pulldown menu. The length of the video may be given. A product or service description that the stylist is trying to sell may be shown. For example, if the video contains three garments and accessories, images of those may be shown nearby.

A chat area 2314 is also shown within the stylist portal. The chat area 2314 may allow each of the participants to communicate with one another. This may occur when a video 2310 is played or during other times within the virtual live experience for the direct selling event. Typically, the guests' microphones and cameras are disabled during the show such that they may concentrate on the content within the videos 2310.

In one configuration for the chat area 2314, the participant who last sent a message may be given an indicator by their name, and as shown, "Betty", who is the stylist. The message 2316 from Betty may be "Lights! Camera! Action! Front Row will start soon." This phrase may begin the virtual live experience for the direct selling event.

Below the chat area 2314 is a text entry area 2318. The text entry area 2318 may be used to enter in a new message. Messages may indicate how the show is going, discussions with other participants, or the like. The last participant to enter in a message may have the indicator moved to their name.

In one embodiment and to facilitate the virtual live experience, a chat bot may facilitate the conversions within the chat area 2314. The chat bot may facilitate the conversation by removing the burden of having to actually type in messages. Instead, the messages may be pre-established and may automatically populate the chat area 2314, for example.

Figure 24:
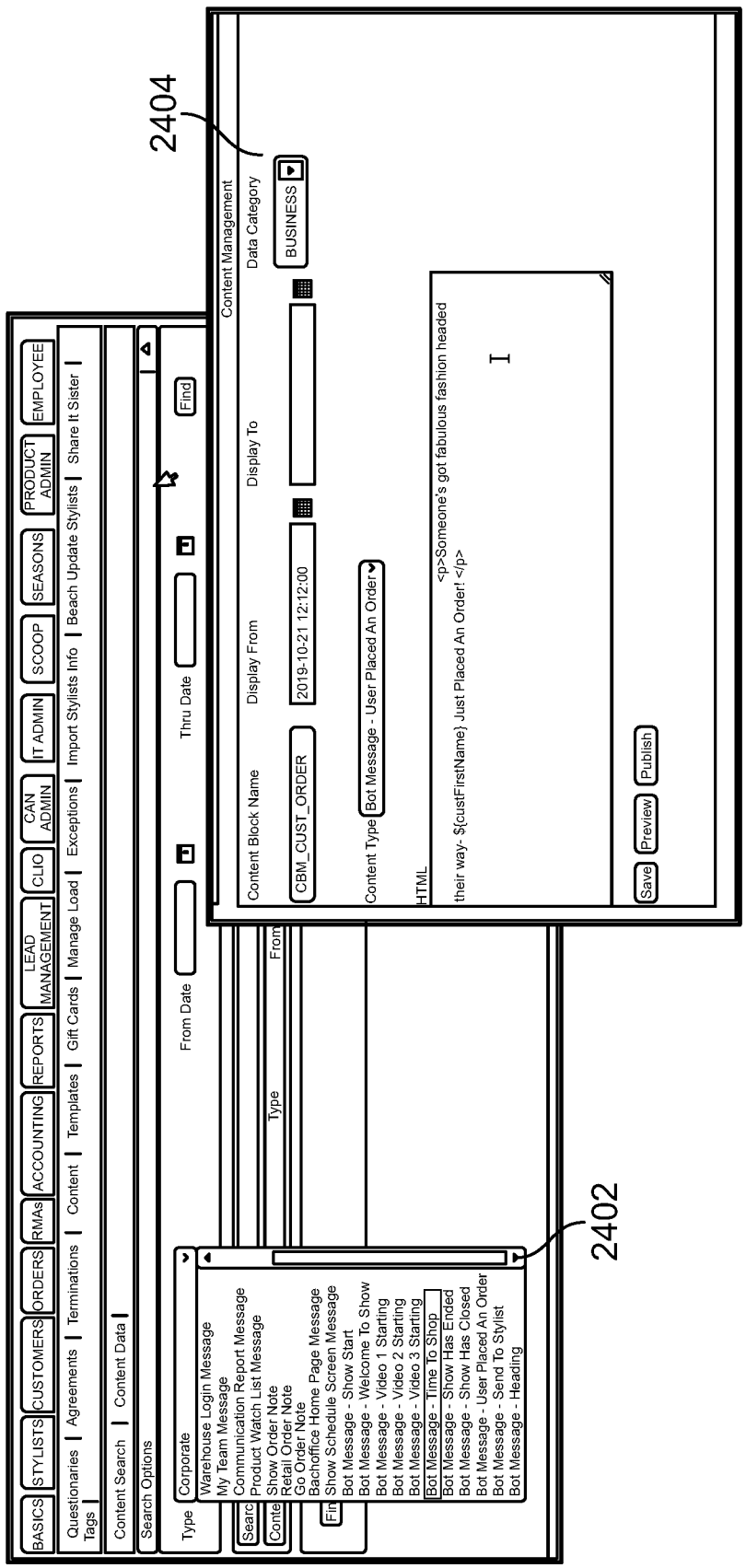
FIG. 24 are exemplary screenshots for controlling a chat bot feature for the virtual live experience which is accessible by system administrators in accordance with one aspect of the present disclosure.

Referring to FIG. 24, exemplary screenshots 2400 for enabling a chat bot feature for the virtual live experience which is accessible by system administrators in accordance with one aspect of the present disclosure are provided. The chat bot, from pre-established triggers 2402, may evaluate the virtual live experience and feed pre-populated messages to facilitate the show without the stylist or hostess having to provide their own messages. The triggers 2402 and message associations may come in a variety of forms and are not limited to those shown below.

Triggers 2402 that may cause a pre-populated message to be displayed may be related to messages typed within the chat area, such as automated responses. Show processes may also be triggers 2402. For example, when the stylist begins the virtual live experience, a trigger 2402 may be enabled that would allow for messaging to be provided to the guest devices to indicate that the show has begun. Other stages of the show may also provide a trigger 2402 in the chat area. Some examples of triggers 2402 may include, but are not limited to, "Warehouse Login Message", "My Team Message", "Commission Report Message", "Product Watch list Message", "Show Order Note", "Go Order Note", "Back-office Home Page Message", "Show Schedule Screen Message", "Bot Message—Show Start", "Bot Message—Welcome To Show", "Bot Message—Video 1 Starting", "Bot Message—Video 2 Starting", "Bot Message—Video 3 Starting", "Bot Message—Time To Shop", "Bot Message—Show Has Ended", "Bot Message—Show has Closed", "Bot Message—User Placed an Order", "Bot Message—Send to stylist", and "Bot Message—Heading". As shown in Table 4 below, specific triggers 2402 may coincide with specific messages within the chat area.

TABLE 4

| | |
|---|---|
| Trigger 1: When a user first logs in and RSVP. | Post: Welcome! Have fun chatting with your fellow guests. The show will start at approx. (show date (mm/dd hh/mm)) |
| Trigger 2: When the stylist starts the show. | Post: The show is starting - Get ready for your camera and audio. |
| Trigger 3: After each video (Video 1, Video 2, Video 3, etc.) | Video 1 Post: First part of front row is on now, your stylist will return shortly after the video finishes. Video 2 Post: Second part of front row is on now, and your stylist will return again. Video 3 Post: We've wrapped up our videos and you'll be able to shop soon and get back to seeing and talking to your stylist and fellow guests soon. |
| Trigger 4: When stylists moves to shopping. | Post: Time to shop! |
| Trigger 5: When stylist ends show. | Post: Stylist (FN) has ended this front row experience but feel free to keep chatting and shopping! |
| Trigger 6: (If possible) When show is closed. | Post: Stylist (FN) has closed this show. If you like you can shop additional pieces on their website at (replicated website URL) or contact her to book a front row experience for yourself and friends! |
| Trigger 7: When user places order. | Post: (FN) just placed an order! Way to go FN. |

Through the triggers 2402, the chat bot may automatically push messages to the guests. Automated responses to the guests' questions may also be provided through the chat bot. For example, certain colors for products may be provided to a guest who requests such information. The online social and collaborative commerce system may search through its internal database for this information and provide the automated response.

An administrator for the online social and collaborative commerce system may be able to change the content 2404 for the chat bot. Through a separate privileged area, the triggers 2402 associated with the messages may be defined by the content 2404. The message may be modified using HTML and associated with a label, the label defining the trigger 2402.

Advantageously, these triggers 2402 and associated messages may be coordinated with the stylist and hostess such that the show, or parts thereof, may be run automatically and the stylist may focus their attention on other areas of the virtual live experience. Their focus should typically be on the selling of products or services, not on items within the show that are commonly performed.

Figure 25:
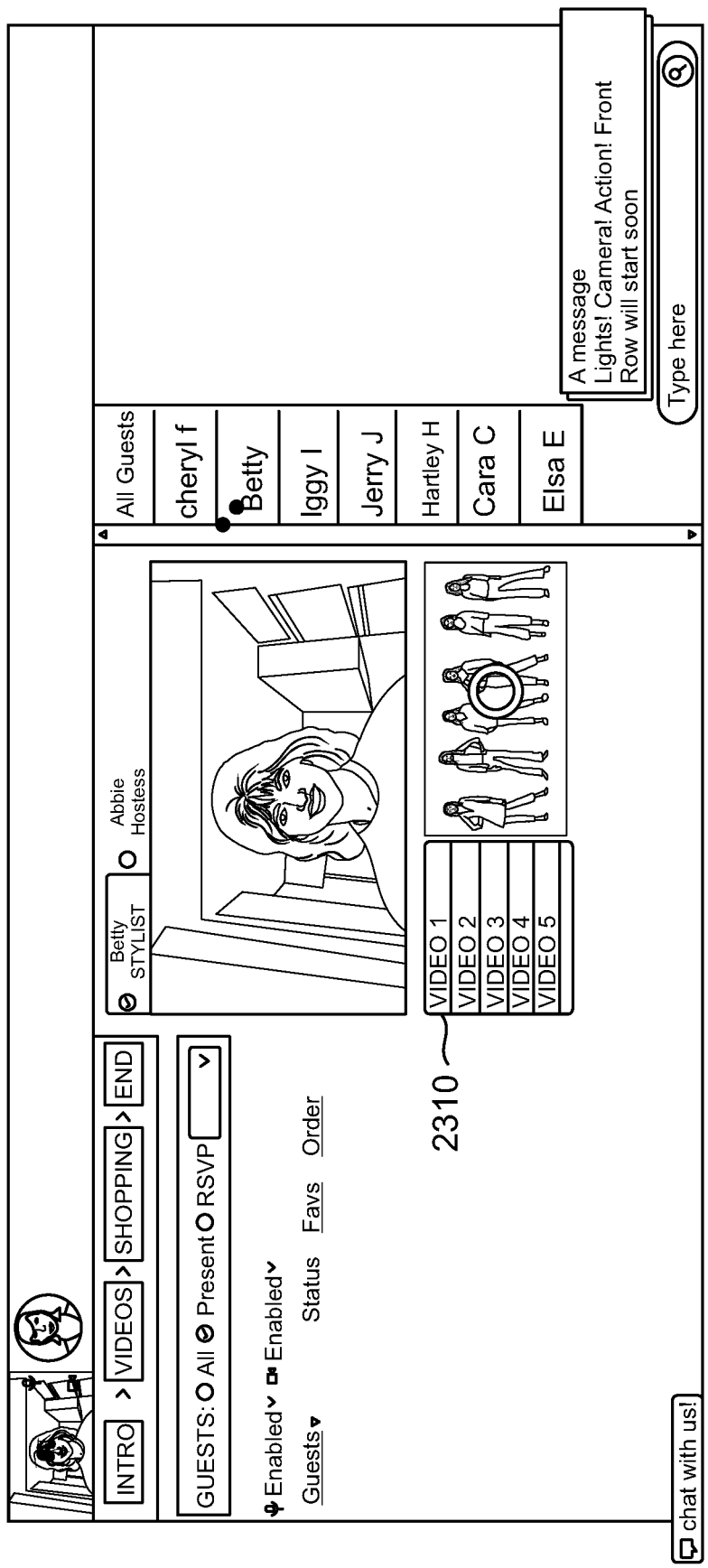
FIG. 25 is an exemplary screenshot showing a stylist's portal for the virtual live experience in accordance with one aspect of the present disclosure.

Turning to FIG. 25, an exemplary screenshot 2500 showing the stylist's portal for the virtual live experience in accordance with one aspect of the present disclosure is provided. The pull down menu for the videos 2310 may be expanded. When expanded, multiple videos 2310 may be shown. The stylist may scroll down through their predefined videos 2310 to show to the guest. The hostess and stylist real-time feeds, or other information, may be displayed on the top of the screenshot 2500 in a "Brady Bunch" style.

Figure 26:
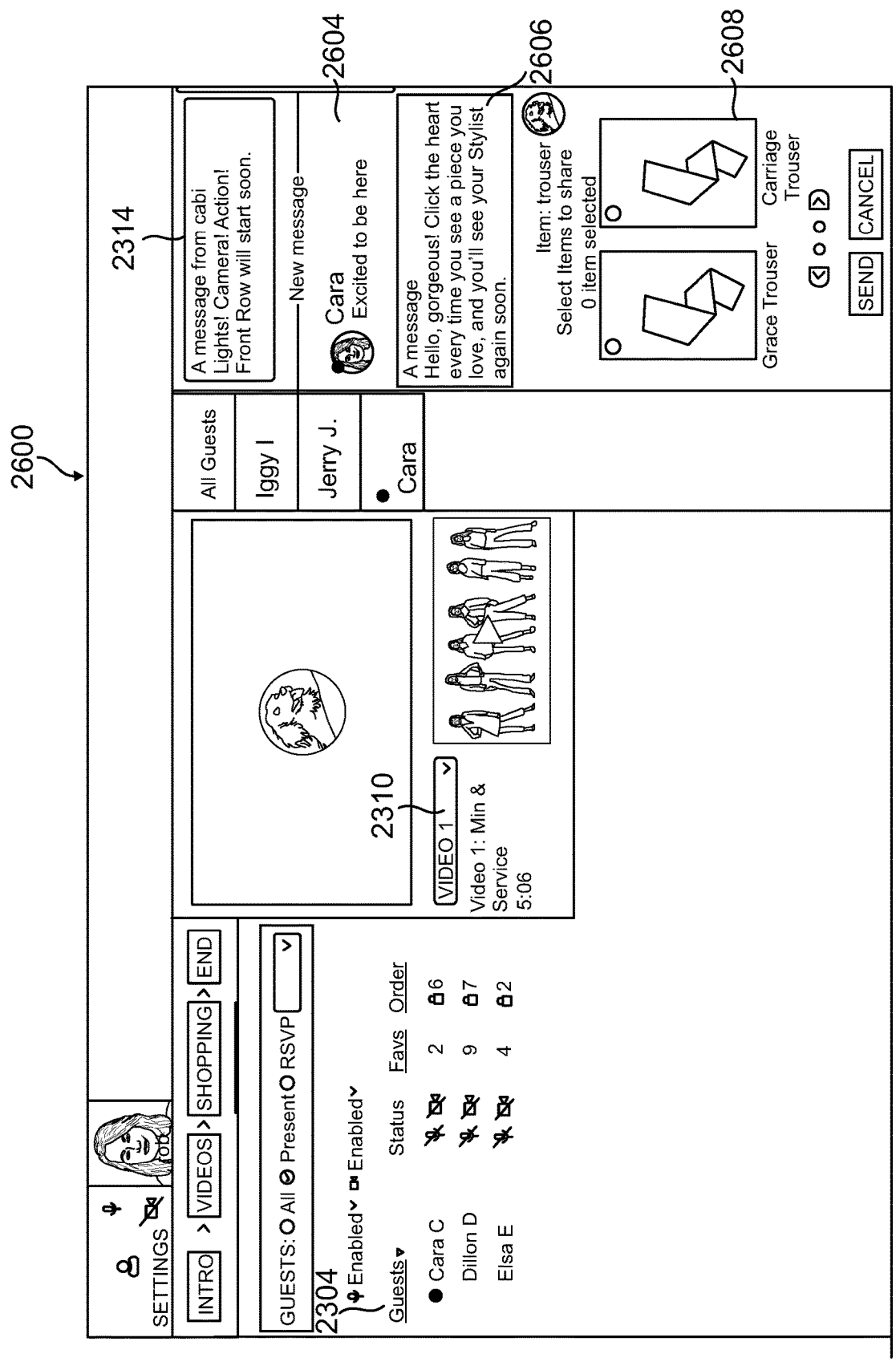
FIG. 26 is an exemplary screenshot showing a search and share focus by the stylist for the virtual live experience in accordance with one aspect of the present disclosure.

FIG. 26 is an exemplary screenshot 2600 showing a search and share focus by the stylist for the virtual live experience in accordance with one aspect of the present disclosure. The stylist may share in the chat area 2314 a specific product or service that they wish to highlight before, during or after a video 2310 is played. In the shown example, "Video 1" has been selected by the stylist and is shown to the guest terminal through their portal.

A guest, for example Cara, has provided a message 2604 of "Excited to be here" within the chat area 2314. Following, the stylist may provide information on how the virtual live experience may work. In a non-limiting example, a message 2606 of "Hello, gorgeous! Click the heart every time you see a piece you love, and you'll see your Stylist again soon." may be posted within the chat area 2314. This message 2606 may be automatically triggered through the chat bot freeing the stylist from having to enter in new messages.

Following, the stylist may send a message 2608 in the chat area 2314 to a specific guest. The message 2608 may allow the user to scroll across different products or services. These products or services may correspond or be associated with those shown in the video 2310. The message 2608 may also be provided in a product carousel, which will be described below. The product carousel may be in a separate area provided in the guest' portal.

By selecting the product or service in the message 2608, the participant may purchase them or store them for later review. After the guest has reviewed the product or service, they may choose to send or cancel their selections. The message 2608 may show the complexity of the chat area 2314 by allowing multi-media features. This advantageously enhances the virtual live experience of the direct selling event.

Each guest portal may receive the message 2608 within the chat area 2314 regarding the products or service. Individualized information for the guests may be stored for later use by the online social and collaborative commerce system. In one embodiment, information may be displayed on what other guests are selecting. These selections may draw interest by the guest possibly influencing their future purchase decisions.

The guest area 2304, as described above, may be populated with information regarding the virtual live experience for the direct selling event. During the showing of the video 2310, the cameras and microphones of the guests may be deactivated as shown. Information about the "Fays" and "Order" may be also be provided in the guest area 2304. Cara, for example, has selected as her favorites two items and has purchased six. Dillon, another guest, has selected nine as his favorites and has ordered seven, while Elsa has selected four has her favorites and ordered two. Thus, the guest area 2304 may provide pertinent information for the stylist on tracking their statistics. The stylist may use this to gauge how they are performing and if they should change their strategy for the virtual live experience.

In the screenshot 2600, the stylist may be interested in a specific guest, Cara. By selecting them (either by clicking on their name in the guest area 2304 or through other method), an indicator is shown by their name in the chat area 2314. The selection may cause only messages by the selected guest within the chat area 2314 to be displayed along with messages from the hostess or stylist. Thus, the interface may be provide a one-to-one conversation between a specific guest and the stylist or hostess. In one embodiment, the selection of the specific guest may cause the guest's feed or picture to be shown on the upper portion of the screenshot 2600.

Figure 27:
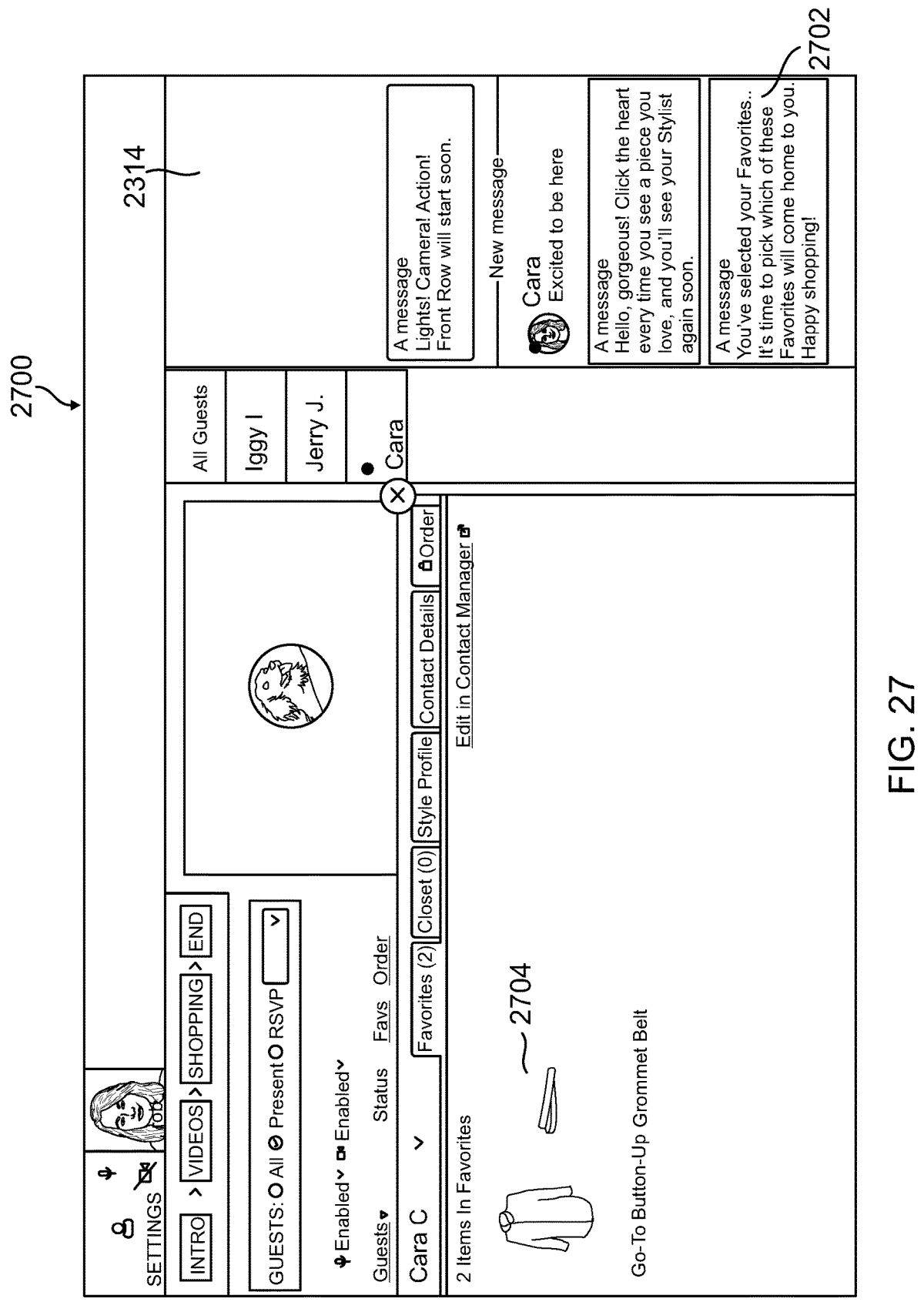

FIG. 27 is an exemplary screenshot 2700 showing the stylist's portal for the virtual live experience to view a specific guest's specific favorites in accordance with one aspect of the present disclosure. The guests, after selecting their favorites, may be given a message 2702 of "You've selected your Favorites. It's time to pick which of these Favorites will come home to you. Happy Shopping!". Other messages may be provided indicating similar content. These may be generated and provided within the chat area 2314 by the chat bot.

The stylist from their view may see those items that were selected by the guest, in this example, Cara C. Cara has selected two items as her favorites: a garment and their accessory. In a display area 2704 for this particular guest, the stylist may view their selections. Through this view the stylist may evaluate what the guest is interested in or has purchased. Suggestions or comments may be made to the guest by the stylist in the chat area 2314, which may be between them only.

Figure 28:
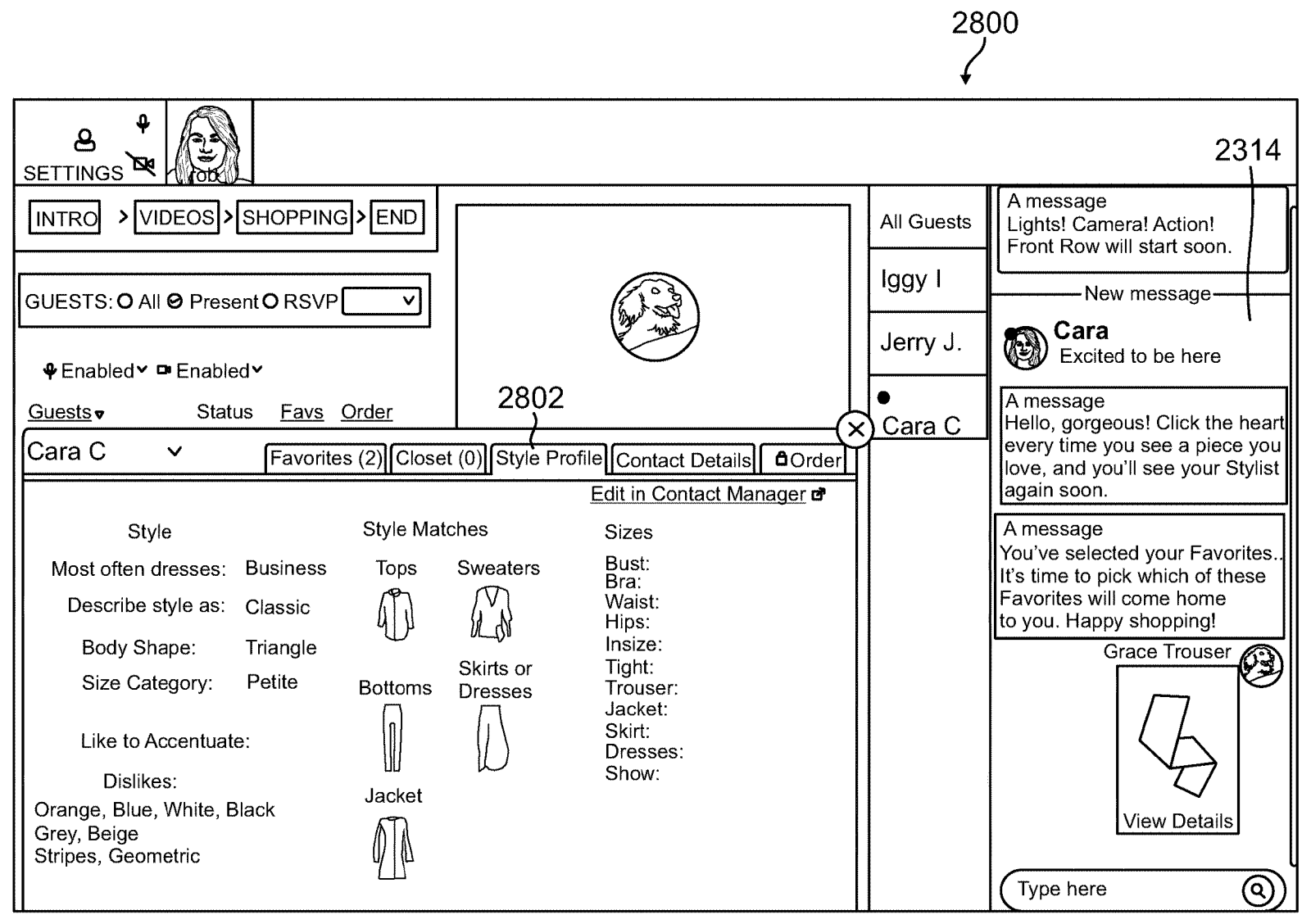

FIG. 28 is an exemplary screenshot 2800 showing the stylist's portal for the virtual live experience to view a specific guest's style profile in accordance with one aspect of the present disclosure. Through these screens, that are specific to the selected guest, the stylist may find information about them and possibly, how to run or direct the virtual live experience. The "Style Profile" tab 2802, as shown, may include the information regarding the guest's specific style. This information may include categories of: "Most often Dresses:", "Describes style as:", "Body Shape:", "Size Category:", "Like to Accentuate:", and "Dislikes:" A stylist may also view a customer's closet through a separate tab located within this screenshot 2800.

"Style Matches" that may fit the particular guest may be shown. These may include, but are not limited to, "Tops", "Sweaters", "Bottoms", "Skirts or Dresses" and "Jacket". When selected, different items may be shown to the stylist. These may be specific to the selected guest. These selections may be defined through the neural network described above. The neural network may use guest, stylist, hostess, new trends, and new line up information to define wardrobes for that guest. Alternatively, the stylist may have chosen the style for that guest beforehand. This information may be used by the stylist to present to the guest.

The stylist or guest themselves may make edits. Under "Edit in Contact Manager", different information may be set. For example, guest sizes such as "Bust", "Bra", "Waist", "Hips", "Insize", "Tight", "Trouser", "Jacket", "Skirt", "Dresses", and "Show" may be edited. Pulldown menus may be used. Artificial intelligence may be used where a guest's clothing may be scanned with the guest in them and the information may be automatically populated. Pictures of the guest may also be part of the "Style Profile" tab 2802.

In the shown embodiment, the stylist may have provided the "Grace Trouser" within the chat area 2314. This may be based on the "Style Matches" in the "Style Profile" tab 2802. The stylist may have selected bottoms and the product may have been suggested for the stylist to present to the guest based on their information.

Figure 29:
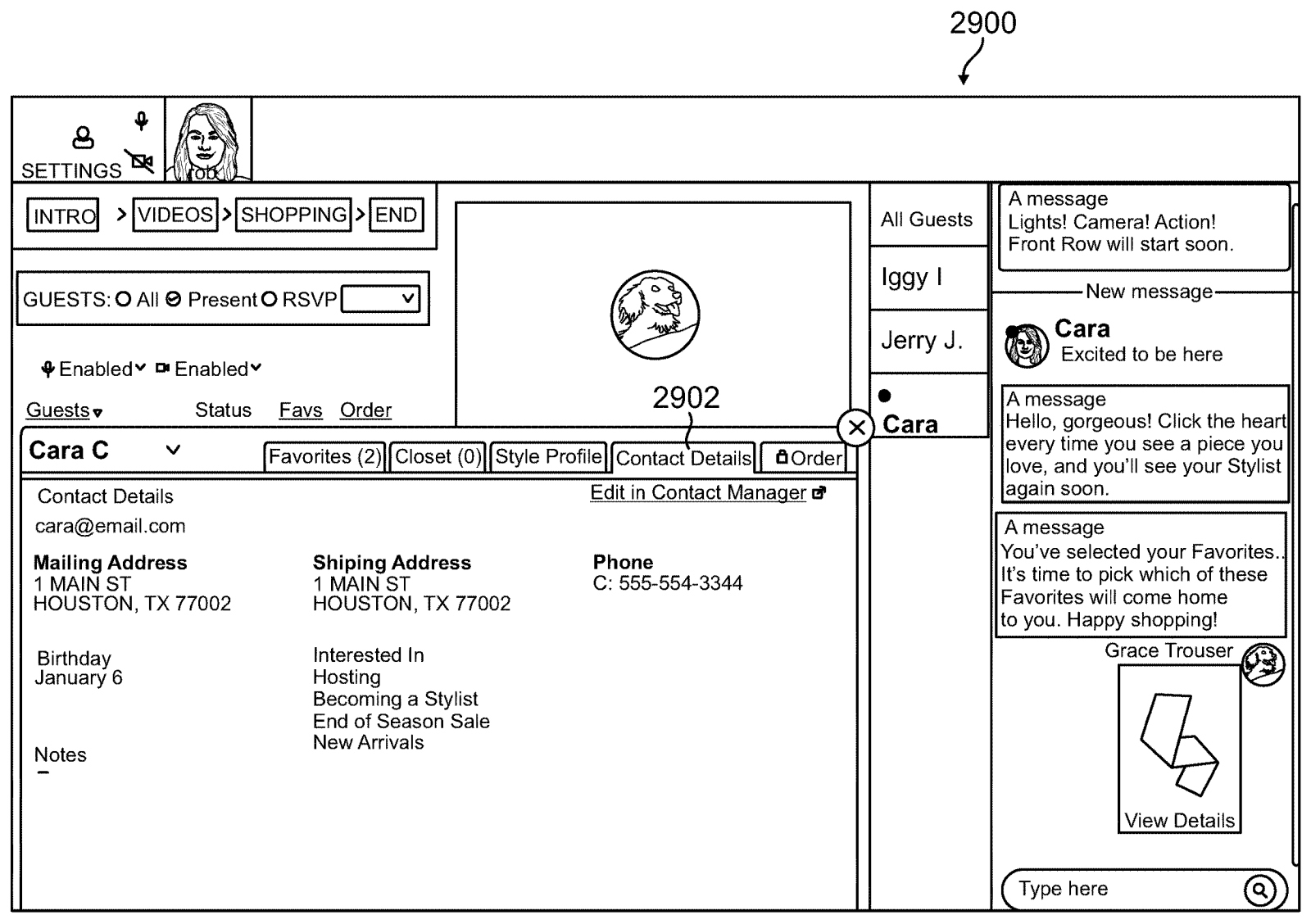

With reference to FIG. 29, an exemplary screenshot 2900 showing the stylist's portal for the virtual live experience to view the specific guest's contact information in accordance with one aspect of the present disclosure is provided. A "Contact Details" tab 2902 may be provided to view this information. The information may include an email and mailing address of the guest. A separate shipping address may be provided, which may be different from the mailing address.

A phone number may be part of the "Contact Details" tab 2902 along with their birthday. Interests of the guest may be provided such as, but not limited to, "Hosting", "Becoming a Stylist", "End of Season Sale", and "New Arrivals". The interests may be part of metadata tags that when searched may pull up this particular guest. A notes section may also be used to determine any other pertinent information. In a non-limiting example, personal preferences may be entered such as "Married with Kids".

Figure 30:
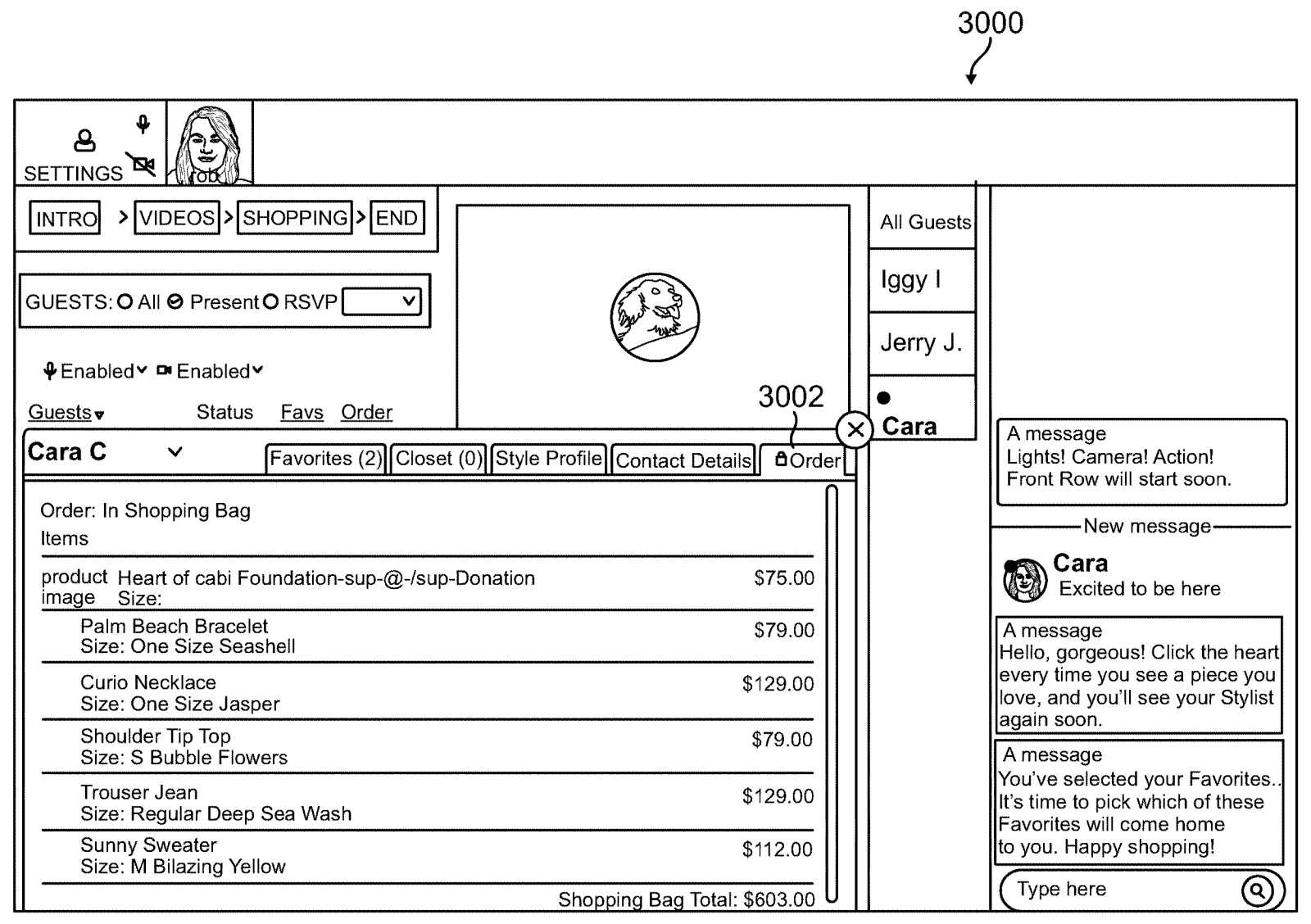

FIG. 30 is an exemplary screenshot 3000 showing the stylist's portal for the virtual live experience to view a specific guest's order in accordance with one aspect of the present disclosure. The stylist may see this information through the "Order" tab 30002. Individualized items within the guest's shopping bag may be shown. Sizes along with a description of each may be displayed by the item. A total amount for these items along with individual prices may be displayed.

FIG. 31 depicts exemplary screenshots 3000 showing the illustrative login sequence to the virtual live experience for the guest in accordance with one aspect of the present disclosure. In a typical sequence, the guest may enter in their email address along with a password. The online social and collaborative commerce system may then authenticate the user. Afterwards, the system may prompt the user to "Let's get Personal". The guest may complete their profile which may be used by the stylist to personalize a look for them.

Turning to FIG. 32, an exemplary screenshot 3200 showing an action button or prompt for the guest to join the virtual live experience in accordance with one aspect of the present disclosure is provided. This action button or prompt, which may come in the form of a link, may provide access to the web server and to the specific website or page generated for this particular direct selling event. If the show is not ready to be started, the action button or prompt may be disabled. A counter may be provided on this page to indicate when the show will begin.

Figure 33:
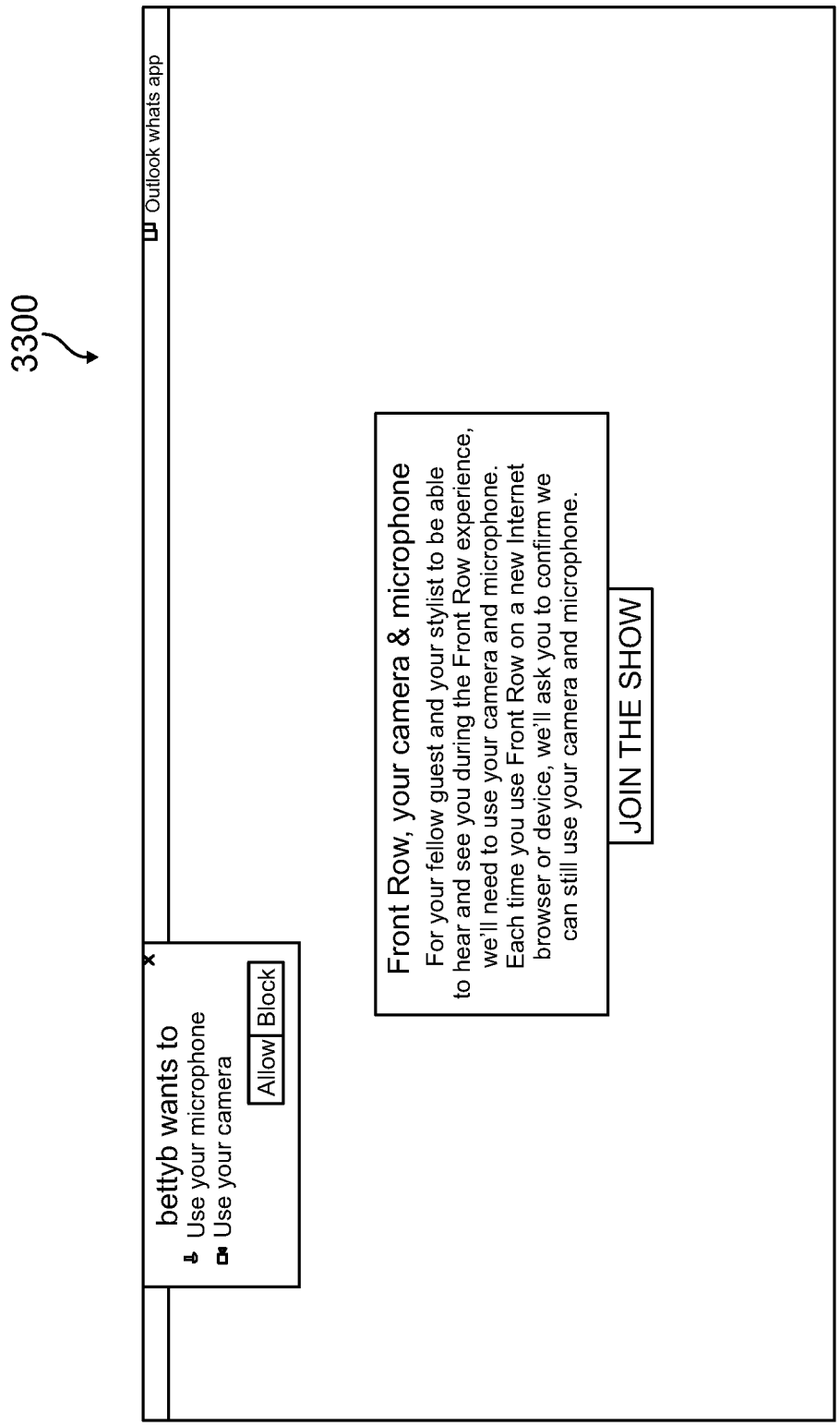
FIG. 33 is an exemplary screenshot requesting from the guest to allow their camera and microphone to be shared to join the virtual live experience in accordance with one aspect of the present disclosure.

FIG. 33 is an exemplary screenshot 3300 requesting from the guest to allow their camera and microphone to be shared to join the virtual live experience in accordance with one aspect of the present disclosure. Each time a new show is generated, the guest may be asked to confirm that the stylist may be able to use their camera and microphone. The guest may either allow or block this request. A button may be provided so that the guest may join the show.

Figure 34:
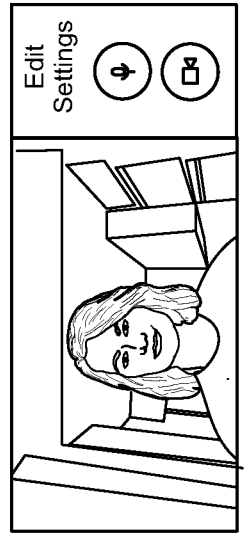
FIG. 34 is an exemplary screenshot showing a continuation of a microphone and/or camera check for the virtual live experience in accordance with one aspect of the present disclosure.

FIG. 34 is an exemplary screenshot 3400 showing a continuation of a microphone and/or camera check for the virtual live experience in accordance with one aspect of the present disclosure. Once the camera and microphone are enabled, guests may join the show. The guests may be able to edit their settings and then join the show.

Figure 35:
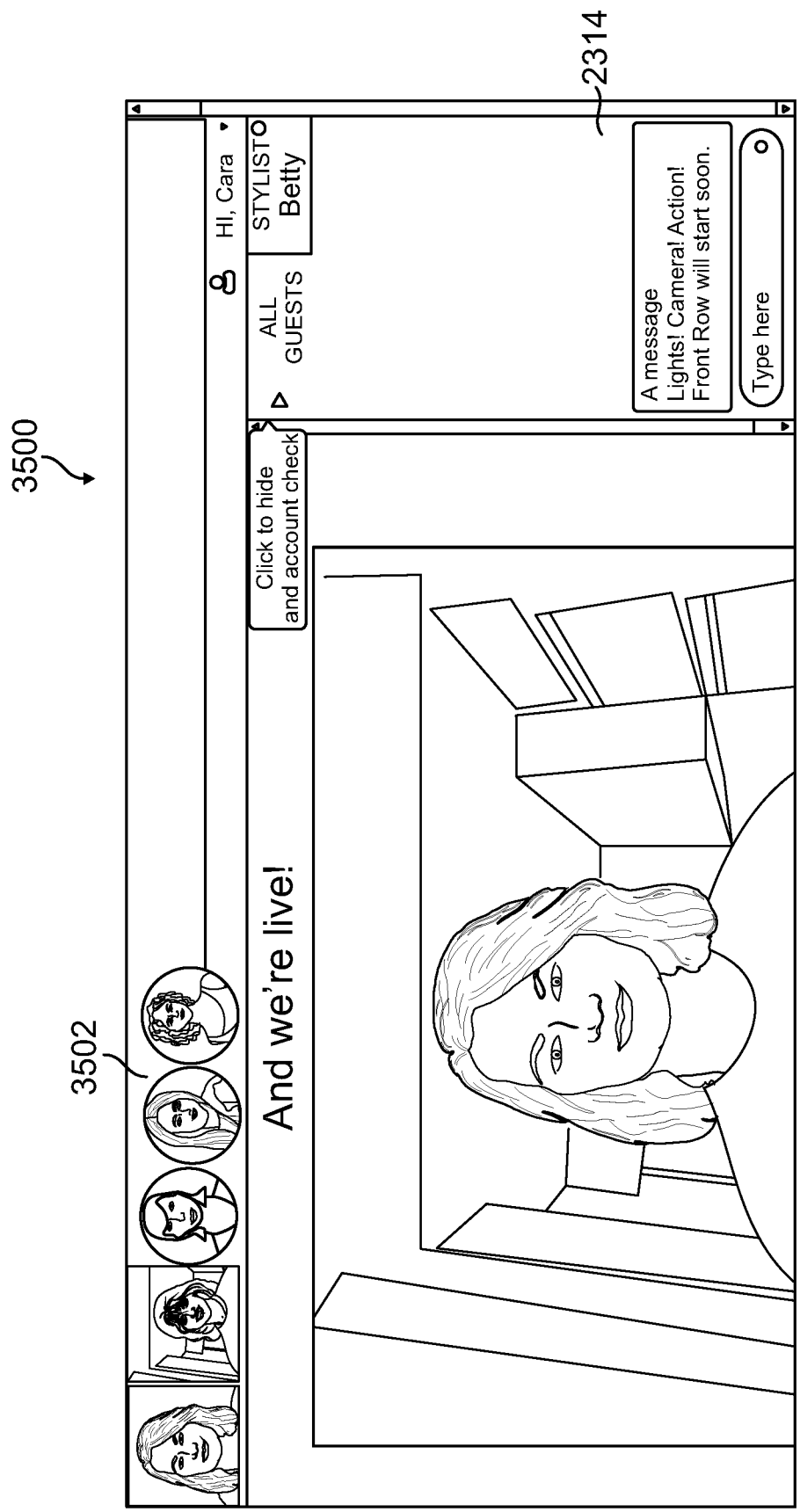
FIG. 35 is an exemplary screenshot informing the guest how to control their camera and microphone as well as describing to them a live real-time chat feature in accordance with one aspect of the present disclosure.

Referring to FIG. 35, an exemplary screenshot 3500 informing the guest how to control their camera and microphone as well as describing to them a live real-time chat feature in accordance with one aspect of the present disclosure is provided. Through this portal, the guest may be shown or informed how to control their camera and microphone. Their attention may be called to the live real-time chat feature within the chat area 2314. The guests, hostess, and stylist may use this area 2314 to voice their likes or dislikes. New messages may be provided on the bottom of the chat area 2314 by the guest. This screenshot 3500 may present the host in a broadcast focus (the hostess' friends with the guests and therefore is immediately in front and center stage).

At the top of the screenshot, the "Brady-Bunch" style presentation 3502 of the parties within the virtual live experience for the direct selling event may be shown. The stylist, hostess, and guests may be presented at the top. Live feeds, other pictures or indicators may be shown for each of the participants. In one embodiment, the stylist and hostess may be shown on the furthest left corner to give them priority over the guests. Alternatively, the icon or feed for the last party to speak may be shifted furthest to the left.

Control may be given to how the video is focused depending on which stage the virtual live experience is in. Focus may be on the hostess, then the stylist. This process may go back and forth between the stylist and hostess. The stylist may control who is in front and center in a focus panel. In a typical process, the hostess may begin the show as they are more familiar with the guests. The hostess may then give control to the stylist after thanking the guests for attending the direct selling event.

Figure 36:
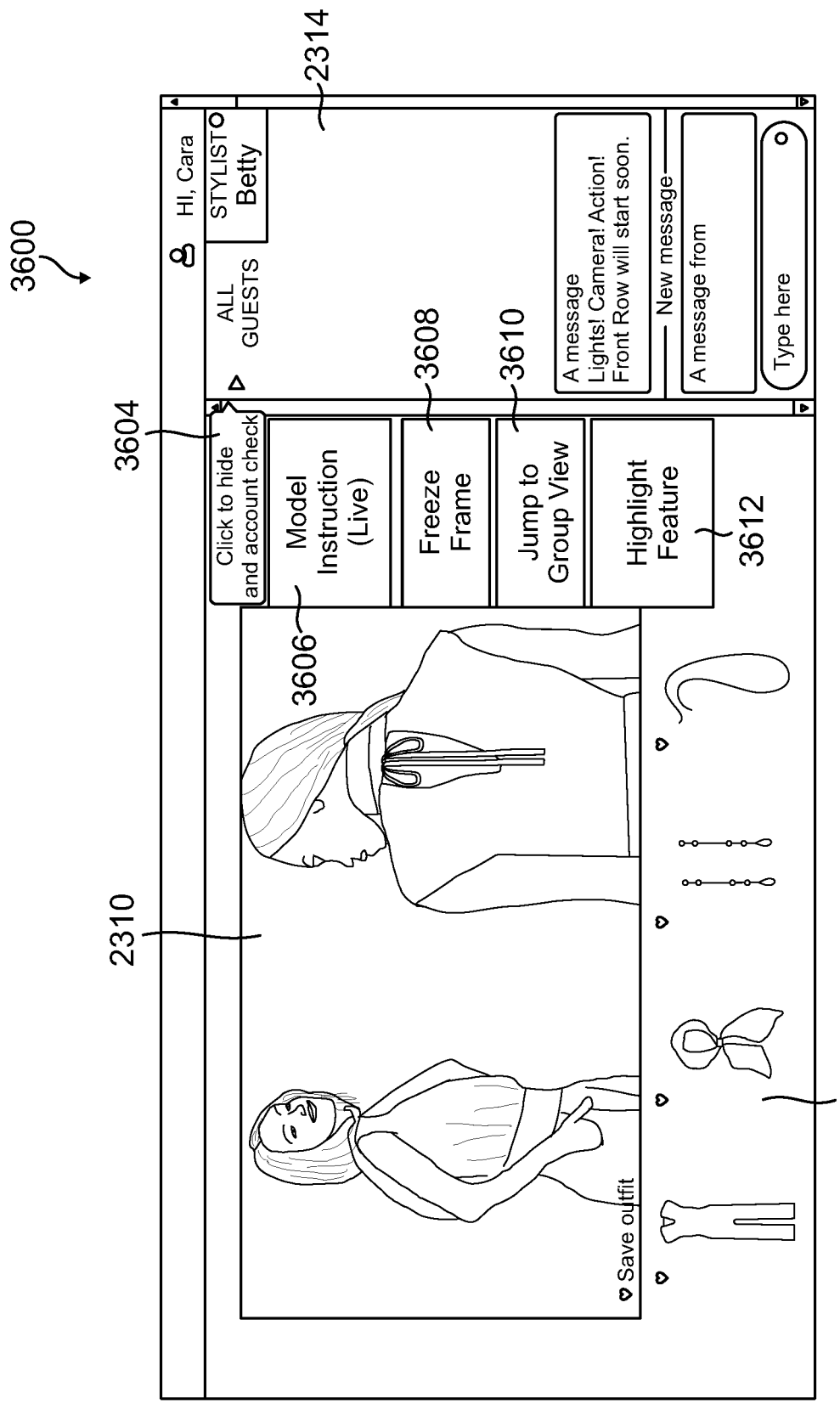
FIG. 36 is an exemplary screenshot showing a playing of videos along with a product carousel of items within the video in accordance with one aspect of the present disclosure.

FIG. 36 is an exemplary screenshot 3600 showing a playing of videos along with a product carousel 3602 of items within the video 2310 in accordance with one aspect of the present disclosure. The video 2310 may have been previously selected by the stylist. On the stylist terminal and through their unique portal, the stylist may play the video 2310 which may be streamed into the guest's terminal in real-time. The guest may see each model in the video rotate and move for displaying products or services to be purchased in the virtual live experience for the direct selling event. The guests, stylist and hostess may chat during the display of the video 2310 in the chat area 2314.

Below the video 2310, may be the product carousel 3602. Services may also be provided within the carousel 3602. The carousel 3602 may show items that the model is wearing in the particular video 2310. The guests may favorite a particular product or service by selecting a heart icon by the product or service, for example. This may automatically save the product or service for a future purchase. Alternatively, the guest may proceed directly to the purchase.

In one embodiment, the carousel 3602 may display those items that are shown within the video 2310 as they are introduced or shown by the model in the video 2310. The stylist or hostess may highlight the particular item within the chat area 2314 or they may be given special tools provided in their portals to draw attention to that item in the video 2310. After highlighting the item, it may be placed into the carousel 3602. Alternatively, each and every product or service may be displayed within the carousel 3602 when the video 2310 is shown without any stylist's highlights. The guest may select the product or service within the carousel 3602 and additional information may be displayed about the item. In a non-limiting example, this information may include season of introduction, cost, reviews, or the like. Other videos 2310 portraying the product or services may also be displayed.

In one embodiment, the video 2310 may be reversed, paused, or forwarded by the guest. While one video 2310 may be shown to the entire set of guests for the virtual live experience, other configurations may be contemplated. For example, different and unique videos 2310 may be provided to individual guests at the same time such that one guest may view a different video 2310 from another guest. In another embodiment, different products or services within the carousel 3602 may be highlighted for the same video 2310 to different guests. For example, one guest may be interested in accessories while another guest may be interested in the clothing.

An account check tab 3604 may be provided. This may allow a guest to check their account. This may direct the guest portal to another website within the server. The guest may determine how much they have purchased, items they have placed as their favorite, or the like.

In one embodiment, live streamed shows from the stylist or hostess terminals may be provided, instead of the pre-established videos 2310 described above. The models may be given queues from the stylist when to model the products or services. A "Model Instruction (Live)" tab 3606 may be used by the guest as well. Guests may give the models directions in real-time for example, "I would like to see the back again, please turn around." Voice or text communications may then be provided to the model on their own terminals. Further, instructions may be given by the guest to the model to mix and match different clothing items such that different pairings may be shown in real time. This would allow a more interactive environment similar to a home show.

The guests may also be provided a "Freeze Frame" tab 3608. When selected, an image or clip of the video 2310 may be taken along with those products or services in the carousel 3602 and stored for later viewing. After, or during, the virtual live experience, the guest may view the frame to determine whether they may want to purchase the product or service. This allows the guest to view in context those products or services at a later time.

In one example of machine learning within the guest portal, items may be tagged depending on the particular frame that was taken by the "Freeze Frame". When the guest tags and stores a particular pose within the video 2310, machine learning may be used to determine that the guest may be interested only in a particular item such as pants. Machine learning may be used to track the particular pants and provide a variety of options to purchase the tagged pants. Other views of the pants may also be given that are not in the video 2310, but that have been saved within the system. Similar items with different colors may also be shown to the guest. Typically, a system may use a scoring system.

A "Jump to Group View" tab 3610 may be provided within the guest portal. The group view may be similar to the "Brady Bunch" views described above. By providing a group view, the guest may see other guests' reactions. In one embodiment, the guest may view or see what others are purchasing or what they have selected as their favorites. Typically, however, the guests' cameras and microphones are disabled when the video 2310 is shown.

A "Highlight Feature" tab 3612 may be provided to the guest through their portal. The guest may highlight features on the incoming video 2310 from the stylist. The highlight of products or services by the guest may be communicated to the stylist or hostess portals. Annotations to the highlights may also be produced. For example, a guest may highlight a model's necklace within the video 2310 and annotate it with "Does this come in different colors?" This information may then be transmitted to the stylist and hostess portals. If the color does exist, the stylist or hostess may provide the product for purchase in the chat area 2314 or within the carousel 3602. The product or service may also be placed in the guest's favorites. The chat bot described above may be able to provide this information without the stylist or hostess response.

Figure 37:
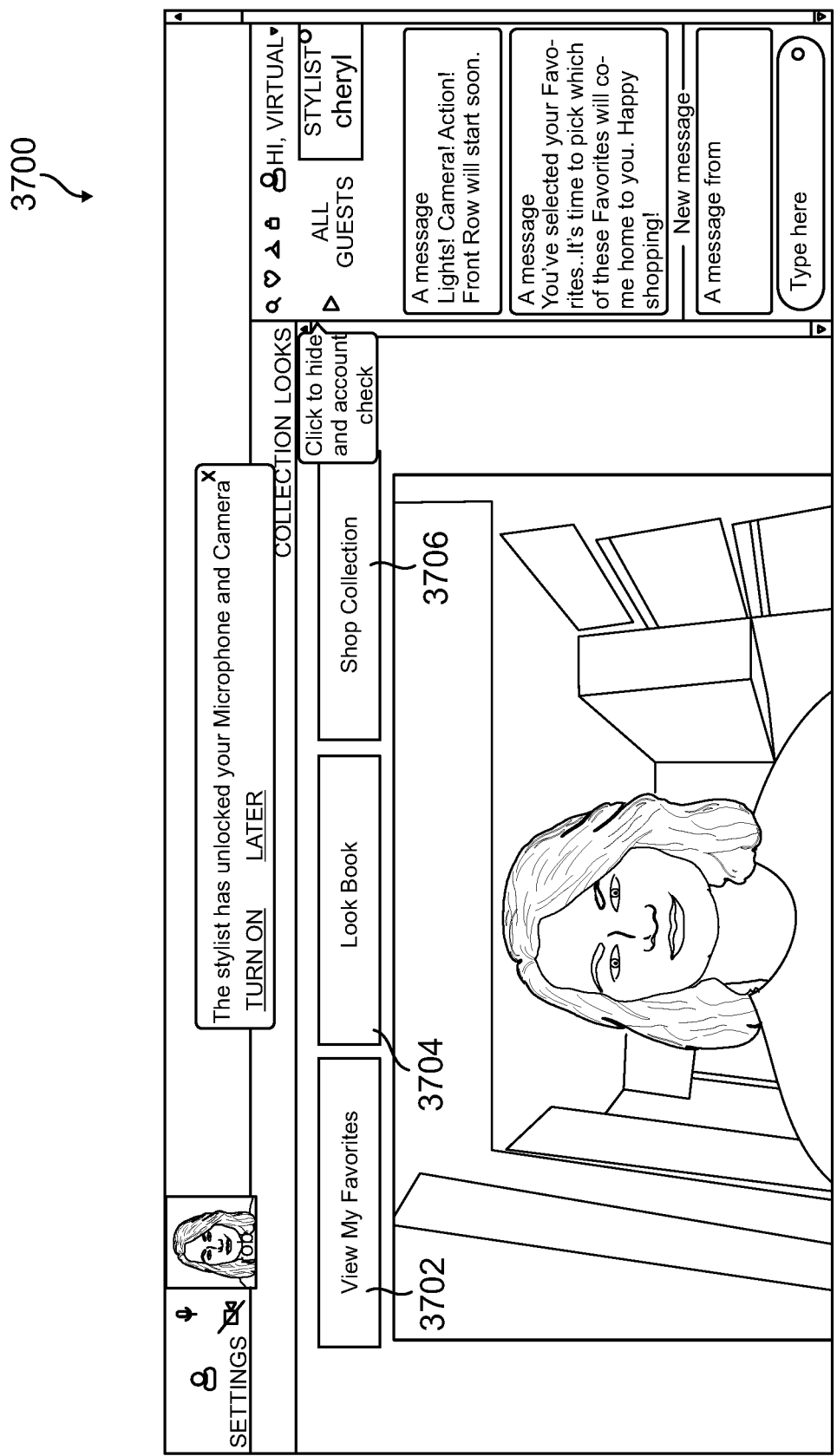
FIG. 37 is an exemplary screenshot showing the guest after the video is played in accordance with one aspect of the present disclosure.

FIG. 37 is an exemplary screenshot 3700 showing the guest after the video is played in accordance with one aspect of the present disclosure. Once the video or all the videos have been completed, each guest may be asked to turn on their video and camera to rejoin the other guests of the virtual live experience for the direct selling event. In a non-limiting example, a "View My Favorites" tab 3702, "Look Book" tab 3704, and "Shop Collection" tab 3706 may be provided.

The "View My Favorites" tab 3702 may allow the guest to view their favorites. Their favorites may have been saved during the show by selecting the heart icon on the product or service. Past favorites may also be shown based on previous virtual live experiences relate to other direct selling events. Products or services that have been tagged as a favorite may be sorted by price or by show. Varying levels of tags may be used to identify the guest's favorites. For example, a five star system may be used. Favorites may then be sorted by those which get the highest number of stars. This may be where there are opportunities to see other outfit recommendations along with the items selected as favorites.

The "Look Book" tab 3704 may be provided on the guest's portal. The look book may be a collection of photographs compiled to show off a model, photographer, style, stylist, or clothing line. The look book may be a "pretty" view of all inventory available for sale that season. The inventory may be presented as groupings worn by the photography models in a more natural way than product detail pages in the shop collection view. The look book may discern fashionable looks for the current month or season. This may give the guest ideas on how to style outfits, or to show what the latest fashions are. By selecting the "Look Book" tab 3704, the guest may access their own "fashion diary" which may be updated on a daily or weekly basis. A specific model, stylist, celebrity, politician or socialite may be followed and their looks may be compiled within the look book. This may be implemented outside of the virtual live experience or within it.

The "Shop Collection" tab 3706 may also be accessed through the screenshot 3700 by the guest. The shop collection may be a display of products or services presented by the company that put together the direct selling event. The products or services may be sorted within the shop collection by gender, tops, bottoms, accessories, or the like. They may also be sorted by dates introduced into the collection. If the company no longer supports the particular products or services, a third party vendor who deals in used or secondary markets for the products or services may be linked to within this tab 3706.

Figure 38:
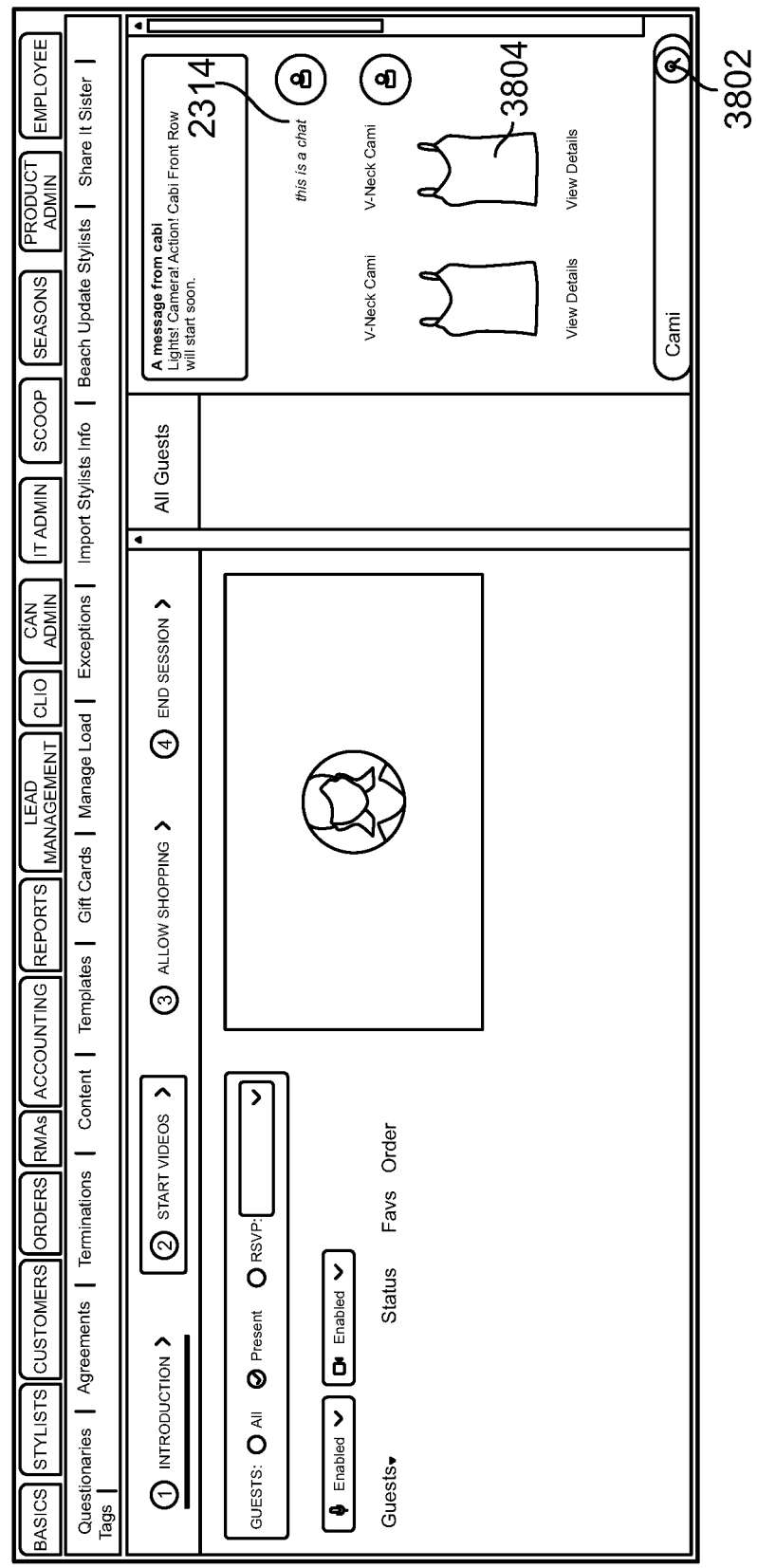
FIG. 38 is an exemplary screenshot showing a search clothing feature within a chat area in accordance with one aspect of the present disclosure.

Turning to FIG. 38, an exemplary screenshot 3800 showing a search clothing feature 3802 within the chat area 2314 in accordance with one aspect of the present disclosure is provided. The search clothing feature 3802 may not be limited to products. It may also be extended to services or other items that are commonly associated with a direct selling event. While the search clothing feature 3802 is shown in the chat area 2314, pop up boxes or other mechanisms may be used to implement the search clothing feature 3802.

In operation, the search clothing feature 3802 may be selected. Instead of a typical message input into the chat area 2314, the selection may cause a search bar to be displayed. The guest, after the selection of the search clothing feature 3802 is made, may type in what they are looking for, i.e., a search query. In the shown example, the guest may type in the word "Cami" into the search clothing feature 3802.

The online social and collaborative commerce system may process the input, retrieve items that may be relevant to the input, and provide those items as a message 3804 within the chat area 2314. Two items are shown within the message 3804 after the word "Cami" has been input into the search clothing feature 3802. A scroll bar may be provided if more items are found such that the guest may look through them as well.

The search clothing feature 3802 may be used independent of the virtual live experience for the direct selling event or in combination therewith. The search clothing feature 3802 may be used in an ordinary chat function or may be used with the virtual live experience, for example, if an item is not listed within the product carousel, the guest may be able to search for the item. This information may be conveyed to the stylist such that they may be able to provide additional information or suggest other items similar to the input provided in the search clothing feature 3802.

In one example, if a "Yellow Hat" is not within the product carousel, the guest may type in this input into the search clothing feature 3802. Products having that feature may be then shown within the chat area 2314. Images of yellow hats may be pushed to the guest. This may be individualized based on the guest's input into the search clothing feature 3802.

Figure 39:
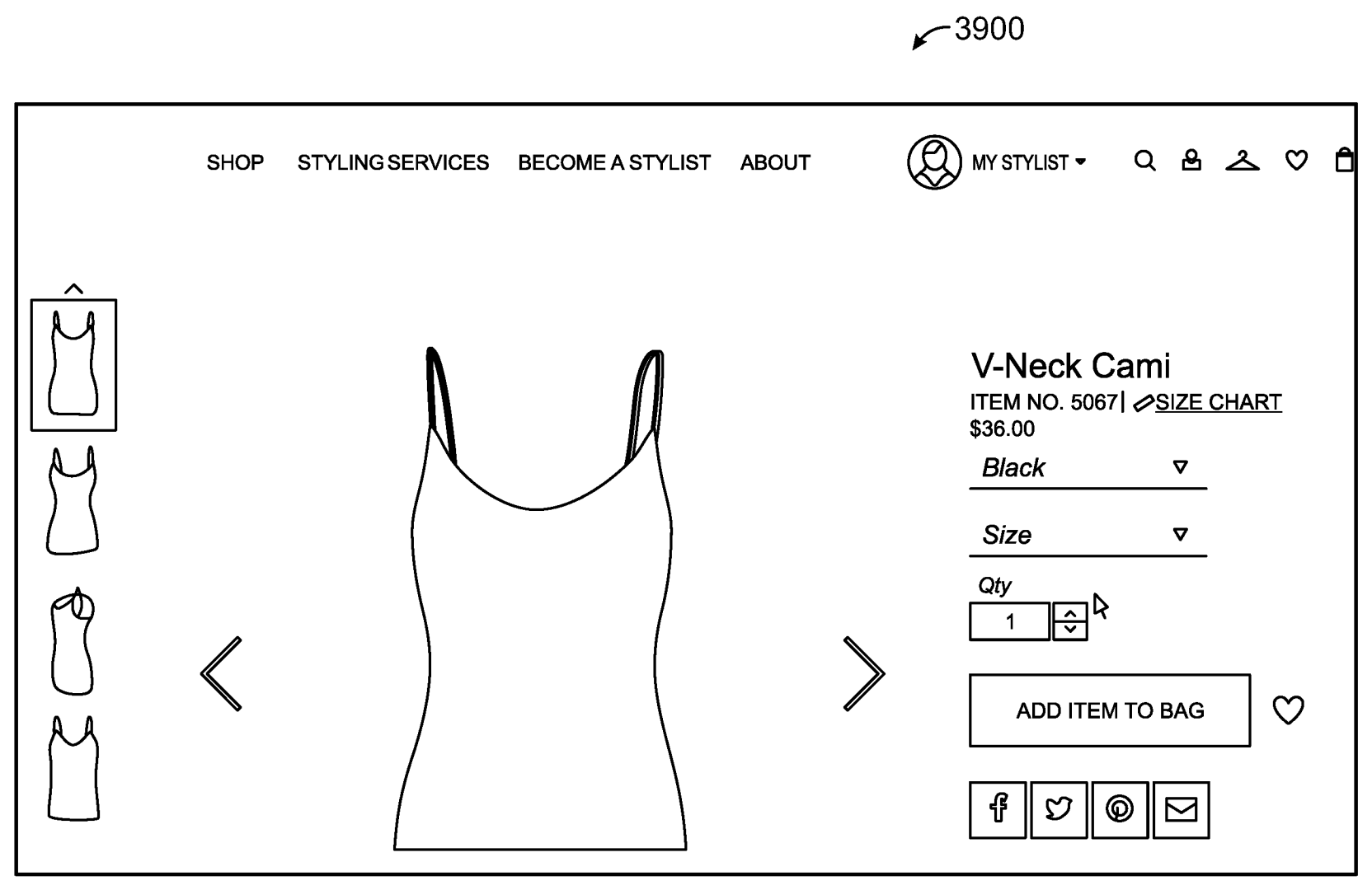

FIG. 39 is an exemplary screenshot 3900 showing a linked website associated with the search clothing feature in accordance with one aspect of the present disclosure. The guest, after being presented with the items in the chat area, may be able to select those items. The items within the chat area may be embedded with a URL, which when actuated links them to the proper website for that particular item. In the example, a camisole is shown on a website after it was selected in the chat area of the virtual live experience.

FIG. 40 is an exemplary screenshot 4000 showing an end of the virtual live experience in accordance with one aspect of the present disclosure. A message of "This Front Row experience has ended. Don't worry, you may still shop and chat with the group" may be provided. A continue button may be displayed on the bottom. This may officially end the live portion of the show.

Figure 41:
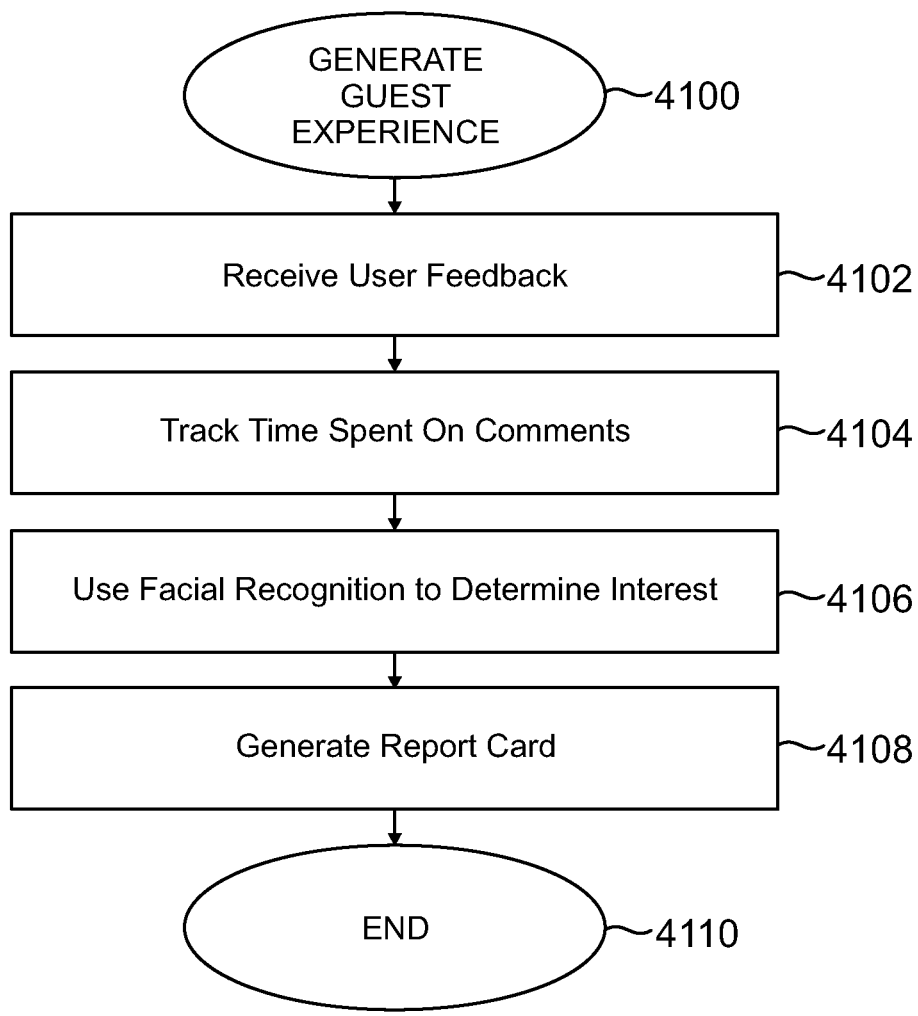
FIG. 41 is a flow chart depicting illustrative processes for generating a guest experience report card in accordance with one aspect of the present disclosure.

With reference to FIG. 41, a flow chart depicting illustrative processes for generating a guest experience report card in accordance with one aspect of the present disclosure is provided. These processes may be used after the virtual live experience for the direct selling event ends. As an illustration, these processes may generate a report card made by the guest. Information may be taken by the guest's experience. This information may be used to understanding a guest's needs and wants to entice them into other future shows. The processes may begin at block 4100.

At block 4102, the system may receive user feedback. This may be generalized to a like or dislike of the entire show process. In addition, specific comments may be used. The comments may be parsed through by automated methods to derive a score for their experience. Comments may be specifically directed to the hostess, stylist, or the entire show. Favorites and orders may also be used as an indicator for the guest experience report card.

At block 4104, the system may track time spent for making the comments. If the user spends very little time on making these comments, it may be assumed that the virtual live experience was positive and it was successful. Negative comments may be left as well. Both positive and negative comments may be used to modify future virtual live experiences.

Facial recognition may be used, at block 4106, by the online social and collaborative commerce system and method to evaluate a guest's experience. Facial expressions may be extracted during the show. Expressions such as smiling may indicate that the virtual live experience is working. Tired expressions may show that the guest is not interested or does not care for this platform.

The information presented above may be used to generate the report card at block 4108. The report card may give a total experience indication for the guest. A number of factors may contribute to this, for example, whether the stylist and hostess combination worked. The accumulation of the direct guest feedback along with time spent on comments and facial recognition may be a valuable tool for judging how the event went. Issues derived from the report card related to the virtual live experience may be corrected. The processes may end at block 4110.

Figure 42:
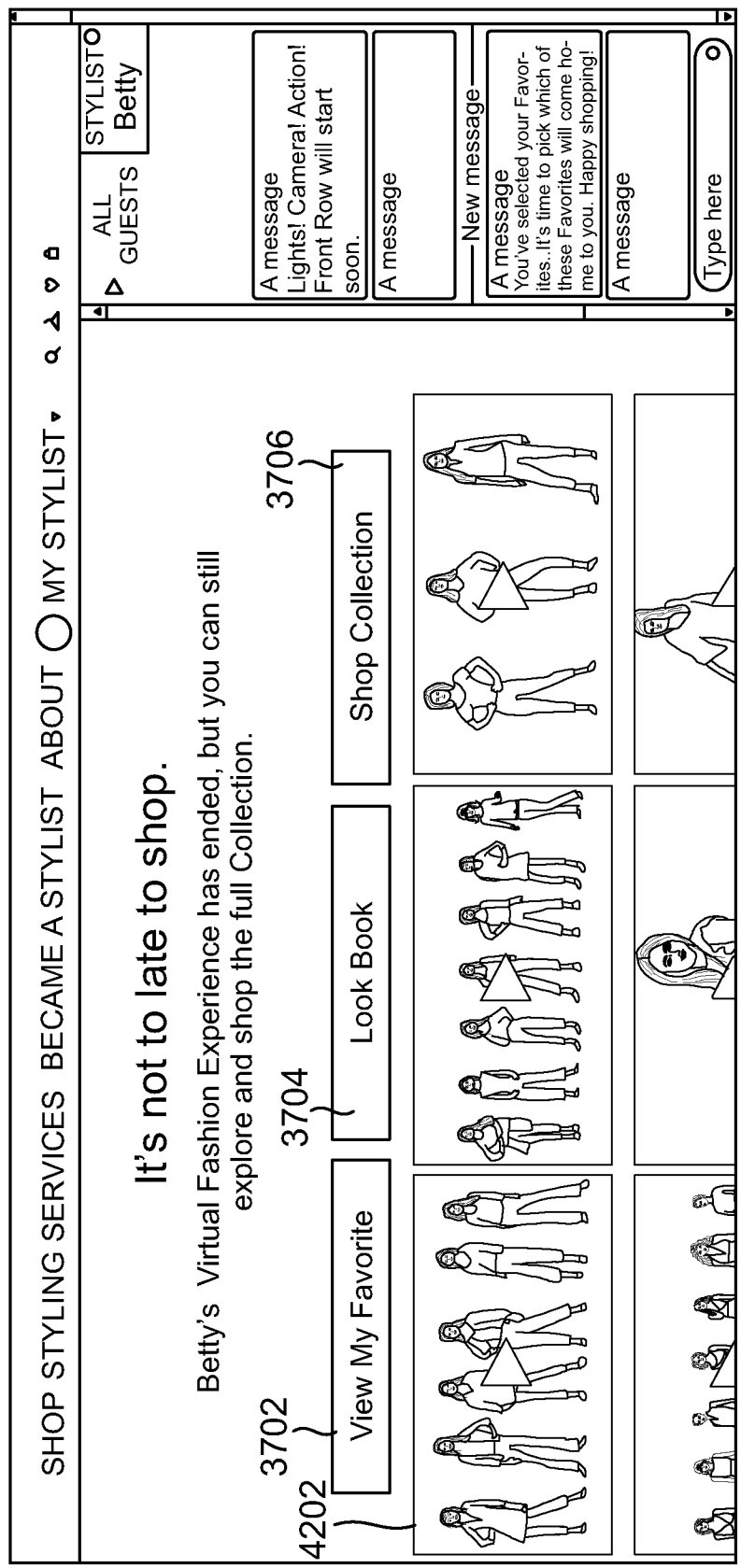
FIG. 42 is an exemplary screenshot showing a landing page for the guest after the virtual live experience has ended in accordance with one aspect of the present disclosure.

FIG. 42 is an exemplary screenshot 4200 showing a landing page for the guest after the virtual live experience has ended in accordance with one aspect of the present disclosure. The guest may return back to their portal to re-watch the previously sent videos by the stylist. An order may be placed or edits may be made to an existing order. The "View My Favorites" tab 3702, "Look Book" tab 3704, and "Shop Collection" tab 3706 may be presented, which were described above.

This post show landing page, shown within the screenshot 4200 may be flexible and may include anything that would support the experience converting into an order. Following the show, the stylist may post information on social media sites. Those postings may incentivize a viewer to purchase from that show. Clicking on that posting may lead to this post show landing page to make a purchase. This may be useful for those who did not participate in the show.

A show area 4202 may be provided such that the guest may revisit their saved videos or clips. Products or services within the videos or clips may be displayed once the video or clip has been selected. Depending on the number of videos or clips within the show area 4202, a scroll bar may be enabled such that the guest may slide up and down through them. In a non-limiting example, if the user moves their cursor over the clip, the guest may be able to see a one or two second highlight.

Figure 43:
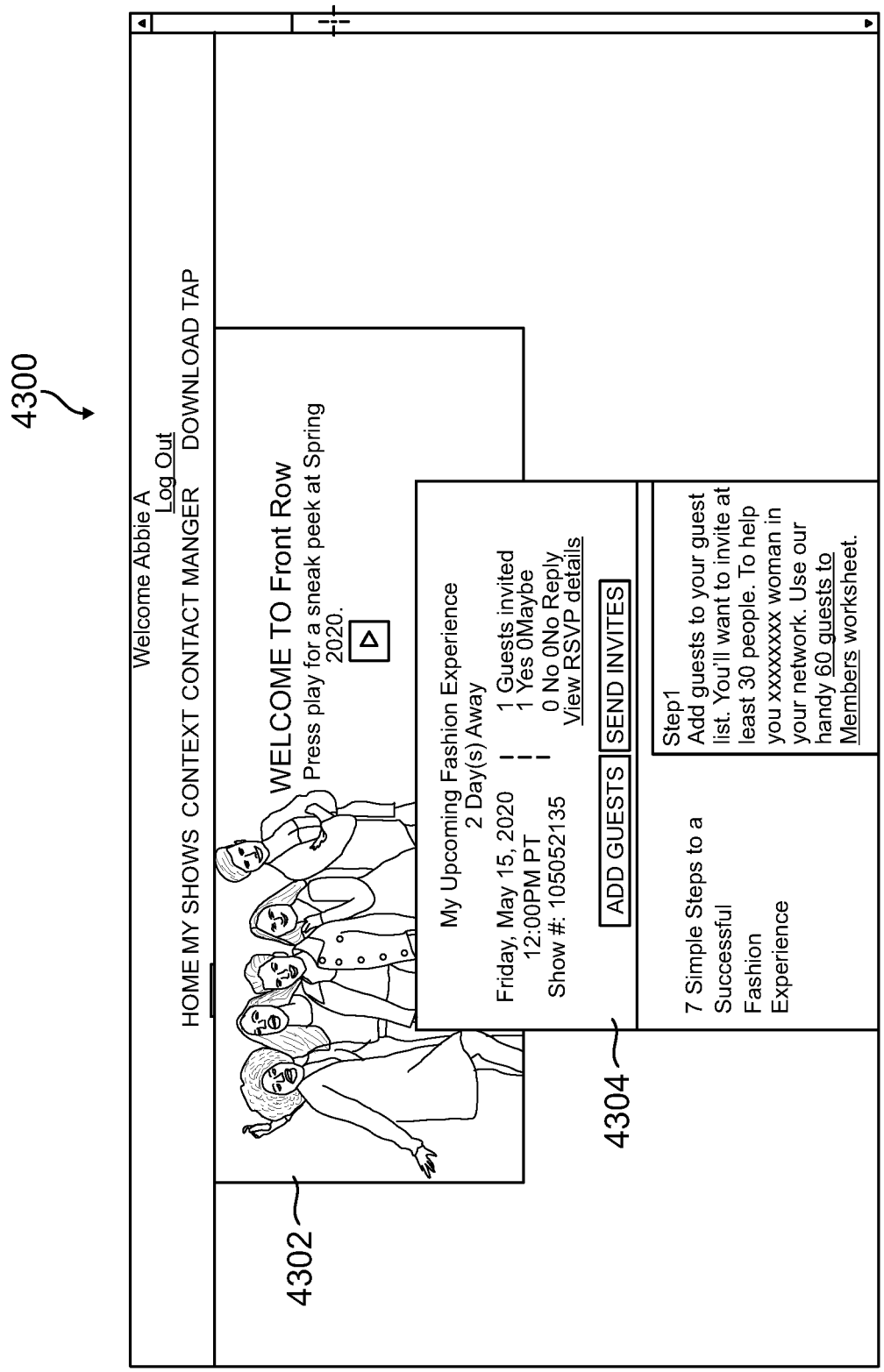
FIG. 43 is an exemplary screenshot showing the hostess' reminder for the virtual live experience in accordance with one aspect of the present disclosure.

Beforehand, the stylist and guest virtual live experiences were described. Turning to FIG. 43, an exemplary screenshot 4300 showing the hostess' reminder for the virtual live experience in accordance with one aspect of the present disclosure is provided. A video 4302 may be presented in the form of an advertisement for the virtual live experience. Upcoming information 4304 may also be shown. This information may indicate that the experience is days away. Other information may include a timing of the event, number of guests invited, and those committed to attending the show. The screenshot 4300 may also show items that the hostess has favorited and other styling options. This may incentivize the hostess to have more ordering guests at the show to increase their discounts to obtain those favorite items.

The hostess portal may also be used to add guest and send additional invites. Tips or recommendations may be given. For example, information may be given on how to have a successful fashion experience, for example, "7 Simple Steps to a Successful Fashion Show". These specific steps may be shown through the portal.

FIG. 44 is an exemplary screenshot 4400 showing the hostess' ability to add guests for the virtual live experience in accordance with one aspect of the present disclosure. An "Add Guests from your Contact Manager" option 4402 may allow a user to add a guest from their personal contacts. A scroll down menu 4404 may allow the hostess to change what they want to enter in a field 4406. For example, after selecting "Hostess Contact Manager" in the scroll down menu 4404, the hostess may search their contacts within that particular folder by first or last name in the field 4406.

The hostess may also search for guests by searching through previous shows 4408. One option may be to include "All Shows", "Season" such as spring 2002, or "Show Date Range". Information may be input into this section as shown.

Contacts may be added through the tabs 4410 which define "Add New Contact" or "Import Contacts". If the hostess selects "Add New Contact", a pop up screen may be provided allowing them to define new contacts. A first name, last name, email address, and phone number may be used to add a new contact, for example.

"Import Contacts" may be used by the hostess to generate new guest leads. Social networking contacts may be retrieved. Email contacts may also be used. APIs that are distributed by third party services may provide a handle for which these contacts may be gathered. When imported the guest list may be automatically populated.

The guest list 4412 may be shown on the hostess portal. This may include those guests that were invited above. A "Send Invites Now" button 4414 may be displayed. After being selected, invites may be automatically sent to the guests.

FIG. 45 is an exemplary screenshot 4500 showing the hostess' ability to send invites for the virtual live experience in accordance with one aspect of the present disclosure. The hostess may be given a number of options 4502 for sending an invite in this example. The hostess may "Cancel", "Preview" and "Send Invites". Selecting "Cancel" may bring the hostess back to the previous screenshot. "Preview" provides the hostess to view the invite without sending it and "Send Invites" may begin the distribution of the invitations.

The hostess may be presented with email options 4504. For example, the hostess may select between "Save the Date" and "Reminder". "Save the Date" may allow an outlook or other calendaring system invite to be placed into the invitation. When selected within the invitation, the invite may be automatically populated into the guest's calendars. "Reminder" may also be used to give a notification before the direct selling event is about to begin. This reminder may be given hours, days, weeks, or months before, for example.

Invitations may be "smart". That is they may include customized or personalized content for the recipient. The goal for the invite is that it may entice customers to attend through presenting options that they are most likely to be interested in. Personalization may be a key component to this experience.

The invitation may also be given "To" options 4506. This may limit the invitation to "All Guests" or "Remaining Guests". When "All Guests" has been selected, invitations may be sent to all the guests regardless of whether they received the invitation or not in the past. "Remaining Guests" may indicate invitations to be sent to those who had not received it yet.

A copying option 4508 may be provided in one example. The hostess or stylist may be copied. Furthermore, a template selection 4510 may be provided. The templates, which were defined above, may have been generated by the company hosting the direct selling event or may be more personalized by stylist or hostess.

Figure 46A:
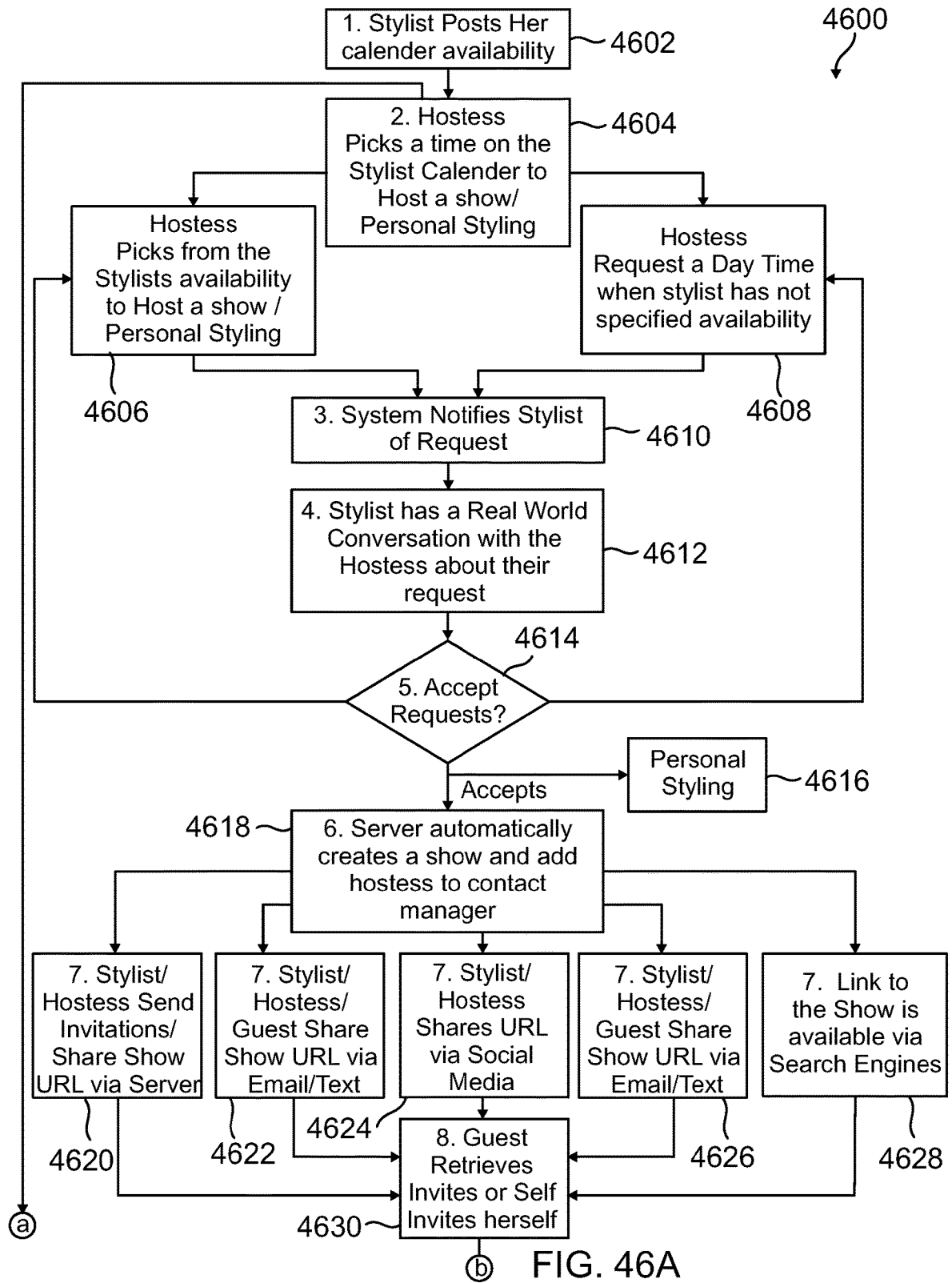
FIGS. 46A and 46B is a flow chart depicting illustrative processes for establishing the online social and collaborative commerce system from the start to the end of the virtual live experience in accordance with one aspect of the present disclosure.
Figure 46B:
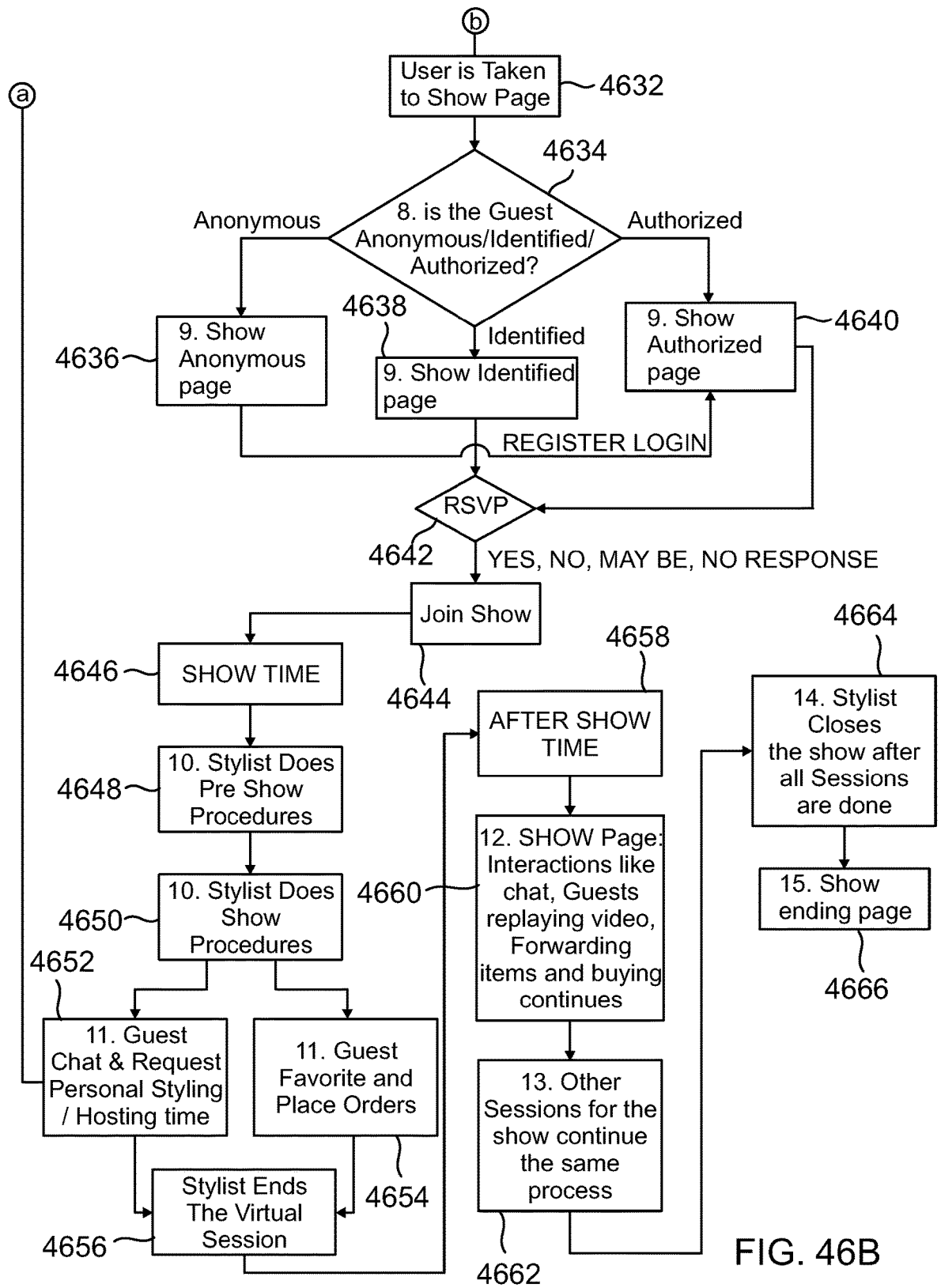

FIGS. 46A and 46B is a flow chart depicting illustrative processes 4600 for establishing the online social and collaborative commerce system from the start to the end of the virtual live experience in accordance with one aspect of the present disclosure. The processes may begin at block 4602 where the stylist may post their calendar availability. The stylist may post this information through their portal via the stylist terminal.

At block 4604, the hostess may pick a time on the stylist calendar to host a show/personal styling or live event. The hostess may access the web server through their portal by entering in their credentials. Drop down menus may be provided that show the calendar of the stylist. At block 4606, the hostess may pick from the stylists availability to host a show/person styling. The hostess may initiate the conversation. The stylist may be unaware up until this point of the hostess' intentions. Alternatively, at block 4608, the hostess may request a day and time from the stylist to see their availability.

At block 4610, the system may notify the stylist of the request whether it is within their schedule or not. This may be performed via automatically through email. Alternatively, the hostess and stylist may be connected with one another through a call. At block 4612, the stylist may have a real world conversation with the hostess about their request. This may be performed through video chat, instant messaging or other communication.

At decision block 4614, a determination may be made on whether the stylist accepts the requests to host the virtual live experience for the direct selling event. If the stylist initiates the event, then the hostess may determine whether they want to accept the request or not. When the stylist accepts, at block 4616, the personal styling show is created on the web or application server. If not, the processes 4600 return back up to blocks 4606 or 4608. The processes 4600 may also end if a stylist and hostess chose not to continue with a show.

At block 4618, the web server may automatically create a show and add the hostess to a contact manager. At block 4620, the stylist or hostess may send invitations to share the show information through a URL via the web server. Alternatively, at block 4622, the stylist or hostess may send invitations to share the show information through a URL via email or text. In another alternative, at block 4624, the stylist or hostess may share a URL via social media. At block 4626, the stylist or hostess may share show information through a URL via email or text. At block 4628, the link to the show may be made available via search engines.

At block 4630, the guest may retrieve invites or self-invite themselves. Self-invites may be through word of mouth and the guest may perform some further inquiring to get into the show. At block 4632, the guests may be taken to the show page, as well as the stylist and hostess. Video feeds and backend information may be setup or established.

At decision block 4634, a determination is made on whether the guest is anonymous, identified, or authorized. If the guest is anonymous, at block 4636, the processes 4600 may be directed to block 4640 where they may be required to login. When the guest has been identified, at block 4638, an identified page is shown and the processes 4600 may proceed to decision block 4642, which will be described below. At block 4640, an authorized page may be shown. This may require the participant to login through a series of inputs such as email addresses and passwords. A personal profile associated with the account may be retrieved. This may have been filled out by the guest previously, or it may be filled out after logging in or thereafter. This data from the profile may be fed into the recommendations algorithm.

At decision block 4642, a determination may be made on whether the parties have reserved their spot in the virtual live experience for the direct selling event. Typically, those that provide a "No" or "No Response" may not be allowed to enter the show at block 4644. Typically, they may still be able to shop online. At block 4646, the show may begin. At block 4648, the stylist may provide preshow procedures. For example, these may include checking the guests' cameras and microphones. Pre-show procedures may also include, but are not limited to, reviewing the guests' favorites, background information, and the like.

At block 4650, the stylist may provide show procedures. As described earlier, this may be presenting videos to the guests within the virtual live experience as well as providing specific details regarding products or services within the chat area. At block 4652, a guest chat may be made and a request for personal styling hosting time may be made. This may be made during the show. At block 4654, the guest may favorite or tag items and place orders. This may be made during the show. The stylist may end the virtual session at block 4656.

At block 4658, the show has ended and a post-show period begins. At block 4660, after show interactions may occur. For example, and as further described above, chat interactions may be made between the participants. The guests may replay videos that were shown during the show. Buying or purchasing opportunities may also exist after the live show has ended. Typically, there are two ending sequences: when the live show is over and when the show is closed and no additional orders may be placed.

At block 4662, other sessions for the show may continue the same processes. For example, different guests may go through the same process of viewing the videos after the show has ended and purchases of the products or services may be made. At block 4664, the stylist closes the show after all the sessions are done. That is, the show ends after all the guests are gone. At block 4666, an ending page is shown.

In addition to the embodiments and examples described above, a number of variations and/or additions may exist in the presented systems. An integrated online support for stylists, hostess and guests may be provided. This support may occur in real-time through a third party operator or may be implemented through an automated system using machine learning to understand incoming questions and provide them with automated responses.

Live system monitoring may be tied into the system's backend. The monitoring may be programmed with error checks and fail safe mechanisms. Alerts may be provided to the user (stylist, host or guest) when their particular system is failing. The system may try to remedy itself or self-reboot.

In another addition to the system, a one click entry point may be provided. This would streamline events and entrance into the virtual live experience. For example, the user may bypass the preshow. The single click would provide them directly into the experience. Furthermore, one single click option that may exist in the system is the removal of signing in with their personal preferences. In this way, the user may enter into the virtual live experience as an unknown user, that is, a guest with no pre-established information.

In one embodiment, an API may be provided to administrators, facilitators, and the like to provide exposure into the system at different connection points. A microsite may be securely tethered into the system through a connection point. Shipping modules may also be connected as well as other ecommerce sites.

Third party products and product inventory may be integrated into the system. Other potential products and/or services may be tied into the system such that it goes beyond that of the owner's products. That is, and by having additional pooling of resources, customers may be more inclined to use this system through the variety. Custom shipping features may be provided.

Loyalty programs may also be incorporated into the system. These may be tired to monetary rewards or credits within the system. The system may also be tied to social media accounts. It may be integrated into third party commerce solutions as well as TAP/Styling tool/recommendations engines.

Analytics and periodic reporting modules may be used and a part of the systems. Analytics on the stylist, hostess and/or guests may be programmed. These may provide valuable tools for corporate analytics and predictive analytics.

The system may incorporate product merchandising. That is, it may provide the ability to present capsules or different ways to present product lines. For example, videos may be more effective to show clothing, while virtual experiences may be more suited for real estate services. Through these capsules, the user may have the ability to change and have different product lines.

Artificial intelligence may be used to create a "look machine". These look machines may create a corporate created look. The machine would be used to design the look and be approved by others.

A user may experience the system in a number of different forms. Unstructured experiences may be facilitated through the system, that is, the user may talk over videos and present content in any order or sequence. Personal appointments may be given, by either a stylist or hostess. Live or recorded events may be given. Visualization of favorites, that is hearts, charts, etc., may be shown. Enhanced socialization time before, during and after the live show may be a feature as well as enhancing group shopping experiences.

In one embodiment, a group closet and recommendations review may be provided within the system. Items may be highlighted in the closet for group shopping. Paper dolls, or other avatars, may be used for trying outfits on.

Microsites within the system may be incorporated therein. These microsites may provide a more robust and personalized site (before and after). The user may customize the microsite with messaging from a stylist, CEO, and the like. Templates may be uploaded. This may allow for customizations while using common technical constructs. A user may be able to build their own custom microsite.

The system may also provide personalization. Smart invites may include personalized recommendations. A styling tool may include recommendations and customizations. A user may consume and utilize profile data more effectively to make recommendations and customized experiences on microsites. A user may personalize a virtual "living room", that is, a business motif, seasonal motif, casual motif, formal living room motif, and the like. Reminders, tasks and next steps may also be personalized.

Looks may be saved into a filing system. Stylist created looks may be saved as well as guest created looks. These may be saved by the stylist or guest. In one example, a guest may save the look created by another guest.

In one embodiment, the system may incorporate augmented reality (AR) technology. AR may allow a user to view a look from all angles. Other benefits and advantages through AR may be given through the system. Furthermore, image recognition may be incorporated into the system. Image recognition may be used to determine body types and styles. This may be used to determine a proper look. Geolocation services may also be used. This may affect the look of the user. For example, if the user is in the desert, looks may be suggested or recommended as such.

The methods and processes described in the disclosure may be embodied as code and/or data, which may be stored in a non-transitory computer-readable storage medium as described above. When a computer system reads and executes the code and/or data stored on the non-transitory computer-readable storage medium, the computer system performs the methods and processes embodied as data structures and code and stored within the non-transitory computer-readable storage medium. Furthermore, the methods and processes described may be included in hardware modules. For example, the hardware modules may include, but are not limited to, application-specific integrated circuit (ASIC) chips, field-programmable gate arrays (FPGAs), and other programmable-logic devices now known or later developed. When the hardware modules are activated, the hardware modules perform the methods and processes included within the hardware modules.

The technology described herein may be implemented as logical operations and/or modules. The logical operations may be implemented as a sequence of processor-implemented executed steps and as interconnected machine or circuit modules. Likewise, the descriptions of various component modules may be provided in terms of operations executed or effected by the modules. The resulting implementation is a matter of choice, dependent on the performance requirements of the underlying system implementing the described technology. Accordingly, the logical operations making up the embodiment of the technology described herein are referred to variously as operations, steps, objects, or modules. It should be understood that logical operations may be performed in any order, unless explicitly claimed otherwise or a specific order is inherently necessitated by the claim language.

Various embodiments of the present disclosure may be programmed using an object-oriented programming language, such as SmallTalk, Java, C++, Ada or C#. Other object-oriented programming languages may also be used. Alternatively, functional, scripting, and/or logical programming languages may be used. Various aspects of this disclosure may be implemented in a non-programmed environment, for example, documents created in HTML, XML, or other format that, when viewed in a window of a browser program, render aspects of a GUI or perform other functions. Various aspects of the disclosure may be implemented as programmed or non-programmed elements, or any combination thereof.

The foregoing description is provided to enable any person skilled in the relevant art to practice the various embodiments described herein. Various modifications to these embodiments will be readily apparent to those skilled in the relevant art and generic principles defined herein may be applied to other embodiments. Thus, the claims are not intended to be limited to the embodiments shown and described herein, but are to be accorded the full scope consistent with the language of the claims, wherein reference to an element in the singular is not intended to mean "one and only one" unless specifically stated, but rather "one or more." All structural and functional equivalents to the elements of the various embodiments described throughout this disclosure that are known or later come to be known to those of ordinary skill in the relevant art are expressly incorporated herein by reference and intended to be encompassed by the claims. Moreover, nothing disclosed herein is intended to be dedicated to the public regardless of whether such disclosure is explicitly recited in the claims.

What is claimed is:

1. A system for direct selling through a remote platform, comprising:
   a memory for storing computer readable code; and
   a processor operatively coupled to the memory, the processor configured to:
      receive information for creating a direct selling event;
      generate a specific website from the information for the direct selling event;
      launch a first portal, second portal and at least one other portal to the specific website for the direct selling event;
      wherein said first portal is a stylist portal, said second portal is a hostess portal and said at least one other portal is a guest portal.

2. The system for direct selling through the remote platform of claim 1, wherein the processor sends an electronic invitation to access the specific website before the direct selling event begins.

3. The system for direct selling through the remote platform of claim 1, wherein the processor receives a selection of media from the first portal and displays the media within the at least one other portal.

4. The system for direct selling through the remote platform of claim 3, wherein the media comprises a live stream showing at least one product or service and a carousel for purchasing the at least one product or service.

5. The system for direct selling through the remote platform of claim 4, wherein the processor receives a selection within the carousel for the at least one product or service to be purchased.

6. The system for direct selling through the remote platform of claim 4, wherein the processor receives a selection within the carousel for the at least one product or service to be saved and viewed at a later time.

7. The system for direct selling through the remote platform of claim 1, wherein the processor sends a reminder for the direct selling event before it starts.

8. The system for direct selling through the remote platform of claim 1, wherein a chat area is provided for the first portal, second portal and at least one other portal.

9. The system for direct selling through the remote platform of claim 8, wherein the chat area comprises a search feature linking a product or service within the chat area to a query.

10. A non-transitory machine-readable storage medium comprising instructions, which when implemented by one or more machines, cause the one or more machines to perform operations comprising:
    generating a website having a first portal, second portal and at least one other portal for a virtual direct selling event; and
    receiving from the first portal a selection of products or services to be displayed on the at least one other portal for purchase during the virtual direct selling event with the second portal facilitating the virtual direct selling event.

11. The non-transitory machine-readable storage medium of claim 10, wherein generating the website for the virtual direct selling event comprises receiving a time and date for the virtual direct selling event.

12. The non-transitory machine-readable storage medium of claim 10, wherein the operations further comprise generating a guest list for the virtual direct selling event.

13. The non-transitory machine-readable storage medium of claim 12, wherein generating the guest list comprises:
    retrieving associations from hostess information;
    retrieving stylist information; and
    matching the associations from the hostess information with the stylist information to generate potential guests for filling the guest list.

14. The non-transitory machine-readable storage medium of claim 13, wherein the operations further comprise editing the guest list from the hostess portal.

15. The non-transitory machine-readable storage medium of claim 10, wherein the operations further comprise sending the at least one other portal to a holding room and connecting the at least one other portal to a video bridge with the first portal and second portal when the direct selling event begins.

16. The non-transitory machine-readable storage medium of claim 10, wherein the first portal controls a selection of media displayed on the at least one other portal.

17. The non-transitory machine-readable storage medium of claim 16, wherein the media comprises a live stream showing at least one product or service and a separate display area for exhibiting the at least one product or service.

18. The non-transitory machine-readable storage medium of claim 10, wherein the stylist portal is given accesses to guest information.

19. The non-transitory computer readable medium storing computer-executable instructions of claim 18, wherein the method comprises providing a chat area having a search feature linking a product or service within the chat area to a query.

20. The non-transitory computer readable medium storing computer-executable instructions of claim 18, wherein said first portal is a stylist portal, said second portal is a hostess portal and said at least one other portal is a guest portal.

21. The non-transitory machine-readable storage medium of claim 10, wherein said first portal is a stylist portal, said second portal is a hostess portal and said at least one other portal is a guest portal.

22. A non-transitory computer readable medium storing computer-executable instructions that, when executed by one or more processors of a computer, cause the computer to perform a method comprising:
    receive timing information for a virtual show;
    associate user information with the virtual show;
    generate a website from the information;
    launch a first portal, second portal and at least one other portal for the website;
    receive from the first portal a selection of products or services to be displayed on the at least one other portal for purchase during the virtual show; and
    monitor the virtual show through the second portal.

23. A system for direct selling through a remote platform, comprising:
    a memory for storing computer readable code; and
    a processor operatively coupled to the memory, the processor configured to:
       receive time and date information for creating multiple discrete direct selling events;
       match a representative with each of said multiple discrete direct selling events;

generate an invitation to at least one guest for each of said multiple direct selling events;
generate a specific website from the time and date information for each of the direct selling events;
launch a first portal, second portal and at least one other portal to each specific website for each of the direct selling events.

24. A system for direct selling through a remote platform according to claim 23, wherein said first portal is a stylist portal, said second portal is a hostess portal and said at least one other portal is a guest portal.

* * * * *